(12) United States Patent
Gloor et al.

(10) Patent No.: US 12,209,689 B2
(45) Date of Patent: Jan. 28, 2025

(54) MULTIPLE-TUBE PINCH VALVE ASSEMBLY

(71) Applicants: Terumo Kabushiki Kaisha, Tokyo (JP); Terumo BCT, Inc., Lakewood, CO (US)

(72) Inventors: Andrew Gloor, Lakewood, CO (US); Jesse Janzen, Golden, CO (US); James Ladtkow, Broomfield, CO (US); Masatsugu Igarashi, Shizuoka (JP)

(73) Assignees: Terumo Kabushiki Kaisha (JP); Terumo BCT, Inc., Lakewood, CO (US)

( * ) Notice: Subject to any disclaimer, the term of this patent is extended or adjusted under 35 U.S.C. 154(b) by 155 days.

(21) Appl. No.: 18/113,151

(22) Filed: Feb. 23, 2023

(65) Prior Publication Data
US 2023/0272863 A1    Aug. 31, 2023

Related U.S. Application Data

(60) Provisional application No. 63/314,931, filed on Feb. 28, 2022.

(51) Int. Cl.
*F16K 7/04* (2006.01)
*F01L 1/047* (2006.01)
(Continued)

(52) U.S. Cl.
CPC .............. *F16K 7/045* (2013.01); *F01L 1/047* (2013.01); *F16K 7/06* (2013.01); *F16K 7/063* (2013.01);
(Continued)

(58) Field of Classification Search
CPC . F16K 7/045; F16K 7/065; F16K 7/16; F16K 27/0236; F16K 31/047;
(Continued)

(56) References Cited

U.S. PATENT DOCUMENTS 2,997,077 A    8/1961   Rodrigues
3,013,435 A    12/1961  Rodrigues
(Continued)

FOREIGN PATENT DOCUMENTS

CA    1016332 A    8/1977
DE    4007703 A1   9/1991
(Continued)

OTHER PUBLICATIONS

Nehlin JO, Just M, Rustan AC (2011) Human myotubes from myoblast cultures undergoing senescence exhibit defects in glucose and lipid metabolism. Biogerontology 12: 349-365.
(Continued)

*Primary Examiner* — P. Macade Nichols
(74) *Attorney, Agent, or Firm* — Harness, Dickey & Pierce, P.L.C.

(57) ABSTRACT

A multi-tubing pinch valve assembly including a receiving space defined between a pinch protrusion and tubing contact body. The multi-tubing pinch valve assembly is moveable between a retracted state and an extended state. In the extended state, multiple tubes disposed in the receiving space are pinched, restricting flow therethrough. In the retracted state, multiple tubes are capable of being loaded into and/or out of the receiving space.

35 Claims, 26 Drawing Sheets

(51) Int. Cl.
    *F16K 7/06*     (2006.01)
    *F16K 7/16*     (2006.01)
    *F16K 11/16*    (2006.01)
    *F16K 11/20*    (2006.01)
    *F16K 27/02*    (2006.01)
    *F16K 31/04*    (2006.01)
    *F16K 31/524*   (2006.01)

(52) U.S. Cl.
    CPC ............. *F16K 7/065* (2013.01); *F16K 7/16* (2013.01); *F16K 11/165* (2013.01); *F16K 11/20* (2013.01); *F16K 27/0236* (2013.01); *F16K 31/047* (2013.01); *F16K 31/524* (2013.01); *F01L 2001/0471* (2013.01); *F16K 31/52491* (2013.01)

(58) Field of Classification Search
    CPC .. F16K 31/524; F16K 31/52491; F01L 1/047; F01L 2001/0471
    See application file for complete search history.

(56) References Cited

U.S. PATENT DOCUMENTS

| | | |
|---|---|---|
| 3,067,915 A | 12/1962 | Shapiro et al. |
| 3,191,807 A | 6/1965 | Rodrigues |
| 3,283,727 A | 11/1966 | Rodrigues |
| 3,701,717 A | 10/1972 | Ingvorsen |
| 4,037,817 A | 7/1977 | Chernak |
| 4,173,415 A | 11/1979 | Wyatt |
| 4,301,010 A | 11/1981 | Eddleman et al. |
| 4,301,118 A | 11/1981 | Eddleman et al. |
| 4,412,990 A | 11/1983 | Lundblad et al. |
| 4,418,691 A | 12/1983 | Yannas et al. |
| 4,439,901 A | 4/1984 | Eddleman |
| 4,450,862 A | 5/1984 | Hogan |
| 4,478,829 A | 10/1984 | Landaburu et al. |
| 4,484,599 A | 11/1984 | Hanover et al. |
| 4,486,188 A | 12/1984 | Altshuler et al. |
| 4,509,695 A | 4/1985 | Bessman |
| 4,585,654 A | 4/1986 | Landaburu et al. |
| 4,618,586 A | 10/1986 | Walker |
| 4,629,686 A | 12/1986 | Gruenberg |
| 4,670,544 A | 6/1987 | Schwinn et al. |
| 4,727,059 A | 2/1988 | Binder et al. |
| 4,828,706 A | 5/1989 | Eddleman |
| 4,897,358 A | 1/1990 | Carrasco |
| 4,960,521 A | 10/1990 | Keller |
| 4,988,623 A | 1/1991 | Schwarz et al. |
| 5,015,585 A | 5/1991 | Robinson |
| 5,019,054 A | 5/1991 | Clement et al. |
| 5,126,238 A | 6/1992 | Gebhard et al. |
| 5,130,141 A | 7/1992 | Law et al. |
| 5,149,544 A | 9/1992 | Gentile et al. |
| 5,169,930 A | 12/1992 | Ruoslahti et al. |
| 5,192,553 A | 3/1993 | Boyse et al. |
| 5,197,985 A | 3/1993 | Caplan et al. |
| 5,202,254 A | 4/1993 | Amiot et al. |
| 5,225,346 A | 7/1993 | Matsumiya et al. |
| 5,226,914 A | 7/1993 | Caplan et al. |
| 5,240,614 A | 8/1993 | Ofsthun et al. |
| 5,240,861 A | 8/1993 | Bieri |
| 5,283,058 A | 2/1994 | Faustman |
| 5,310,676 A | 5/1994 | Johansson et al. |
| 5,324,428 A | 6/1994 | Flaherty |
| 5,342,752 A | 8/1994 | Platz et al. |
| 5,422,197 A | 6/1995 | Zito |
| 5,436,151 A | 7/1995 | McGlave et al. |
| 5,437,994 A | 8/1995 | Emerson et al. |
| 5,439,757 A | 8/1995 | Zito |
| 5,459,069 A | 10/1995 | Palsson et al. |
| 5,460,964 A | 10/1995 | McGlave et al. |
| H1509 H | 12/1995 | Eran et al. |
| 5,478,739 A | 12/1995 | Slivka et al. |
| 5,486,359 A | 1/1996 | Caplan et al. |
| 5,496,659 A | 3/1996 | Zito |
| 5,507,949 A | 4/1996 | Ho |
| 5,512,180 A | 4/1996 | Ho |
| 5,527,467 A | 6/1996 | Ofsthun et al. |
| 5,543,316 A | 8/1996 | Zawadzka et al. |
| 5,545,492 A | 8/1996 | Zito |
| 5,549,674 A | 8/1996 | Humes et al. |
| 5,571,720 A | 11/1996 | Grandics et al. |
| 5,591,625 A | 1/1997 | Gerson et al. |
| 5,593,580 A | 1/1997 | Kopf |
| 5,595,909 A | 1/1997 | Hu et al. |
| 5,599,703 A | 2/1997 | Davis et al. |
| 5,605,822 A | 2/1997 | Emerson et al. |
| 5,605,829 A | 2/1997 | McGlave et al. |
| 5,605,835 A | 2/1997 | Hu et al. |
| 5,622,857 A | 4/1997 | Goffe |
| 5,626,731 A | 5/1997 | Cooley et al. |
| 5,627,070 A | 5/1997 | Gruenberg |
| 5,635,386 A | 6/1997 | Palsson et al. |
| 5,635,387 A | 6/1997 | Fei et al. |
| 5,643,736 A | 7/1997 | Bruder et al. |
| 5,646,043 A | 7/1997 | Emerson et al. |
| 5,654,186 A | 8/1997 | Cerami et al. |
| 5,656,421 A | 8/1997 | Gebhard et al. |
| 5,658,995 A | 8/1997 | Kohn et al. |
| 5,667,985 A | 9/1997 | O'Leary et al. |
| 5,670,147 A | 9/1997 | Emerson et al. |
| 5,674,750 A | 10/1997 | Kraus et al. |
| 5,684,712 A | 11/1997 | Goffe et al. |
| 5,686,289 A | 11/1997 | Humes et al. |
| 5,695,989 A | 12/1997 | Kalamasz |
| 5,700,289 A | 12/1997 | Breitbart et al. |
| 5,705,534 A | 1/1998 | D'Agostino et al. |
| 5,707,859 A | 1/1998 | Miller et al. |
| 5,712,163 A | 1/1998 | Parenteau et al. |
| 5,728,581 A | 3/1998 | Schwartz et al. |
| 5,733,541 A | 3/1998 | Taichman et al. |
| 5,733,542 A | 3/1998 | Haynesworth et al. |
| 5,736,396 A | 4/1998 | Bruder et al. |
| 5,744,347 A | 4/1998 | Wagner et al. |
| 5,750,651 A | 5/1998 | Oppermann et al. |
| 5,753,506 A | 5/1998 | Johe |
| 5,763,197 A | 6/1998 | Tsukamoto et al. |
| 5,763,266 A | 6/1998 | Palsson et al. |
| 5,766,944 A | 6/1998 | Ruiz |
| 5,772,994 A | 6/1998 | Ildstad et al. |
| 5,783,075 A | 7/1998 | Eddleman et al. |
| 5,783,216 A | 7/1998 | Faustman |
| 5,785,912 A | 7/1998 | Cooley et al. |
| 5,804,446 A | 9/1998 | Cerami et al. |
| 5,806,529 A | 9/1998 | Reisner et al. |
| 5,807,686 A | 9/1998 | Wagner et al. |
| 5,811,094 A | 9/1998 | Caplan et al. |
| 5,811,397 A | 9/1998 | Francavilla et al. |
| 5,817,773 A | 10/1998 | Wilson et al. |
| 5,821,218 A | 10/1998 | Toback et al. |
| 5,827,735 A | 10/1998 | Young et al. |
| 5,827,740 A | 10/1998 | Pittenger |
| 5,830,921 A | 11/1998 | Cooley et al. |
| 5,833,979 A | 11/1998 | Schinstine et al. |
| 5,837,258 A | 11/1998 | Grotendorst |
| 5,837,539 A | 11/1998 | Caplan et al. |
| 5,840,502 A | 11/1998 | Van Vlasselaer |
| 5,840,576 A | 11/1998 | Schinstine et al. |
| 5,840,580 A | 11/1998 | Terstappen et al. |
| 5,842,477 A | 12/1998 | Naughton et al. |
| 5,843,633 A | 12/1998 | Yin et al. |
| 5,846,796 A | 12/1998 | Cerami et al. |
| 5,853,247 A | 12/1998 | Shroyer |
| 5,853,717 A | 12/1998 | Schinstine et al. |
| 5,855,608 A | 1/1999 | Brekke et al. |
| 5,855,613 A | 1/1999 | Antanavich et al. |
| 5,855,619 A | 1/1999 | Caplan et al. |
| 5,858,747 A | 1/1999 | Schinstine et al. |
| 5,858,782 A | 1/1999 | Long et al. |
| 5,861,315 A | 1/1999 | Nakahata |
| 5,866,115 A | 2/1999 | Kanz et al. |
| 5,866,420 A | 2/1999 | Talbot et al. |
| 5,868,930 A | 2/1999 | Kopf |

(56) References Cited

U.S. PATENT DOCUMENTS

| | | |
|---|---|---|
| 5,882,295 A | 3/1999 | Kope |
| 5,882,918 A | 3/1999 | Goffe |
| 5,882,929 A | 3/1999 | Fofonoff et al. |
| 5,888,807 A | 3/1999 | Palsson et al. |
| 5,902,741 A | 5/1999 | Purchio et al. |
| 5,906,827 A | 5/1999 | Khouri et al. |
| 5,906,934 A | 5/1999 | Grande et al. |
| 5,908,782 A | 6/1999 | Marshak et al. |
| 5,908,784 A | 6/1999 | Johnstone et al. |
| 5,912,177 A | 6/1999 | Turner et al. |
| 5,914,108 A | 6/1999 | Tsukamoto et al. |
| 5,922,597 A | 7/1999 | Verfaillie et al. |
| 5,922,847 A | 7/1999 | Broudy et al. |
| 5,925,567 A | 7/1999 | Kraus et al. |
| 5,928,945 A | 7/1999 | Seliktar et al. |
| 5,935,849 A | 8/1999 | Schinstine et al. |
| 5,938,929 A | 8/1999 | Shimagaki et al. |
| 5,939,323 A | 8/1999 | Valentini et al. |
| 5,942,225 A | 8/1999 | Bruder et al. |
| 5,955,353 A | 9/1999 | Amiot |
| 5,958,763 A | 9/1999 | Goffe |
| 5,965,436 A | 10/1999 | Thiede et al. |
| 5,972,703 A | 10/1999 | Long et al. |
| 5,980,795 A | 11/1999 | Klotzer et al. |
| 5,981,211 A | 11/1999 | Hu et al. |
| 5,981,708 A | 11/1999 | Lawman et al. |
| 5,998,184 A | 12/1999 | Shi |
| 6,001,585 A | 12/1999 | Gramer |
| 6,001,643 A | 12/1999 | Spaulding |
| 6,001,647 A | 12/1999 | Peck et al. |
| 6,004,743 A | 12/1999 | Kenyon et al. |
| 6,010,696 A | 1/2000 | Caplan et al. |
| 6,015,554 A | 1/2000 | Galy |
| 6,022,540 A | 2/2000 | Bruder et al. |
| 6,022,742 A | 2/2000 | Kopf |
| 6,022,743 A | 2/2000 | Naughton et al. |
| 6,027,743 A | 2/2000 | Khouri et al. |
| 6,030,836 A | 2/2000 | Thiede et al. |
| 6,040,180 A | 3/2000 | Johe |
| 6,045,818 A | 4/2000 | Cima et al. |
| 6,048,721 A | 4/2000 | Armstrong et al. |
| 6,048,727 A | 4/2000 | Kopf |
| 6,049,026 A | 4/2000 | Muschler |
| 6,054,121 A | 4/2000 | Cerami et al. |
| 6,060,270 A | 5/2000 | Humes |
| 6,066,317 A | 5/2000 | Yang et al. |
| 6,071,691 A | 6/2000 | Hoekstra et al. |
| 6,074,366 A | 6/2000 | Rogers et al. |
| 6,082,364 A | 7/2000 | Balian et al. |
| 6,083,747 A | 7/2000 | Wong et al. |
| 6,086,643 A | 7/2000 | Clark et al. |
| 6,087,113 A | 7/2000 | Caplan et al. |
| 6,096,537 A | 8/2000 | Chappel |
| 6,103,117 A | 8/2000 | Shimagaki et al. |
| 6,103,522 A | 8/2000 | Torok-Storb et al. |
| 6,110,176 A | 8/2000 | Shapira |
| 6,110,482 A | 8/2000 | Khouri et al. |
| 6,114,307 A | 9/2000 | Jaspers et al. |
| 6,117,985 A | 9/2000 | Thomas et al. |
| 6,120,491 A | 9/2000 | Kohn et al. |
| 6,127,141 A | 10/2000 | Kopf |
| 6,129,911 A | 10/2000 | Faris |
| 6,143,293 A | 11/2000 | Weiss et al. |
| 6,146,360 A | 11/2000 | Rogers et al. |
| 6,146,888 A | 11/2000 | Smith et al. |
| 6,149,902 A | 11/2000 | Artavanis-Tsakonas et al. |
| 6,149,906 A | 11/2000 | Mosca |
| 6,150,164 A | 11/2000 | Humes |
| 6,152,964 A | 11/2000 | Van Blitterswijk et al. |
| 6,162,643 A | 12/2000 | Wille, Jr. |
| 6,165,225 A | 12/2000 | Antanavich et al. |
| 6,165,785 A | 12/2000 | Ogle et al. |
| 6,174,333 B1 | 1/2001 | Kadiyala et al. |
| 6,174,526 B1 | 1/2001 | Cerami et al. |
| 6,174,666 B1 | 1/2001 | Pavlakis et al. |
| 6,179,871 B1 | 1/2001 | Halpern |
| 6,197,325 B1 | 3/2001 | MacPhee et al. |
| 6,197,575 B1 | 3/2001 | Griffith et al. |
| 6,200,606 B1 | 3/2001 | Peterson et al. |
| 6,214,369 B1 | 4/2001 | Grande et al. |
| 6,214,574 B1 | 4/2001 | Kopf |
| 6,224,860 B1 | 5/2001 | Brown |
| 6,225,119 B1 | 5/2001 | Qasba et al. |
| 6,225,368 B1 | 5/2001 | D'Agostino et al. |
| 6,228,117 B1 | 5/2001 | De Bruijn et al. |
| 6,228,607 B1 | 5/2001 | Kersten et al. |
| 6,238,908 B1 | 5/2001 | Armstrong et al. |
| 6,239,157 B1 | 5/2001 | Mbalaviele |
| 6,242,252 B1 | 6/2001 | Reid et al. |
| 6,248,319 B1 | 6/2001 | Zsebo et al. |
| 6,248,587 B1 | 6/2001 | Rodgers et al. |
| 6,255,112 B1 | 7/2001 | Thiede et al. |
| 6,258,597 B1 | 7/2001 | Bachovchin et al. |
| 6,258,778 B1 | 7/2001 | Rodgers et al. |
| 6,261,549 B1 | 7/2001 | Fernandez et al. |
| 6,280,718 B1 | 8/2001 | Kaufman et al. |
| 6,280,724 B1 | 8/2001 | Moore |
| 6,281,012 B1 | 8/2001 | McIntosh et al. |
| 6,281,195 B1 | 8/2001 | Rueger et al. |
| 6,287,864 B1 | 9/2001 | Bagnis et al. |
| 6,291,249 B1 | 9/2001 | Mahant et al. |
| 6,297,213 B1 | 10/2001 | Oppermann et al. |
| 6,299,650 B1 | 10/2001 | Van Blitterswijk et al. |
| 6,306,424 B1 | 10/2001 | Vyakarnam et al. |
| 6,306,575 B1 | 10/2001 | Thomas et al. |
| 6,322,784 B1 | 11/2001 | Pittenger et al. |
| 6,322,786 B1 | 11/2001 | Anderson |
| 6,326,198 B1 | 12/2001 | Emerson et al. |
| 6,326,201 B1 | 12/2001 | Fung et al. |
| 6,328,765 B1 | 12/2001 | Hardwick et al. |
| 6,328,960 B1 | 12/2001 | McIntosh et al. |
| 6,333,029 B1 | 12/2001 | Vyakarnam et al. |
| 6,335,195 B1 | 1/2002 | Rodgers et al. |
| 6,338,942 B2 | 1/2002 | Kraus et al. |
| 6,340,592 B1 | 1/2002 | Stringer |
| 6,342,370 B1 | 1/2002 | Connolly et al. |
| 6,355,239 B1 | 3/2002 | Bruder et al. |
| 6,358,252 B1 | 3/2002 | Shapira |
| 6,361,997 B1 | 3/2002 | Huss |
| 6,365,149 B2 | 4/2002 | Vyakarnam et al. |
| 6,368,636 B1 | 4/2002 | McIntosh et al. |
| 6,372,210 B2 | 4/2002 | Brown |
| 6,372,244 B1 | 4/2002 | Antanavich et al. |
| 6,372,494 B1 | 4/2002 | Naughton et al. |
| 6,372,892 B1 | 4/2002 | Ballinger et al. |
| 6,376,742 B1 | 4/2002 | Zdrahala et al. |
| 6,379,953 B1 | 4/2002 | Bruder et al. |
| 6,387,367 B1 | 5/2002 | Davis-Sproul et al. |
| 6,387,369 B1 | 5/2002 | Pittenger et al. |
| 6,387,693 B2 | 5/2002 | Rieser et al. |
| 6,387,964 B1 | 5/2002 | D'Agostino et al. |
| 6,392,118 B1 | 5/2002 | Hammang et al. |
| 6,394,812 B1 | 5/2002 | Sullivan et al. |
| 6,399,580 B1 | 6/2002 | Elias et al. |
| 6,410,320 B1 | 6/2002 | Humes |
| 6,414,219 B1 | 7/2002 | Denhardt et al. |
| 6,416,496 B1 | 7/2002 | Rogers et al. |
| 6,417,205 B1 | 7/2002 | Cooke et al. |
| 6,419,829 B2 | 7/2002 | Ho et al. |
| 6,420,138 B1 | 7/2002 | Gentz et al. |
| 6,423,681 B1 | 7/2002 | Barasch et al. |
| 6,426,332 B1 | 7/2002 | Rueger et al. |
| 6,428,802 B1 | 8/2002 | Atala |
| 6,429,012 B1 | 8/2002 | Kraus et al. |
| 6,429,013 B1 | 8/2002 | Halvorsen et al. |
| 6,432,653 B1 | 8/2002 | Okarma |
| 6,432,711 B1 | 8/2002 | Pinsmore et al. |
| 6,440,407 B1 | 8/2002 | Bauer et al. |
| 6,440,734 B1 | 8/2002 | Pykett et al. |
| 6,451,562 B1 | 9/2002 | Ruben et al. |
| 6,454,811 B1 | 9/2002 | Sherwood et al. |
| 6,455,678 B1 | 9/2002 | Yin et al. |
| 6,458,585 B1 | 10/2002 | Vachula et al. |
| 6,458,589 B1 | 10/2002 | Rambhatla et al. |

(56) References Cited

U.S. PATENT DOCUMENTS

| | | |
|---|---|---|
| 6,461,495 B1 | 10/2002 | Morrissey et al. |
| 6,461,853 B1 | 10/2002 | Zhu |
| 6,464,983 B1 | 10/2002 | Grotendorst |
| 6,465,205 B2 | 10/2002 | Hicks, Jr. |
| 6,465,247 B1 | 10/2002 | Weissman et al. |
| 6,465,249 B2 | 10/2002 | Reya et al. |
| 6,468,794 B1 | 10/2002 | Uchida et al. |
| 6,472,200 B1 | 10/2002 | Mitrani |
| 6,475,481 B2 | 11/2002 | Talmadge |
| 6,479,064 B1 | 11/2002 | Atala |
| 6,482,231 B1 | 11/2002 | Abatangelo et al. |
| 6,482,411 B1 | 11/2002 | Ahuja et al. |
| 6,482,645 B2 | 11/2002 | Atala |
| 6,482,926 B1 | 11/2002 | Thomas et al. |
| 6,488,925 B2 | 12/2002 | Ruben et al. |
| 6,491,918 B1 | 12/2002 | Thomas et al. |
| 6,495,129 B1 | 12/2002 | Li et al. |
| 6,495,364 B2 | 12/2002 | Hammang et al. |
| 6,497,875 B1 | 12/2002 | Sorrell et al. |
| 6,498,034 B1 | 12/2002 | Strobl |
| 6,506,574 B1 | 1/2003 | Rambhatla et al. |
| 6,511,510 B1 | 1/2003 | de Bruijn et al. |
| 6,511,767 B1 | 1/2003 | Calver et al. |
| 6,511,958 B1 | 1/2003 | Atkinson et al. |
| 6,514,514 B1 | 2/2003 | Atkinson et al. |
| 6,524,452 B1 | 2/2003 | Clark et al. |
| 6,528,052 B1 | 3/2003 | Smith et al. |
| 6,528,245 B2 | 3/2003 | Sanchez-Ramos et al. |
| 6,531,445 B1 | 3/2003 | Cohen et al. |
| 6,534,084 B1 | 3/2003 | Vyakarnam et al. |
| 6,537,807 B1 | 3/2003 | Smith et al. |
| 6,541,024 B1 | 4/2003 | Kadiyala et al. |
| 6,541,249 B2 | 4/2003 | Wager et al. |
| 6,544,506 B2 | 4/2003 | Reisner |
| 6,548,734 B1 | 4/2003 | Glimcher et al. |
| 6,555,324 B1 | 4/2003 | Olweus et al. |
| 6,555,374 B1 | 4/2003 | Gimble et al. |
| 6,559,119 B1 | 5/2003 | Burgess et al. |
| 6,562,616 B1 | 5/2003 | Toner et al. |
| 6,565,843 B1 | 5/2003 | Cohen et al. |
| 6,569,421 B2 | 5/2003 | Hodges |
| 6,569,427 B1 | 5/2003 | Boyse et al. |
| 6,569,428 B1 | 5/2003 | Isner et al. |
| 6,569,654 B2 | 5/2003 | Shastri et al. |
| 6,576,188 B1 | 6/2003 | Rose et al. |
| 6,576,428 B1 | 6/2003 | Assenmacher et al. |
| 6,576,464 B2 | 6/2003 | Gold et al. |
| 6,576,465 B1 | 6/2003 | Long |
| 6,582,471 B1 | 6/2003 | Bittmann et al. |
| 6,582,955 B2 | 6/2003 | Martinez et al. |
| 6,586,192 B1 | 7/2003 | Peschle et al. |
| 6,589,728 B2 | 7/2003 | Csete et al. |
| 6,589,786 B1 | 7/2003 | Mangano et al. |
| 6,596,274 B1 | 7/2003 | Abatangelo et al. |
| 6,599,300 B2 | 7/2003 | Vibe-Hansen et al. |
| 6,599,520 B2 | 7/2003 | Scarborough et al. |
| 6,610,535 B1 | 8/2003 | Lu et al. |
| 6,613,798 B1 | 9/2003 | Porter et al. |
| 6,616,912 B2 | 9/2003 | Eddleman et al. |
| 6,617,070 B1 | 9/2003 | Morrissey et al. |
| 6,617,152 B2 | 9/2003 | Bryhan et al. |
| 6,617,159 B1 | 9/2003 | Cancedda et al. |
| 6,623,749 B2 | 9/2003 | Williams et al. |
| 6,623,942 B2 | 9/2003 | Ruben et al. |
| 6,624,108 B1 | 9/2003 | Clark et al. |
| 6,626,950 B2 | 9/2003 | Brown et al. |
| 6,627,191 B1 | 9/2003 | Bartelmez et al. |
| 6,632,425 B1 | 10/2003 | Li et al. |
| 6,632,620 B1 | 10/2003 | Makarovskiy |
| 6,632,934 B1 | 10/2003 | Moreadith et al. |
| 6,638,765 B1 | 10/2003 | Rosenberg |
| 6,642,048 B2 | 11/2003 | Xu et al. |
| 6,642,049 B1 | 11/2003 | Chute et al. |
| 6,642,201 B1 | 11/2003 | Khavinson et al. |
| 6,645,489 B2 | 11/2003 | Pykett et al. |
| 6,645,727 B2 | 11/2003 | Thomas et al. |
| 6,645,763 B2 | 11/2003 | Kobayashi et al. |
| 6,649,189 B2 | 11/2003 | Talmadge et al. |
| 6,649,595 B2 | 11/2003 | Clackson et al. |
| 6,649,631 B1 | 11/2003 | Orme et al. |
| 6,653,105 B2 | 11/2003 | Triglia et al. |
| 6,653,134 B2 | 11/2003 | Prockop et al. |
| 6,660,523 B2 | 12/2003 | Blom et al. |
| 6,662,805 B2 | 12/2003 | Frondoza et al. |
| 6,667,034 B2 | 12/2003 | Palsson et al. |
| 6,667,176 B1 | 12/2003 | Funk et al. |
| 6,670,169 B1 | 12/2003 | Schob et al. |
| 6,670,175 B2 | 12/2003 | Wang et al. |
| 6,673,603 B2 | 1/2004 | Baetge et al. |
| 6,673,606 B1 | 1/2004 | Tennekoon et al. |
| 6,677,306 B1 | 1/2004 | Veis et al. |
| 6,683,192 B2 | 1/2004 | Baxter et al. |
| 6,685,936 B2 | 2/2004 | McIntosh et al. |
| 6,685,971 B2 | 2/2004 | Xu |
| 6,686,198 B1 | 2/2004 | Melton et al. |
| 6,696,575 B2 | 2/2004 | Schmidt et al. |
| 6,699,716 B2 | 3/2004 | Sullivan et al. |
| 6,703,017 B1 | 3/2004 | Peck et al. |
| 6,703,209 B1 | 3/2004 | Baetscher et al. |
| 6,706,293 B1 | 3/2004 | Quintanilla Almagro et al. |
| 6,709,864 B1 | 3/2004 | Pittenger et al. |
| 6,712,850 B2 | 3/2004 | Vyakamam et al. |
| 6,719,969 B1 | 4/2004 | Hogaboam et al. |
| 6,719,970 B1 | 4/2004 | Costantino et al. |
| 6,720,340 B1 | 4/2004 | Cooke et al. |
| 6,730,314 B2 | 5/2004 | Jeschke et al. |
| 6,730,315 B2 | 5/2004 | Usala et al. |
| 6,730,510 B2 | 5/2004 | Roos et al. |
| 6,733,746 B2 | 5/2004 | Daley et al. |
| 6,734,000 B2 | 5/2004 | Chin et al. |
| 6,740,493 B1 | 5/2004 | Long et al. |
| 6,759,039 B2 | 7/2004 | Tsang et al. |
| 6,759,245 B1 | 7/2004 | Toner et al. |
| 6,761,883 B2 | 7/2004 | Weissman et al. |
| 6,761,887 B1 | 7/2004 | Kavalkovich et al. |
| 6,767,699 B2 | 7/2004 | Polo et al. |
| 6,767,737 B1 | 7/2004 | Wilson et al. |
| 6,767,738 B1 | 7/2004 | Gage et al. |
| 6,767,740 B2 | 7/2004 | Sramek et al. |
| 6,770,478 B2 | 8/2004 | Crowe et al. |
| 6,777,227 B2 | 8/2004 | Ricci et al. |
| 6,777,231 B1 | 8/2004 | Katz et al. |
| 6,780,612 B1 | 8/2004 | Ford et al. |
| 6,787,355 B1 | 9/2004 | Miller et al. |
| 6,790,455 B2 | 9/2004 | Chu et al. |
| 6,793,939 B2 | 9/2004 | Badylak |
| 6,797,269 B2 | 9/2004 | Mosca et al. |
| 6,797,514 B2 | 9/2004 | Berenson et al. |
| 6,800,480 B1 | 10/2004 | Bodnar et al. |
| 6,802,971 B2 | 10/2004 | Gorsuch et al. |
| 6,805,860 B1 | 10/2004 | Alt |
| 6,809,117 B2 | 10/2004 | Enikolopov et al. |
| 6,811,773 B1 | 11/2004 | Gentz et al. |
| 6,811,776 B2 | 11/2004 | Kale et al. |
| 6,814,961 B1 | 11/2004 | Jensen et al. |
| 6,821,513 B1 | 11/2004 | Fleming |
| 6,821,790 B2 | 11/2004 | Mahant et al. |
| 6,828,145 B2 | 12/2004 | Avital et al. |
| 6,833,269 B2 | 12/2004 | Carpenter |
| 6,835,377 B2 | 12/2004 | Goldberg et al. |
| 6,835,566 B2 | 12/2004 | Smith et al. |
| 6,838,284 B2 | 1/2005 | de Bruijn et al. |
| 6,841,150 B2 | 1/2005 | Halvorsen et al. |
| 6,841,151 B2 | 1/2005 | Stringer |
| 6,841,294 B1 | 1/2005 | Morrissey et al. |
| 6,841,355 B2 | 1/2005 | Livant |
| 6,841,386 B2 | 1/2005 | Kraus et al. |
| 6,841,542 B2 | 1/2005 | Bartelmez et al. |
| 6,844,011 B1 | 1/2005 | Faustman |
| 6,849,051 B2 | 2/2005 | Sramek et al. |
| 6,849,255 B2 | 2/2005 | Gazit et al. |
| 6,849,454 B2 | 2/2005 | Kelly et al. |
| 6,849,662 B2 | 2/2005 | Enikolopov et al. |
| 6,852,308 B2 | 2/2005 | Kohn et al. |

(56) References Cited

U.S. PATENT DOCUMENTS

| | | |
|---|---|---|
| 6,852,321 B2 | 2/2005 | Colucci et al. |
| 6,852,533 B1 | 2/2005 | Rafii et al. |
| 6,855,242 B1 | 2/2005 | Comninellis et al. |
| 6,855,542 B2 | 2/2005 | DiMilla et al. |
| 6,863,900 B2 | 3/2005 | Kadiyala et al. |
| 6,866,843 B2 | 3/2005 | Habener et al. |
| 6,872,389 B1 | 3/2005 | Faris |
| 6,875,430 B2 | 4/2005 | McIntosh et al. |
| 6,887,600 B2 | 5/2005 | Morrissey et al. |
| 6,887,704 B2 | 5/2005 | Peled et al. |
| 6,908,763 B1 | 6/2005 | Akashi et al. |
| 6,911,201 B1 | 6/2005 | Merchav et al. |
| 6,914,279 B2 | 7/2005 | Lu et al. |
| 6,939,955 B2 | 9/2005 | Rameshwar |
| 6,965,018 B2 | 11/2005 | Mikesell et al. |
| 6,979,321 B2 | 12/2005 | Geis et al. |
| 6,988,004 B2 | 1/2006 | Kanno et al. |
| 7,008,394 B2 | 3/2006 | Geise et al. |
| 7,015,037 B1 | 3/2006 | Furcht et al. |
| 7,029,666 B2 | 4/2006 | Bruder et al. |
| 7,033,339 B1 | 4/2006 | Lynn |
| 7,045,098 B2 | 5/2006 | Stephens |
| 7,052,517 B2 | 5/2006 | Murphy et al. |
| 7,056,493 B2 | 6/2006 | Kohn et al. |
| 7,118,672 B2 | 10/2006 | Husain et al. |
| 7,122,178 B1 | 10/2006 | Simmons et al. |
| 7,160,719 B2 | 1/2007 | Nyberg |
| 7,169,295 B2 | 1/2007 | Husain et al. |
| 7,172,696 B1 | 2/2007 | Martinez et al. |
| 7,175,763 B2 | 2/2007 | Husain et al. |
| 7,192,776 B2 | 3/2007 | Stephens |
| 7,195,711 B2 | 3/2007 | Gorsuch et al. |
| 7,250,154 B2 | 7/2007 | Kohn et al. |
| 7,271,234 B2 | 9/2007 | Kohn et al. |
| 7,294,259 B2 | 11/2007 | Cote et al. |
| 7,300,571 B2 | 11/2007 | Cote et al. |
| 7,303,676 B2 | 12/2007 | Husain et al. |
| 7,303,677 B2 | 12/2007 | Cote et al. |
| 7,341,062 B2 | 3/2008 | Chachques et al. |
| 7,358,001 B2 | 4/2008 | Morrissey et al. |
| 7,361,493 B1 | 4/2008 | Hammond et al. |
| 7,368,169 B2 | 5/2008 | Kohn et al. |
| 7,378,271 B2 | 5/2008 | Bader |
| 7,399,872 B2 | 7/2008 | Webster et al. |
| 7,416,884 B2 | 8/2008 | Gemmiti et al. |
| 7,425,440 B2 | 9/2008 | Malinge et al. |
| 7,435,586 B2 | 10/2008 | Bartlett et al. |
| 7,438,902 B2 | 10/2008 | Habener et al. |
| 7,439,057 B2 | 10/2008 | Frangos et al. |
| 7,452,529 B2 | 11/2008 | Brown, Jr. et al. |
| 7,491,388 B1 | 2/2009 | McIntosh et al. |
| 7,494,811 B2 | 2/2009 | Wolfinbarger, Jr. et al. |
| 7,514,074 B2 | 4/2009 | Pittenger et al. |
| 7,514,075 B2 | 4/2009 | Hedrick et al. |
| 7,524,676 B2 | 4/2009 | Reiter et al. |
| 7,534,609 B2 | 5/2009 | Merchav et al. |
| 7,572,374 B2 | 8/2009 | Gorsuch et al. |
| 7,579,179 B2 | 8/2009 | Bryhan et al. |
| 7,585,412 B2 | 9/2009 | Gorsuch et al. |
| 7,588,938 B2 | 9/2009 | Ma |
| 7,598,075 B2 | 10/2009 | Smith et al. |
| 7,608,447 B2 | 10/2009 | Cohen et al. |
| 7,659,118 B2 | 2/2010 | Furcht et al. |
| 7,678,573 B2 | 3/2010 | Merchav et al. |
| 7,682,823 B1 | 3/2010 | Runyon |
| 7,722,896 B2 | 5/2010 | Kohn et al. |
| D620,732 S | 8/2010 | Andrews |
| 7,838,122 B2 | 11/2010 | Kohn et al. |
| 7,838,289 B2 | 11/2010 | Furcht et al. |
| 7,892,829 B2 | 2/2011 | Pittenger et al. |
| 7,919,307 B2 | 4/2011 | Klaus et al. |
| 7,927,587 B2 | 4/2011 | Blazer et al. |
| 7,989,851 B2 | 8/2011 | Lu et al. |
| 8,008,528 B2 | 8/2011 | Kohn et al. |
| 8,034,365 B2 | 10/2011 | Baluca |
| 8,075,881 B2 | 12/2011 | Verfaillie et al. |
| 8,147,824 B2 | 4/2012 | Maziarz et al. |
| 8,147,863 B2 | 4/2012 | Kohn et al. |
| 8,158,120 B2 | 4/2012 | Pittenger et al. |
| 8,158,121 B2 | 4/2012 | Pittenger et al. |
| 8,252,280 B1 | 8/2012 | Verfaillie et al. |
| 8,252,887 B2 | 8/2012 | Bolikal et al. |
| 8,288,159 B2 | 10/2012 | Warren et al. |
| 8,288,590 B2 | 10/2012 | Kohn et al. |
| 8,298,823 B2 | 10/2012 | Warren et al. |
| 8,361,453 B2 | 1/2013 | Uhrich et al. |
| 8,377,683 B2 | 2/2013 | Lu et al. |
| 8,383,397 B2 | 2/2013 | Wojciechowski et al. |
| 8,383,806 B2 | 2/2013 | Rameshwar |
| 8,399,245 B2 | 3/2013 | Leuthaeuser et al. |
| 8,415,449 B2 | 4/2013 | Kohn et al. |
| 8,435,781 B2 | 5/2013 | Kodama |
| 8,461,289 B2 | 6/2013 | Kohn et al. |
| 8,474,955 B2 | 7/2013 | Lucas et al. |
| 8,476,399 B2 | 7/2013 | Bolikal et al. |
| 8,486,621 B2 | 7/2013 | Luo et al. |
| 8,486,695 B2 | 7/2013 | Danilkovitch et al. |
| 8,492,140 B2 | 7/2013 | Smith et al. |
| 8,492,150 B2 | 7/2013 | Parker et al. |
| 8,524,496 B2 | 9/2013 | Meiron et al. |
| 8,529,888 B2 | 9/2013 | Meiron et al. |
| 8,540,499 B2 | 9/2013 | Page et al. |
| 8,551,511 B2 | 10/2013 | Brandom et al. |
| 8,580,249 B2 | 11/2013 | Blazar et al. |
| 8,678,638 B2 | 3/2014 | Wong |
| 8,852,570 B2 | 10/2014 | Pittenger et al. |
| 8,852,571 B2 | 10/2014 | Pittenger et al. |
| 8,852,572 B2 | 10/2014 | Pittenger et al. |
| 8,852,573 B2 | 10/2014 | Pittenger et al. |
| 8,852,574 B2 | 10/2014 | Pittenger et al. |
| 8,852,575 B2 | 10/2014 | Pittenger et al. |
| 9,109,193 B2 | 8/2015 | Galliher et al. |
| 9,180,676 B2 | 11/2015 | Dyer et al. |
| 9,220,810 B2 | 12/2015 | Ma et al. |
| 9,441,195 B2 | 9/2016 | Wojciechowski et al. |
| 9,534,198 B2 | 1/2017 | Page et al. |
| 9,732,313 B2 | 8/2017 | Hirschel et al. |
| 10,093,956 B2 | 10/2018 | Hirschel et al. |
| 10,494,421 B2 | 12/2019 | Castillo |
| 2001/0017188 A1 | 8/2001 | Cooley et al. |
| 2001/0020086 A1 | 9/2001 | Hubbell et al. |
| 2001/0021516 A1 | 9/2001 | Wei et al. |
| 2001/0029046 A1 | 10/2001 | Beaulieu |
| 2001/0033834 A1 | 10/2001 | Wilkison et al. |
| 2001/0036663 A1 | 11/2001 | Kraus et al. |
| 2001/0041687 A1 | 11/2001 | Mruk |
| 2001/0044413 A1 | 11/2001 | Pierce et al. |
| 2001/0049139 A1 | 12/2001 | Lagasse et al. |
| 2002/0015724 A1 | 2/2002 | Yang et al. |
| 2002/0018804 A1 | 2/2002 | Austin et al. |
| 2002/0028510 A1 | 3/2002 | Sanberg et al. |
| 2002/0031757 A1 | 3/2002 | Ohgushi et al. |
| 2002/0037278 A1 | 3/2002 | Ueno et al. |
| 2002/0045260 A1 | 4/2002 | Hung et al. |
| 2002/0064869 A1 | 5/2002 | Ebner et al. |
| 2002/0076400 A1 | 6/2002 | Katz et al. |
| 2002/0077687 A1 | 6/2002 | Ahn |
| 2002/0082698 A1 | 6/2002 | Parenteau et al. |
| 2002/0116054 A1 | 8/2002 | Lundell et al. |
| 2002/0128581 A1 | 9/2002 | Vishnoi et al. |
| 2002/0128582 A1 | 9/2002 | Farrell et al. |
| 2002/0128583 A1 | 9/2002 | Min et al. |
| 2002/0128584 A1 | 9/2002 | Brown et al. |
| 2002/0130100 A1 | 9/2002 | Smith |
| 2002/0132343 A1 | 9/2002 | Lum |
| 2002/0139743 A1 | 10/2002 | Critz et al. |
| 2002/0142457 A1 | 10/2002 | Umezawa et al. |
| 2002/0146678 A1 | 10/2002 | Benvenisty |
| 2002/0146817 A1 | 10/2002 | Cannon et al. |
| 2002/0150989 A1 | 10/2002 | Greene et al. |
| 2002/0151056 A1 | 10/2002 | Sasai et al. |
| 2002/0159981 A1 | 10/2002 | Peled et al. |
| 2002/0160032 A1 | 10/2002 | Long et al. |
| 2002/0160510 A1 | 10/2002 | Hariri |

(56) References Cited

U.S. PATENT DOCUMENTS

| | | |
|---|---|---|
| 2002/0168765 A1 | 11/2002 | Prockop et al. |
| 2002/0169408 A1 | 11/2002 | Beretta et al. |
| 2002/0182241 A1 | 12/2002 | Borenstein et al. |
| 2002/0182664 A1 | 12/2002 | Dolecek et al. |
| 2002/0188962 A1 | 12/2002 | Denhardt et al. |
| 2002/0197240 A1 | 12/2002 | Chiu |
| 2003/0021850 A1 | 1/2003 | Xu |
| 2003/0022390 A1 | 1/2003 | Stephens |
| 2003/0027330 A1 | 2/2003 | Lanza et al. |
| 2003/0027331 A1 | 2/2003 | Yan et al. |
| 2003/0032143 A1 | 2/2003 | Neff et al. |
| 2003/0036168 A1 | 2/2003 | Ni et al. |
| 2003/0040113 A1 | 2/2003 | Mizuno et al. |
| 2003/0049236 A1 | 3/2003 | Kassem et al. |
| 2003/0054331 A1 | 3/2003 | Fraser et al. |
| 2003/0059851 A1 | 3/2003 | Smith |
| 2003/0059939 A1 | 3/2003 | Page et al. |
| 2003/0078345 A1 | 4/2003 | Morrisey |
| 2003/0082795 A1 | 5/2003 | Shuler et al. |
| 2003/0086915 A1 | 5/2003 | Rader et al. |
| 2003/0089471 A1 | 5/2003 | Gehr et al. |
| 2003/0092101 A1 | 5/2003 | Ni et al. |
| 2003/0101465 A1 | 5/2003 | Lawman et al. |
| 2003/0103957 A1 | 6/2003 | McKerracher |
| 2003/0104568 A1 | 6/2003 | Lee |
| 2003/0113813 A1 | 6/2003 | Heidaran et al. |
| 2003/0113910 A1 | 6/2003 | Levanduski |
| 2003/0124091 A1 | 7/2003 | Tuse et al. |
| 2003/0124721 A1 | 7/2003 | Cheatham et al. |
| 2003/0130593 A1 | 7/2003 | Gonzalez |
| 2003/0133918 A1 | 7/2003 | Sherley |
| 2003/0138950 A1 | 7/2003 | McAllister et al. |
| 2003/0143727 A1 | 7/2003 | Chang |
| 2003/0148152 A1 | 8/2003 | Morrisey |
| 2003/0149011 A1 | 8/2003 | Ackerman et al. |
| 2003/0152558 A1 | 8/2003 | Luft et al. |
| 2003/0157078 A1 | 8/2003 | Hall et al. |
| 2003/0157709 A1 | 8/2003 | DiMilla et al. |
| 2003/0161817 A1 | 8/2003 | Young et al. |
| 2003/0166272 A1 | 9/2003 | Abuljadayel |
| 2003/0170214 A1 | 9/2003 | Bader |
| 2003/0180296 A1 | 9/2003 | Salcedo et al. |
| 2003/0185817 A1 | 10/2003 | Thomas et al. |
| 2003/0202938 A1 | 10/2003 | Rameshwar |
| 2003/0203483 A1 | 10/2003 | Seshi |
| 2003/0204323 A1 | 10/2003 | Morrisey |
| 2003/0211602 A1 | 11/2003 | Atala |
| 2003/0211603 A1 | 11/2003 | Earp et al. |
| 2003/0216718 A1 | 11/2003 | Hamblin et al. |
| 2003/0219898 A1 | 11/2003 | Sugaya et al. |
| 2003/0223968 A1 | 12/2003 | Yang |
| 2003/0224420 A1 | 12/2003 | Hellerstein et al. |
| 2003/0224510 A1 | 12/2003 | Yamaguchi et al. |
| 2003/0225010 A1 | 12/2003 | Rameshwar |
| 2003/0232432 A1 | 12/2003 | Bhat |
| 2003/0232752 A1 | 12/2003 | Freeman et al. |
| 2003/0235909 A1 | 12/2003 | Hariri et al. |
| 2004/0009158 A1 | 1/2004 | Sands et al. |
| 2004/0009589 A1 | 1/2004 | Levenberg et al. |
| 2004/0010231 A1 | 1/2004 | Leonhardt et al. |
| 2004/0014209 A1 | 1/2004 | Lassar et al. |
| 2004/0018174 A1 | 1/2004 | Palasis |
| 2004/0018617 A1 | 1/2004 | Hwang |
| 2004/0023324 A1 | 2/2004 | Sakano et al. |
| 2004/0023370 A1 | 2/2004 | Yu et al. |
| 2004/0033214 A1 | 2/2004 | Young et al. |
| 2004/0033599 A1 | 2/2004 | Rosenberg |
| 2004/0037811 A1 | 2/2004 | Penn et al. |
| 2004/0037815 A1 | 2/2004 | Clarke et al. |
| 2004/0038316 A1 | 2/2004 | Kaiser et al. |
| 2004/0053869 A1 | 3/2004 | Andrews et al. |
| 2004/0062753 A1 | 4/2004 | Rezania et al. |
| 2004/0063205 A1 | 4/2004 | Xu |
| 2004/0067585 A1 | 4/2004 | Wang et al. |
| 2004/0071668 A1 | 4/2004 | Bays et al. |
| 2004/0072259 A1 | 4/2004 | Scadden et al. |
| 2004/0077079 A1 | 4/2004 | Storgaard et al. |
| 2004/0079248 A1 | 4/2004 | Mayer et al. |
| 2004/0087016 A1 | 5/2004 | Keating et al. |
| 2004/0091936 A1 | 5/2004 | West |
| 2004/0096476 A1 | 5/2004 | Uhrich et al. |
| 2004/0097408 A1 | 5/2004 | Leder et al. |
| 2004/0101959 A1 | 5/2004 | Marko et al. |
| 2004/0107453 A1 | 6/2004 | Furcht et al. |
| 2004/0110286 A1 | 6/2004 | Bhatia |
| 2004/0115804 A1 | 6/2004 | Fu et al. |
| 2004/0115806 A1 | 6/2004 | Fu |
| 2004/0120932 A1 | 6/2004 | Zahner |
| 2004/0121461 A1 | 6/2004 | Honmou et al. |
| 2004/0121464 A1 | 6/2004 | Rathjen et al. |
| 2004/0126405 A1 | 7/2004 | Sahatjian et al. |
| 2004/0128077 A1 | 7/2004 | Koebler et al. |
| 2004/0131601 A1 | 7/2004 | Epstein et al. |
| 2004/0132184 A1 | 7/2004 | Dennis et al. |
| 2004/0136967 A1 | 7/2004 | Weiss et al. |
| 2004/0137612 A1 | 7/2004 | Baksh |
| 2004/0137613 A1 | 7/2004 | Vacanti et al. |
| 2004/0143174 A1 | 7/2004 | Brubaker |
| 2004/0143863 A1 | 7/2004 | Li et al. |
| 2004/0151700 A1 | 8/2004 | Harlan et al. |
| 2004/0151701 A1 | 8/2004 | Kim et al. |
| 2004/0151706 A1 | 8/2004 | Shakhov et al. |
| 2004/0151729 A1 | 8/2004 | Michalopoulos et al. |
| 2004/0152190 A1 | 8/2004 | Sumita |
| 2004/0161419 A1 | 8/2004 | Strom et al. |
| 2004/0171533 A1 | 9/2004 | Zehentner et al. |
| 2004/0180347 A1 | 9/2004 | Stanton et al. |
| 2004/0191902 A1 | 9/2004 | Hambor et al. |
| 2004/0197310 A1 | 10/2004 | Sanberg et al. |
| 2004/0197375 A1 | 10/2004 | Rezania et al. |
| 2004/0208786 A1 | 10/2004 | Kevy et al. |
| 2004/0214275 A1 | 10/2004 | Soejima et al. |
| 2004/0219134 A1 | 11/2004 | Naughton et al. |
| 2004/0219136 A1 | 11/2004 | Hariri |
| 2004/0219563 A1 | 11/2004 | West et al. |
| 2004/0224403 A1 | 11/2004 | Bhatia |
| 2004/0229351 A1 | 11/2004 | Rodriguez et al. |
| 2004/0234972 A1 | 11/2004 | Owens et al. |
| 2004/0235158 A1 | 11/2004 | Bartlett et al. |
| 2004/0235160 A1 | 11/2004 | Nishikawa et al. |
| 2004/0235166 A1 | 11/2004 | Prockop et al. |
| 2004/0242469 A1 | 12/2004 | Lee et al. |
| 2004/0258669 A1 | 12/2004 | Dzau et al. |
| 2004/0259242 A1 | 12/2004 | Malinge et al. |
| 2004/0259254 A1 | 12/2004 | Honmou et al. |
| 2004/0260058 A1 | 12/2004 | Scheek et al. |
| 2004/0260318 A1 | 12/2004 | Hunter et al. |
| 2004/0265996 A1 | 12/2004 | Schwarz et al. |
| 2005/0002914 A1 | 1/2005 | Rosen et al. |
| 2005/0003460 A1 | 1/2005 | Nilsson et al. |
| 2005/0003527 A1 | 1/2005 | Lang et al. |
| 2005/0003534 A1 | 1/2005 | Huberman et al. |
| 2005/0008624 A1 | 1/2005 | Peled et al. |
| 2005/0008626 A1 | 1/2005 | Fraser et al. |
| 2005/0009178 A1 | 1/2005 | Yost et al. |
| 2005/0009179 A1 | 1/2005 | Gemmiti et al. |
| 2005/0009181 A1 | 1/2005 | Black et al. |
| 2005/0013804 A1 | 1/2005 | Kato et al. |
| 2005/0014252 A1 | 1/2005 | Chu et al. |
| 2005/0014253 A1 | 1/2005 | Ehmann et al. |
| 2005/0014254 A1 | 1/2005 | Kruse |
| 2005/0014255 A1 | 1/2005 | Tang et al. |
| 2005/0019801 A1 | 1/2005 | Rubin et al. |
| 2005/0019908 A1 | 1/2005 | Hariri |
| 2005/0019910 A1 | 1/2005 | Takagi et al. |
| 2005/0019911 A1 | 1/2005 | Gronthos et al. |
| 2005/0026836 A1 | 2/2005 | Dack et al. |
| 2005/0031587 A1 | 2/2005 | Tsutsui et al. |
| 2005/0031595 A1 | 2/2005 | Peled et al. |
| 2005/0031598 A1 | 2/2005 | Levenberg et al. |
| 2005/0032122 A1 | 2/2005 | Hwang et al. |
| 2005/0032207 A1 | 2/2005 | Wobus et al. |
| 2005/0032209 A1 | 2/2005 | Messina et al. |
| 2005/0032218 A1 | 2/2005 | Gerlach |

(56) References Cited

U.S. PATENT DOCUMENTS

| | | |
|---|---|---|
| 2005/0036980 A1 | 2/2005 | Chaney et al. |
| 2005/0037488 A1 | 2/2005 | Mitalipova et al. |
| 2005/0037490 A1 | 2/2005 | Rosenberg et al. |
| 2005/0037492 A1 | 2/2005 | Xu et al. |
| 2005/0037493 A1 | 2/2005 | Mandalam et al. |
| 2005/0037949 A1 | 2/2005 | O'Brien et al. |
| 2005/0106119 A1 | 5/2005 | Brandom et al. |
| 2005/0106127 A1 | 5/2005 | Kraus et al. |
| 2005/0112447 A1 | 5/2005 | Fletcher et al. |
| 2005/0112762 A1 | 5/2005 | Hart et al. |
| 2005/0118712 A1 | 6/2005 | Tsai et al. |
| 2005/0130297 A1 | 6/2005 | Sarem et al. |
| 2005/0136093 A1 | 6/2005 | Denk |
| 2005/0137517 A1 | 6/2005 | Blickhan et al. |
| 2005/0142162 A1 | 6/2005 | Hunter et al. |
| 2005/0149157 A1 | 7/2005 | Hunter et al. |
| 2005/0152946 A1 | 7/2005 | Hunter et al. |
| 2005/0158289 A1 | 7/2005 | Simmons et al. |
| 2005/0172340 A1 | 8/2005 | Logvinov et al. |
| 2005/0175665 A1 | 8/2005 | Hunter et al. |
| 2005/0175703 A1 | 8/2005 | Hunter et al. |
| 2005/0178395 A1 | 8/2005 | Hunter et al. |
| 2005/0178396 A1 | 8/2005 | Hunter et al. |
| 2005/0180957 A1 | 8/2005 | Scharp et al. |
| 2005/0181502 A1 | 8/2005 | Furcht et al. |
| 2005/0182463 A1 | 8/2005 | Hunter et al. |
| 2005/0183731 A1 | 8/2005 | Hunter et al. |
| 2005/0186244 A1 | 8/2005 | Hunter et al. |
| 2005/0186671 A1 | 8/2005 | Cannon et al. |
| 2005/0187140 A1 | 8/2005 | Hunter et al. |
| 2005/0196421 A1 | 9/2005 | Hunter et al. |
| 2005/0208095 A1 | 9/2005 | Hunter et al. |
| 2005/0244963 A1 | 11/2005 | Teplyashin |
| 2005/0249731 A1 | 11/2005 | Aslan et al. |
| 2005/0255118 A1 | 11/2005 | Wehner |
| 2005/0261674 A1 | 11/2005 | Nobis et al. |
| 2005/0277577 A1 | 12/2005 | Hunter et al. |
| 2005/0281790 A1 | 12/2005 | Simmons et al. |
| 2005/0282733 A1 | 12/2005 | Prins et al. |
| 2005/0283844 A1 | 12/2005 | Furcht et al. |
| 2006/0002900 A1 | 1/2006 | Binder et al. |
| 2006/0008452 A1 | 1/2006 | Simmons et al. |
| 2006/0019389 A1 | 1/2006 | Yayon et al. |
| 2006/0054941 A1 | 3/2006 | Lu et al. |
| 2006/0083720 A1 | 4/2006 | Fraser et al. |
| 2006/0099198 A1 | 5/2006 | Thomson et al. |
| 2006/0166364 A1 | 7/2006 | Senesac |
| 2006/0172008 A1 | 8/2006 | Yayon et al. |
| 2006/0193840 A1 | 8/2006 | Gronthos et al. |
| 2006/0228798 A1 | 10/2006 | Verfaillie et al. |
| 2006/0239909 A1 | 10/2006 | Anderson et al. |
| 2006/0258586 A1 | 11/2006 | Sheppard et al. |
| 2006/0258933 A1 | 11/2006 | Ellis et al. |
| 2006/0259998 A1 | 11/2006 | Brumbley et al. |
| 2006/0280748 A1 | 12/2006 | Buckheit |
| 2006/0286077 A1 | 12/2006 | Gronthos et al. |
| 2007/0005148 A1 | 1/2007 | Barofsky et al. |
| 2007/0011752 A1 | 1/2007 | Paleyanda |
| 2007/0042462 A1 | 2/2007 | Hildinger |
| 2007/0065938 A1 | 3/2007 | Gronthos et al. |
| 2007/0105222 A1 | 5/2007 | Wolfinbarger et al. |
| 2007/0116612 A1 | 5/2007 | Williamson |
| 2007/0117180 A1 | 5/2007 | Morikawa et al. |
| 2007/0123996 A1 | 5/2007 | Sugaya et al. |
| 2007/0166834 A1 | 7/2007 | Williamson et al. |
| 2007/0178071 A1 | 8/2007 | Westenfelder |
| 2007/0196421 A1 | 8/2007 | Hunter et al. |
| 2007/0197957 A1 | 8/2007 | Hunter et al. |
| 2007/0198063 A1 | 8/2007 | Hunter et al. |
| 2007/0202485 A1 | 8/2007 | Nees et al. |
| 2007/0203330 A1 | 8/2007 | Kretschmar et al. |
| 2007/0208134 A1 | 9/2007 | Hunter et al. |
| 2007/0258943 A1 | 11/2007 | Penn et al. |
| 2007/0274970 A1 | 11/2007 | Gordon et al. |
| 2007/0275457 A1 | 11/2007 | Granchelli et al. |
| 2007/0295651 A1 | 12/2007 | Martinez et al. |
| 2007/0298015 A1 | 12/2007 | Beer et al. |
| 2008/0003663 A1 | 1/2008 | Bryhan et al. |
| 2008/0009458 A1 | 1/2008 | Dornan et al. |
| 2008/0032398 A1 | 2/2008 | Cannon et al. |
| 2008/0050770 A1 | 2/2008 | Zhang et al. |
| 2008/0063600 A1 | 3/2008 | Aguzzi et al. |
| 2008/0064649 A1 | 3/2008 | Rameshwar |
| 2008/0069807 A1 | 3/2008 | Jy et al. |
| 2008/0095676 A1 | 4/2008 | Andretta |
| 2008/0095690 A1 | 4/2008 | Liu |
| 2008/0103412 A1 | 5/2008 | Chin |
| 2008/0110827 A1 | 5/2008 | Cote et al. |
| 2008/0113426 A1 | 5/2008 | Smith et al. |
| 2008/0113440 A1 | 5/2008 | Gurney et al. |
| 2008/0153077 A1 | 6/2008 | Henry |
| 2008/0160597 A1 | 7/2008 | van der Heiden et al. |
| 2008/0166808 A1 | 7/2008 | Nyberg |
| 2008/0181879 A1 | 7/2008 | Catelas et al. |
| 2008/0190857 A1 | 8/2008 | Beretta et al. |
| 2008/0194017 A1 | 8/2008 | Esser et al. |
| 2008/0206831 A1 | 8/2008 | Coffey et al. |
| 2008/0220524 A1 | 9/2008 | Noll et al. |
| 2008/0220526 A1 | 9/2008 | Ellison et al. |
| 2008/0221443 A1 | 9/2008 | Ritchie et al. |
| 2008/0227189 A1 | 9/2008 | Bader |
| 2008/0268165 A1 | 10/2008 | Fekety et al. |
| 2008/0306095 A1 | 12/2008 | Crawford |
| 2009/0004738 A1 | 1/2009 | Merchav et al. |
| 2009/0011399 A1 | 1/2009 | Fischer |
| 2009/0047289 A1 | 2/2009 | Denhardt et al. |
| 2009/0074728 A1 | 3/2009 | Gronthos et al. |
| 2009/0075881 A1 | 3/2009 | Catelas et al. |
| 2009/0076481 A1 | 3/2009 | Stegmann et al. |
| 2009/0081770 A1 | 3/2009 | Srienc et al. |
| 2009/0081797 A1 | 3/2009 | Fadeev et al. |
| 2009/0092608 A1 | 4/2009 | Ni et al. |
| 2009/0098103 A1 | 4/2009 | Madison et al. |
| 2009/0098645 A1 | 4/2009 | Fang et al. |
| 2009/0100944 A1 | 4/2009 | Newby |
| 2009/0104163 A1 | 4/2009 | Deans et al. |
| 2009/0104692 A1 | 4/2009 | Bartfeld et al. |
| 2009/0104699 A1 | 4/2009 | Newby et al. |
| 2009/0118161 A1 | 5/2009 | Cruz |
| 2009/0181087 A1 | 7/2009 | Kraus et al. |
| 2009/0183581 A1 | 7/2009 | Wilkinson et al. |
| 2009/0191627 A1 | 7/2009 | Fadeev et al. |
| 2009/0191632 A1 | 7/2009 | Fadeev et al. |
| 2009/0191634 A1 | 7/2009 | Martin et al. |
| 2009/0203065 A1 | 8/2009 | Gehman et al. |
| 2009/0203129 A1 | 8/2009 | Furcht et al. |
| 2009/0203130 A1 | 8/2009 | Furcht et al. |
| 2009/0214382 A1 | 8/2009 | Burgess et al. |
| 2009/0214481 A1 | 8/2009 | Muhs et al. |
| 2009/0214652 A1 | 8/2009 | Hunter et al. |
| 2009/0215022 A1 | 8/2009 | Page et al. |
| 2009/0227024 A1 | 9/2009 | Baker et al. |
| 2009/0227027 A1 | 9/2009 | Baker et al. |
| 2009/0233334 A1 | 9/2009 | Hildinger et al. |
| 2009/0233353 A1 | 9/2009 | Furcht et al. |
| 2009/0233354 A1 | 9/2009 | Furcht et al. |
| 2009/0258379 A1 | 10/2009 | Klein et al. |
| 2009/0269841 A1 | 10/2009 | Wojciechowski et al. |
| 2009/0270725 A1 | 10/2009 | Leimbach et al. |
| 2009/0280153 A1 | 11/2009 | Hunter et al. |
| 2009/0280565 A1 | 11/2009 | Jolicoeur et al. |
| 2009/0291890 A1 | 11/2009 | Madison et al. |
| 2010/0009409 A1 | 1/2010 | Hubbell et al. |
| 2010/0021954 A1 | 1/2010 | Deshayes et al. |
| 2010/0021990 A1 | 1/2010 | Edwards et al. |
| 2010/0028311 A1 | 2/2010 | Motlagh et al. |
| 2010/0075410 A1 | 3/2010 | Desai et al. |
| 2010/0086481 A1 | 4/2010 | Baird et al. |
| 2010/0092536 A1 | 4/2010 | Hunter et al. |
| 2010/0093607 A1 | 4/2010 | Dickneite |
| 2010/0111910 A1 | 5/2010 | Rakoczy |
| 2010/0129376 A1 | 5/2010 | Denhardt et al. |
| 2010/0129912 A1 | 5/2010 | Su et al. |
| 2010/0136091 A1 | 6/2010 | Moghe et al. |

(56) References Cited

U.S. PATENT DOCUMENTS

| | | |
|---|---|---|
| 2010/0144634 A1 | 6/2010 | Zheng et al. |
| 2010/0183561 A1 | 7/2010 | Sakthivel et al. |
| 2010/0183585 A1 | 7/2010 | Van Zant et al. |
| 2010/0203020 A1 | 8/2010 | Ghosh |
| 2010/0230203 A1 | 9/2010 | Karayianni |
| 2010/0248366 A1 | 9/2010 | Fadeev et al. |
| 2010/0278933 A1 | 11/2010 | Sayeski et al. |
| 2010/0285453 A1 | 11/2010 | Goodrich |
| 2010/0285590 A1 | 11/2010 | Verfaillie et al. |
| 2010/0291180 A1 | 11/2010 | Uhrich |
| 2010/0291181 A1 | 11/2010 | Uhrich et al. |
| 2010/0297234 A1 | 11/2010 | Sugino et al. |
| 2010/0304427 A1 | 12/2010 | Faris et al. |
| 2010/0304482 A1 | 12/2010 | Deshayes et al. |
| 2010/0310524 A1 | 12/2010 | Bechor et al. |
| 2010/0316446 A1 | 12/2010 | Runyon |
| 2011/0085746 A1 | 4/2011 | Wong et al. |
| 2011/0111498 A1 | 5/2011 | Oh et al. |
| 2011/0129447 A1 | 6/2011 | Meretzki et al. |
| 2011/0129486 A1 | 6/2011 | Meiron |
| 2011/0143433 A1 | 6/2011 | Oh et al. |
| 2011/0159584 A1 | 6/2011 | Gibbons et al. |
| 2011/0171182 A1 | 7/2011 | Abelman |
| 2011/0171659 A1 | 7/2011 | Furcht et al. |
| 2011/0177595 A1 | 7/2011 | Furcht et al. |
| 2011/0212493 A1 | 9/2011 | Hirschel et al. |
| 2011/0256108 A1 | 10/2011 | Meiron et al. |
| 2011/0256160 A1 | 10/2011 | Meiron et al. |
| 2011/0293583 A1 | 12/2011 | Aberman |
| 2012/0028352 A1 | 2/2012 | Oh et al. |
| 2012/0051976 A1 | 3/2012 | Lu et al. |
| 2012/0058554 A1 | 3/2012 | Deshayes et al. |
| 2012/0064047 A1 | 3/2012 | Verfaillie et al. |
| 2012/0064583 A1 | 3/2012 | Edwards et al. |
| 2012/0118919 A1 | 5/2012 | Cianciolo |
| 2012/0122220 A1 | 5/2012 | Merchav et al. |
| 2012/0135043 A1 | 5/2012 | Maziarz et al. |
| 2012/0145580 A1 | 6/2012 | Paruit et al. |
| 2012/0156779 A1 | 6/2012 | Anneren et al. |
| 2012/0178885 A1 | 7/2012 | Kohn et al. |
| 2012/0189713 A1 | 7/2012 | Kohn et al. |
| 2012/0208039 A1 | 8/2012 | Barbaroux et al. |
| 2012/0219531 A1 | 8/2012 | Oh et al. |
| 2012/0219737 A1 | 8/2012 | Sugino et al. |
| 2012/0226013 A1 | 9/2012 | Kohn et al. |
| 2012/0231519 A1 | 9/2012 | Bushman et al. |
| 2012/0237557 A1 | 9/2012 | Lewitus et al. |
| 2012/0295352 A1 | 11/2012 | Antwiler |
| 2012/0308531 A1 | 12/2012 | Pinxteren et al. |
| 2012/0315696 A1 | 12/2012 | Luitjens et al. |
| 2013/0004465 A1 | 1/2013 | Aberman |
| 2013/0039892 A1 | 2/2013 | Aberman |
| 2013/0058907 A1 | 3/2013 | Wojciechowski et al. |
| 2013/0059383 A1 | 3/2013 | Dijkhuizen Borgart et al. |
| 2013/0101561 A1 | 4/2013 | Sabaawy |
| 2013/0143313 A1 | 6/2013 | Niazi |
| 2013/0157353 A1 | 6/2013 | Dijkhuizen Borgart et al. |
| 2013/0259843 A1 | 10/2013 | Duda et al. |
| 2013/0319575 A1 | 12/2013 | Mendyk |
| 2013/0323213 A1 | 12/2013 | Meiron et al. |
| 2013/0337558 A1 | 12/2013 | Meiron et al. |
| 2014/0004553 A1 | 1/2014 | Parker et al. |
| 2014/0017209 A1 | 1/2014 | Aberman et al. |
| 2014/0030805 A1 | 1/2014 | Kasuto et al. |
| 2014/0051162 A1 | 2/2014 | Nankervis |
| 2014/0051167 A1 | 2/2014 | Nankervis et al. |
| 2014/0112893 A1 | 4/2014 | Tom et al. |
| 2014/0186937 A1 | 7/2014 | Smith et al. |
| 2014/0193895 A1 | 7/2014 | Smith et al. |
| 2014/0193911 A1 | 7/2014 | Newby et al. |
| 2014/0242039 A1 | 8/2014 | Meiron et al. |
| 2014/0248244 A1 | 9/2014 | Danilkovitch et al. |
| 2014/0315300 A1 | 10/2014 | Oh et al. |
| 2014/0342448 A1 | 11/2014 | Nagels |
| 2015/0004693 A1 | 1/2015 | Danilkovitch et al. |
| 2015/0104431 A1 | 4/2015 | Pittenger et al. |
| 2015/0111252 A1 | 4/2015 | Hirschel et al. |
| 2015/0125138 A1 | 5/2015 | Karnieli et al. |
| 2015/0175950 A1 | 6/2015 | Hirschel et al. |
| 2015/0225685 A1 | 8/2015 | Hirschel et al. |
| 2015/0247122 A1 | 9/2015 | Tom et al. |
| 2015/0259749 A1 | 9/2015 | Santos et al. |
| 2016/0362650 A1 | 12/2016 | Wojciechowski et al. |
| 2016/0362652 A1 | 12/2016 | Page et al. |
| 2018/0010082 A1 | 1/2018 | Jaques et al. |
| 2018/0030398 A1 | 2/2018 | Castillo |
| 2018/0155668 A1 | 6/2018 | Hirschel et al. |
| 2019/0194628 A1 | 6/2019 | Rao et al. |

FOREIGN PATENT DOCUMENTS

| | | | |
|---|---|---|---|
| DE | 10244859 A1 | 4/2004 | |
| DE | 10327988 A1 | 7/2004 | |
| DE | 102012200939 A1 | 7/2013 | |
| EP | 750938 A1 | 1/1997 | |
| EP | 906415 A1 | 4/1999 | |
| EP | 959980 A1 | 12/1999 | |
| EP | 1007631 A1 | 6/2000 | |
| EP | 1028737 A1 | 8/2000 | |
| EP | 1028991 A1 | 8/2000 | |
| EP | 1066052 A2 | 1/2001 | |
| EP | 1066060 A2 | 1/2001 | |
| EP | 1084230 A2 | 3/2001 | |
| EP | 1147176 A1 | 10/2001 | |
| EP | 1220611 A1 | 7/2002 | |
| EP | 1223956 A1 | 7/2002 | |
| EP | 1325953 A1 | 7/2003 | |
| EP | 1437404 A1 | 7/2004 | |
| EP | 1437406 A2 | 7/2004 | |
| EP | 1447443 A1 | 8/2004 | |
| EP | 1452594 A1 | 9/2004 | |
| EP | 1062321 B1 | 12/2004 | |
| EP | 1484080 A1 | 12/2004 | |
| EP | 1498478 A1 | 1/2005 | |
| EP | 1036057 B1 | 10/2005 | |
| EP | 1605044 A2 | 12/2005 | |
| EP | 1756262 A1 | 2/2007 | |
| EP | 1771737 A1 | 4/2007 | |
| EP | 1882030 A1 | 1/2008 | |
| EP | 1908490 A1 | 4/2008 | |
| EP | 1971679 A2 | 9/2008 | |
| EP | 1991668 A2 | 11/2008 | |
| EP | 2027247 A2 | 2/2009 | |
| EP | 2200622 A1 | 6/2010 | |
| EP | 2208782 A2 | 7/2010 | |
| EP | 2264145 A1 | 12/2010 | |
| EP | 2303293 A1 | 4/2011 | |
| EP | 2311938 A1 | 4/2011 | |
| EP | 2331957 A1 | 6/2011 | |
| EP | 2334310 A2 | 6/2011 | |
| EP | 2334783 A2 | 6/2011 | |
| EP | 2361968 A1 | 8/2011 | |
| EP | 2366775 A1 | 9/2011 | |
| EP | 2465922 A2 | 6/2012 | |
| EP | 2548951 A1 | 1/2013 | |
| EP | 2561066 A1 | 2/2013 | |
| EP | 2575831 A1 | 4/2013 | |
| EP | 2591789 A2 | 5/2013 | |
| EP | 2624845 A2 | 8/2013 | |
| EP | 2626417 A1 | 8/2013 | |
| EP | 2641606 A1 | 9/2013 | |
| EP | 2689008 A1 | 1/2014 | |
| EP | 2694639 A1 | 2/2014 | |
| EP | 2697362 A2 | 2/2014 | |
| EP | 2739720 A1 | 6/2014 | |
| EP | 2807246 A1 | 12/2014 | |
| GB | 103930 A | * 2/1917 | ............ F16K 7/061 |
| GB | 1414671 A | 11/1975 | |
| GB | 2297980 A | 8/1996 | |
| GB | 2360789 A | 10/2001 | |
| HU | 3285 U | 5/2007 | |
| JP | 2003/052360 A | 2/2003 | |
| JP | 5548207 B2 | 7/2014 | |
| MY | 115206 A | 4/2003 | |

(56) References Cited

FOREIGN PATENT DOCUMENTS

| | | |
|---|---|---|
| WO | 9013306 A2 | 11/1990 |
| WO | 9105238 A1 | 4/1991 |
| WO | 9106641 A1 | 5/1991 |
| WO | 9109194 A1 | 6/1991 |
| WO | 94/25571 A1 | 11/1994 |
| WO | 96/29395 A1 | 9/1996 |
| WO | 96/39035 A1 | 12/1996 |
| WO | 97/05826 A1 | 2/1997 |
| WO | 97/29792 A1 | 8/1997 |
| WO | 97/39104 A1 | 10/1997 |
| WO | 1997-040137 A1 | 10/1997 |
| WO | 98/31403 A1 | 7/1998 |
| WO | 98/51317 A1 | 11/1998 |
| WO | 98/51785 A1 | 11/1998 |
| WO | 99/05180 A1 | 2/1999 |
| WO | 99/24391 A1 | 5/1999 |
| WO | 99/24490 A1 | 5/1999 |
| WO | 99/27167 A1 | 6/1999 |
| WO | 99/49015 A2 | 9/1999 |
| WO | 00/06704 A2 | 2/2000 |
| WO | 0009018 A1 | 2/2000 |
| WO | 00/16420 A1 | 3/2000 |
| WO | 00/17326 A1 | 3/2000 |
| WO | 00/29002 A2 | 5/2000 |
| WO | 0032225 A1 | 6/2000 |
| WO | 00/44058 A2 | 7/2000 |
| WO | 0054651 A2 | 9/2000 |
| WO | 0056405 A2 | 9/2000 |
| WO | 00/59933 A2 | 10/2000 |
| WO | 00/69449 A2 | 11/2000 |
| WO | 00/75196 A1 | 12/2000 |
| WO | 00/77236 A2 | 12/2000 |
| WO | 2001/000783 A2 | 1/2001 |
| WO | 2001/011011 A2 | 2/2001 |
| WO | 2001/018174 A2 | 3/2001 |
| WO | 2001/021766 A2 | 3/2001 |
| WO | 2001/025402 A1 | 4/2001 |
| WO | 2001/029189 A2 | 4/2001 |
| WO | 0122810 A2 | 4/2001 |
| WO | 2001/034167 A1 | 5/2001 |
| WO | 2001/049851 A1 | 7/2001 |
| WO | 2001/054706 A2 | 8/2001 |
| WO | 2001-094541 A2 | 12/2001 |
| WO | 2002/042422 A2 | 5/2002 |
| WO | 2002/057430 A2 | 7/2002 |
| WO | 2002/092794 A2 | 11/2002 |
| WO | 2002/101385 A1 | 12/2002 |
| WO | 2003/010303 A1 | 2/2003 |
| WO | 2003/014313 A2 | 2/2003 |
| WO | 2003/016916 A1 | 2/2003 |
| WO | 2003/023018 A2 | 3/2003 |
| WO | 2003/023019 A1 | 3/2003 |
| WO | 2003/025167 A2 | 3/2003 |
| WO | 2003/029402 A2 | 4/2003 |
| WO | 2003/040336 A2 | 5/2003 |
| WO | 2003/042405 A2 | 5/2003 |
| WO | 2003/046161 A2 | 6/2003 |
| WO | 2003/055989 A2 | 7/2003 |
| WO | 2003/061685 A1 | 7/2003 |
| WO | 2003/061686 A1 | 7/2003 |
| WO | 2003/068961 A2 | 8/2003 |
| WO | 2003/072064 A2 | 9/2003 |
| WO | 2003/078609 A1 | 9/2003 |
| WO | 2003/078967 A2 | 9/2003 |
| WO | 2003/080816 A2 | 10/2003 |
| WO | 2003/082145 A2 | 10/2003 |
| WO | 2003/085099 A2 | 10/2003 |
| WO | 2003/089631 A1 | 10/2003 |
| WO | 2003/091398 A2 | 11/2003 |
| WO | 2003/095631 A1 | 11/2003 |
| WO | 2004/001697 A1 | 12/2003 |
| WO | 2004/012226 A2 | 2/2004 |
| WO | 2004/016779 A1 | 2/2004 |
| WO | 2004/018526 A1 | 3/2004 |
| WO | 2004/018655 A2 | 3/2004 |
| WO | 2004/026115 A2 | 4/2004 |
| WO | 2004/029231 A1 | 4/2004 |
| WO | 2004/042023 A2 | 5/2004 |
| WO | 2004/042033 A2 | 5/2004 |
| WO | 2004/042040 A1 | 5/2004 |
| WO | 2004/044127 A2 | 5/2004 |
| WO | 2004/044158 A2 | 5/2004 |
| WO | 2004/046304 A1 | 6/2004 |
| WO | 2004/050826 A2 | 6/2004 |
| WO | 2004/053096 A2 | 6/2004 |
| WO | 2004/055155 A2 | 7/2004 |
| WO | 2004/056186 A1 | 7/2004 |
| WO | 2004/065616 A2 | 8/2004 |
| WO | 2004/069172 A2 | 8/2004 |
| WO | 2004/070013 A2 | 8/2004 |
| WO | 2004/072264 A2 | 8/2004 |
| WO | 2004/073633 A2 | 9/2004 |
| WO | 2004/074464 A1 | 9/2004 |
| WO | 2004/076642 A2 | 9/2004 |
| WO | 2004/076653 A1 | 9/2004 |
| WO | 2004/087870 A2 | 10/2004 |
| WO | 2004/094588 A2 | 11/2004 |
| WO | 2004/096975 A2 | 11/2004 |
| WO | 2004/104166 A2 | 12/2004 |
| WO | 2004/106499 A1 | 12/2004 |
| WO | 2004/113513 A2 | 12/2004 |
| WO | 2005/001033 A2 | 1/2005 |
| WO | 2005/001081 A1 | 1/2005 |
| WO | 2005/003320 A2 | 1/2005 |
| WO | 2005/007799 A2 | 1/2005 |
| WO | 2005/010172 A2 | 2/2005 |
| WO | 2005/011524 A1 | 2/2005 |
| WO | 2005/012480 A2 | 2/2005 |
| WO | 2005/012510 A1 | 2/2005 |
| WO | 2005/012512 A1 | 2/2005 |
| WO | 05014775 A2 | 2/2005 |
| WO | 2005/028433 A2 | 3/2005 |
| WO | 05044972 A2 | 5/2005 |
| WO | 2005/056747 A2 | 6/2005 |
| WO | 05051316 A2 | 6/2005 |
| WO | 2005/063303 A1 | 7/2005 |
| WO | 2005/075636 A1 | 8/2005 |
| WO | 2005/107760 A1 | 11/2005 |
| WO | 2006/009291 A1 | 1/2006 |
| WO | 2006/032075 A1 | 3/2006 |
| WO | 2006/032092 A1 | 3/2006 |
| WO | 2006/108229 A1 | 10/2006 |
| WO | 2006/113881 A2 | 10/2006 |
| WO | 2006/121445 A2 | 11/2006 |
| WO | 06124021 A1 | 11/2006 |
| WO | 06129312 A2 | 12/2006 |
| WO | 2007/115367 A1 | 10/2007 |
| WO | 2007/115368 A1 | 10/2007 |
| WO | 2008/006168 A1 | 1/2008 |
| WO | 2008/011664 A1 | 1/2008 |
| WO | 2008/017128 A1 | 2/2008 |
| WO | 2008/028241 A1 | 3/2008 |
| WO | 08040812 A1 | 4/2008 |
| WO | 2008/116261 A1 | 10/2008 |
| WO | 2008/149129 A1 | 12/2008 |
| WO | 2009/026635 A1 | 3/2009 |
| WO | 09058146 A1 | 5/2009 |
| WO | 09080054 A1 | 7/2009 |
| WO | 09081408 A2 | 7/2009 |
| WO | 2009/140452 A2 | 11/2009 |
| WO | 09132457 A1 | 11/2009 |
| WO | 2009/144720 A2 | 12/2009 |
| WO | 10005527 A1 | 1/2010 |
| WO | 2010/019886 A1 | 2/2010 |
| WO | 10014253 A2 | 2/2010 |
| WO | 10019997 A1 | 2/2010 |
| WO | 2010/026573 A1 | 3/2010 |
| WO | 2010/026574 A2 | 3/2010 |
| WO | 2010/026575 A2 | 3/2010 |
| WO | 2010/036760 A1 | 4/2010 |
| WO | 2010/059487 A1 | 5/2010 |
| WO | 10061377 A2 | 6/2010 |
| WO | 10068710 A2 | 6/2010 |
| WO | 10071826 A2 | 6/2010 |

(56) References Cited

FOREIGN PATENT DOCUMENTS

| | | | |
|---|---|---|---|
| WO | 10083385 | A2 | 7/2010 |
| WO | 10111255 | A1 | 9/2010 |
| WO | 10119036 | A1 | 10/2010 |
| WO | 10123594 | A2 | 10/2010 |
| WO | 2011/025445 | A1 | 3/2011 |
| WO | 2011/132087 | A1 | 10/2011 |
| WO | 2011/147967 | A1 | 12/2011 |
| WO | 2012/072924 | A1 | 6/2012 |
| WO | 2012/127320 | A1 | 9/2012 |
| WO | 2012/138968 | A1 | 10/2012 |
| WO | 2012/140519 | A2 | 10/2012 |
| WO | 2012/171026 | A2 | 12/2012 |
| WO | 2012/171030 | A2 | 12/2012 |
| WO | 2013/110651 | A1 | 8/2013 |
| WO | 2014/037862 | A1 | 3/2014 |
| WO | 2014/037863 | A1 | 3/2014 |
| WO | 2014/068508 | A2 | 5/2014 |
| WO | 2014/128306 | A1 | 8/2014 |
| WO | 2014/128634 | A1 | 8/2014 |
| WO | 2014/131846 | A1 | 9/2014 |
| WO | 2014/141111 | A1 | 9/2014 |
| WO | 2015/004609 | A2 | 1/2015 |
| WO | 2015/118148 | A1 | 8/2015 |
| WO | 2015/118149 | A1 | 8/2015 |
| WO | 2015/131143 | A1 | 9/2015 |
| WO | 2017/072201 | A2 | 5/2017 |

OTHER PUBLICATIONS

Unknown author, "New Victories for Adult Stem Cell Research," New York, Feb. 6, 2007.
Newton R, Priyadharshini B, Turka LA. Immunometabolism of regulatory T cells. Nat Immunol. 2016; 17(6):618-25.
Ng TH, Britton GJ, Hill EV, Verhagen J, Burton BR, Wraith DC. Regulation of adaptive immunity; the role of interleukin-10. Front Immunol. 2013;4:129.
Nikolaychik, V. V., M. M. Samet, and P. I. Lelkes. "A New, Cryoprecipitate Based Coating For Improved Endothelial Cell Attachment And Growth On Medical Grade Artificial Surfaces." ASAIO Journal (American Society for Artificial Internal Organs: 1992) 40.3 (1994): M846-52.
Nish SA, Schenten D, Wunderlich FT, Pope SD, Gao Y, Hoshi N, Yu S, Yan X, Lee HK, Pasman L, Brodsky I, Yordy B, Zhao H, Bruning J, Medzhitov R. T cell-intrinsic role of IL-6 signaling in primary and memory responses. Elife. 2014;3:e01949.
Niwayama, Jun, et al. "Analysis of hemodynamics during blood purification therapy using a newly developed noninvasive continuous monitoring method." Therapeutic Apheresis and Dialysis 10.4 (2006): 380-386.
Nugent, Helen M., et al. "Adventitial endothelial implants reduce matrix metalloproteinase-2 expression and increase luminal diameter in porcine arteriovenous grafts." Journal of vascular surgery 46.3 (2007): 548-556.
Okano et al .(Tokyo Women's Medical College, Japan) demonstrated the recovery of endothelial cells and hepatocytes from plasma-treated polystyrene dishes grafted with PNIAAm (Journal of Biomedical Materials Research, 1993).
Onishi Y, Fehervari Z, Yamaguchi T, Sakaguchi S. Foxp3+ natural regulatory T cells preferentially form aggregates on dendritic cells in vitro and actively inhibit their maturation. Proc Natl Acad Sci U S A. 2008;105(29):10113-8.
Onyszchuk G, LeVine SM, Brooks WM, Berman NE. Post-acute pathological changes in the thalamus and internal capsule in aged mice following controlled cortical impact injury: A magnetic resonance imaging, iron histochemical, and glial immunohistochemical study. Neuroscience letters. 2009;452:204-208.
Pacella I, Procaccini C, Focaccetti C, Miacci S, Timperi E, Faicchia D, Severa M, Rizzo F, Coccia EM, Bonacina F, Mitro N, Norata GD, Rossetti G, Ranzani V, Pagani M, Giorda E, Wei Y, Matarese G, Barnaba V, Piconese S. Fatty acid metabolism complements glycolysis in the selective regulatory T cell expansion during tumor growth. Proc Natl Acad Sci U S A. 2018;115(28):E6546-E6555.
Parhi, Purnendu, Avantika Golas, and Erwin A. Vogler. "Role Of Proteins And Water In The Initial Attachment Of Mammalian Cells To Biomedical Surfaces: A Review." Journal of Adhesion Science and Technology 24.5 (2010): 853-888.
Pati S, Gerber MH, Menge TD, Wataha KA, Zhao Y, Baumgartner JA, Zhao J, Letourneau PA, Huby MP, Baer LA, Salsbury JR, Kozar RA, Wade CE, Walker PA, Dash PK, Cox CS, Jr., Doursout MF, Holcomb JB. Bone marrow derived mesenchymal stem cells inhibit inflammation and preserve vascular endothelial integrity in the lungs after hemorrhagic shock. PloS one. 2011;6:e25171.
Pati S, Khakoo AY, Zhao J, Jimenez F, Gerber MH, Harting M, Redell JB, Grill R, Matsuo Y, Guha S, Cox CS, Reitz MS, Holcomb JB, Dash PK. Human mesenchymal stem cells inhibit vascular permeability by modulating vascular endothelial cadherin/beta-catenin signaling. Stem cells and development. 2011;20:89-101.
Peters JH, Preijers FW, Woestenenk R, Hilbrands LB, Koenen HJ, Joosten I. Clinical grade Treg: GMP isolation, improvement of purity by CD127 Depletion, Treg expansion, and Treg cryopreservation. PLoS One. 2008;3(9):e3161.
Peters, R.; Jones, M.; Brecheisen, M.; Startz, T.; Vang, B.; Nankervis, B.; Frank, N.; Nguyen, K. (2012) TerumoBCT. https://www.terumobct.com/location/north-america/products-and-services/Pages/Quantum-Materials.aspx.
Porter CM, Horvath-Arcidiacono JA, Singh AK, Horvath KA, Bloom ET, Mohiuddin MM. Characterization and expansion of baboon CD4+CD25+ Treg cells for potential use in a non-human primate xenotransplantation model. Xenotransplantation. 2007;14(4):298-308.
Povsic TJ, O'Connor CM, Henry T, et al. (2011) A double-blind, randomized, controlled, multicenter study to assess the safety and cardiovascular effects of skeletal myoblast implantation by catheter delivery in patients with chronic heart failure after myocardial infarction. Am Heart J 162(4): 654-662.
Prockop, Darwin J., Carl A. Gregory, and Jeffery L. Spees. "One strategy for cell and gene therapy: harnessing the power of adult stem cells to repair tissues." Proceedings of the National Academy of Sciences 100.suppl_1 (2003): 11917-11923.
Q. L. Hao, et al. A functional comparison of CD34+ CD38= cells in cord blood and bone marrow. Blood 86:3745-3753, 1995.
Rahmahwati, Nurlaela, Deana Wahyuningrum, and Anita Alni. "The Synthesis Of Polyethersulfone (PES) Derivatives For The Immobilization Of Lipase Enzyme." Key Engineering Materials. vol. 811. Trans Tech Publications Ltd, 2019.
Rey-Jurado, Emma, et al. "Assessing the importance of domestic vaccine manufacturing centers: an overview of immunization programs, vaccine manufacture, and distribution." Frontiers in immunology 9 (2018): 26.
Roballo KC, Dhungana S, Z. J, Oakey J, Bushman J. Localized delivery of immunosuppressive regulatory T cells to peripheral nerve allografts promotes regeneration of branched segmental defects. Biomaterials. 2019;209:1-9.
Rodrigues, C., Fernandes, T., Diogo, M., Lobato da Silva, C., Cabral, J. Stem Cell Cultivation in Bioreactors. 2011. Biotechnology Advances v. 29, pp. 815-829.
Ronco C1, Levin N, Brendolan A, Nalesso F, Cruz D, Ocampo C, Kuang D, Bonello M, De Cal M, Corradi V, Ricci Z. Flow distribution analysis by helical scanning in polysulfone hemodialyzers: effects of fiber structure and design on flow patterns and solute clearances. Hemodial Int. Oct. 2006; 10(4):380-8.
Ronco, C., Brendolan, A., Crepaldi, C., Todighiero, M., Scabardi, M. Blood and Dialysate Flow Distributions in Hollow-Fiber Hemodialyzers Analyzed by Computerized Helical Scanning Technique. 2002. Journal of the American Society of Nephrology. V. 13, pp. S53-S61.
Rosenblum MD, Way SS, Abbas AK. Regulatory T cell memory. Nat Rev Immunol. 2016;16(2):90-101.
Rubtsov YP, Rasmussen JP, Chi EY, Fontenot J, Castelli L, Ye X, Treuting P, Siewe L, Roers A, Henderson WR, Jr., Muller W, Rudensky AY. Regulatory T cell-derived interleukin-10 limits inflammation at environmental interfaces. Immunity. 2008;28(4):546-58.

(56) References Cited

OTHER PUBLICATIONS

Rudensky, Alexander Y. "Regulatory T cells and Foxp3." Immunological reviews 241.1 (2011): 260-268.
Ryu, Min-Hyung, and Mark Gomelsky. "Near-infrared light responsive synthetic c-di-GMP module for optogenetic applications." ACS synthetic biology 3.11 (2014): 802-810.
S. Koestenbauer, et al. Protocols for Hematopoietic Stem Cell Expansion from Umbilical Cord Blood. Cell Transplantation 18: 1059-1068, 2009.
S. L. Smith, et al. Expansion of neutrophil precursors and progenitors in suspension cultures of CD34+ cells enriched from human bone marrow. Experimental Hematology 21:870-877, 1993.
Safinia N, Grageda N, Scotta C, Thirkell S, Fry LJ, Vaikunthanathan T, Lechler RI, Lombardi G. Cell Therapy in Organ Transplantation: Our Experience on the Clinical Translation of Regulatory T Cells. Front Immunol. 2018;9:354.
Sahay A, Scobie KN, Hill AS, O'Carroll CM, Kheirbek MA, Burghardt NS, Fenton AA, Dranovsky A, Hen R. Increasing adult hippocampal neurogenesis is sufficient to improve pattern separation. Nature. 2011;472:466-470.
Sakaguchi S, Sakaguchi N, Asano M, Itoh M, Toda M. Immunologic self-tolerance maintained by activated T cells expressing IL-2 receptor alpha-chains (CD25). Breakdown of a single mechanism of self-tolerance causes various autoimmune diseases. J Immunol. 1995;155(3):1151-64.
Sakaguchi S, Sakaguchi N, Shimizu J, Yamazaki S, Sakihama T, Itoh M, Kuniyasu Y, Nomura T, Toda M, Takahashi T. Immunologic tolerance maintained by CD25+ CD4+ regulatory T cells: their common role in controlling autoimmunity, tumor immunity, and transplantation tolerance. Immunol Rev. 2001;182:18-32.
Schild, Howard G. "Poly (N-isopropylacrylamide): experiment, theory and application." Progress in polymer science 17.2 (1992): 163-249.
Schmitz R, Alessio A, Kina P. The Physics of PET/CT scanners. Imaging Research Laboratory, Department of Radiology, University of Washington http://depts.washington.edu/imreslab/education/Physics%20of%20PET.pdf, 2013, 16 pages.
Schwartz RH. T cell anergy. Annu Rev Immunol. 2003;21:305-34.
Shevkoplyas et al., "The Force Acting on a Superparamagnetic Bead due to an Applied Magnetic Field," Lab on a Chip , 7, pp. 1294-1302, 2007.
Shimazu Y, Shimazu Y, Hishizawa M, Hamaguchi M, Nagai Y, Sugino N, Fujii S, Kawahara M, Kadowaki N, Nishikawa H, Sakaguchi S, Takaori-Kondo A. Hypomethylation of the Treg-Specific Demethylated Region in FOXP3 Is a Hallmark of the Regulatory T-cell Subtype in Adult T-cell Leukemia. Cancer Immunol Res. 2016;4(2):136-45.
Shimizu et all., "Fabrication of Pulsatile Cardiac Tissue Grafts Using a Novel 3-Dimensional Cell Sheet Manipulation Technique and Temperature-Responsive Cell Culture Surfaces," Circulation Research, vol. 90, Feb. 22, 2022, e40-e48, pp. 1-9.
Sigma-Aldrich Cheimcals Mitomycin C (M4287) MSDS, v4.4, Jul. 7, 2011.
Sirsi, S. and Borden, M., "Microbubble Composition, Properties, and Biomedical Applications," Bubble Science, Engineering & Technolology, vol. 1, No. 1-2, pp. 3-17, 2009.
Smith C, Okern G, Rehan S, et al. Ex vivo expansion of human T cells for adoptive immunotherapy using the novel Xeno-free CTS Immune Cell Serum Replacement. Clinical & Translational Immunology 2015;4:e31.
Somerville et al., "Clinical Scale Rapid Expansion of Lymphocytes for Adoptive Cell Transfer Therapy in the WAVE® Bioreactor," Journal of Translational Medicine, vol. 10, No. 69, pp. 1-11, 2012.
Somerville, R. and Dudley, M., "Bioreactors Get Personal," Oncolmmunology, vol. 1, No. 8, pp. 1435-1437, Nov. 2012.
Spectrum Labs KrosFlo Research IIi TFF System, 2013, Spectrum Laboratories, Inc., 4 pages.
Stafano Tiziani, et al. Metabolomic Profiling of Drug Response in Acute Myeloid Leukaemia Cell lines. PLOSone 4(1):e4251 (Jan. 22, 2009).
Unknown Author, StAR_Abstract, 2014, 1 page.
Startz et al May 2016 TBCT T-cell White Paper.
Startz, T., et al. "Maturation of dendritic cells from CD14+ monocytes in an automated functionally closed hollow fiber bioreactor system." Cytotherapy 16.4 (2014): S29.
Steven M. Bryce, et al (Litron Laboratories). In vitro micronucleus assay scored by flow cytometry provides a comprehensive evaluation of cytogenetic damage and cytotoxicity. Mutation Research 630(1-2): 78-91, 2007.
Steven M. Bryce, et al (Novartis Pharma AG, Johnson & Johnson Pharmaceutical Research, GlaxoSmithKline). Interlaboratory evaluation of a flow cytometric, high content in vitro micronucleus assay. Genetic Toxicology and Environmental Mutagenesis 650: 181-195, 2008.
Stuart, Martien A. Cohen, et al. "Emerging applications of stimuli-responsive polymer materials." Nature materials 9.2 (2010): 101-113.
Su LF, Del Alcazar D, Stelekati E, Wherry EJ, Davis MM. Antigen exposure shapes the ratio between antigen-specific Tregs and conventional T cells in human peripheral blood. Proc Natl Acad Sci U S A. 2016;113(41):E6192-E6198.
Takezawa, Toshiaki, Yuichi Mori, and Katsutoshi Yoshizato. "Cell culture on a thermo-responsive polymer surface." Bio/technology 8.9 (1990): 854-856.
The effect of rocking rate and angle on T cell cultures grown in Xuri™ Cell Expansion Systems, Aug. 2014, GE Healthcare UK Limited, 4 pages.
Trzonkowski et al., "Ex Vivo Expansion of CD4+ CD25+ T Regulatory Cells for Immunosuppressive Therapy," Cytometry Part A, 75A, pp. 175-188, 2009.
Trzonkowski, Piotr, et al. "First-in-man clinical results of the treatment of patients with graft versus host disease with human ex vivo expanded CD4+ CD25+ CD127? T regulatory cells." Clinical immunology 133.1 (2009): 22-26.
Tsvetkov, Ts, et al. "Isolation and cryopreservation of human peripheral blood monocytes." Cryobiology 23.6 (1986): 531-536.
Underwood, P. Anne, et al. "Effects of base material, plasma proteins and FGF2 on endothelial cell adhesion and growth." Journal of Biomaterials Science, Polymer Edition 13.8 (2002): 845-862.
Urbich, et al from the Goethe-Universitat, demonstrated that human endothelial cells increased VEGFR-2 mRNA expression when exposed to 5-15 dynes/cm2 of constant shear force for a period of 6-24 hours (FEBS, 2002).
Van der Net JB, Bushell A, Wood KJ, Harden PN. Regulatory T cells: first steps of clinical application in solid organ transplantation. Transpl Int. 2016;29(1):3-11.
Van der Windt GJ, Pearce EL. Metabolic switching and fuel choice during T-cell differentiation and memory development. Immunol Rev. 2012;249(1):27-42.
Vera et al., "Accelerated Production of Antigen-Specific T-Cells for Pre-Clinical and Clinical Applications Using Gas-Permeable Rapid Expansion Cultureware (G-Rex)," J Immunother, vol. 33, No. 3, pp. 305-315, Apr. 2010.
Villa, Alma Y. Camacho, et al. "CD133+ CD34+ and CD133+ CD38+ blood progenitor cells as predictors of platelet engraftment in patients undergoing autologous peripheral blood stem cell transplantation." Transfusion and Apheresis Science 46.3 (2012): 239-244.
Visser EP1, Disselhorst JA, Brom M, Laverman P, Gotthardt M, Oyen WJ, Boerman OC. Spatial resolution and sensitivity of the Inveon small-animal PET scanner. J Nucl Med. Jan. 2009;50(1):139-47.
Von Laer, D., et al. "Loss of CD38 antigen on CD34+ CD38+ cells during short-term culture." Leukemia 14.5 (2000):947-948.
Wagner Jr, John E., et al. "Phase I/II trial of StemRegenin-1 expanded umbilical cord blood hematopoietic stem cells supports testing as a stand-alone graft." Cell stem cell 18.1 (2016): 144-155.
Walker, Peter A., et al. "Direct intrathecal implantation of mesenchymal stromal cells leads to enhanced neuroprotection via an NF?B-mediated increase in interleukin-6 production." Stem cells and development 19.6 (2010): 867-876.

(56) References Cited

OTHER PUBLICATIONS

Wang R, Dillon CP, Shi LZ, Milasta S, Carter R, Finkelstein D, McCormick LL, Fitzgerald P, Chi H, Munger J, Green DR. The transcription factor Myc controls metabolic reprogramming upon T lymphocyte activation. Immunity. 2011;35(6):871-82.
Wang, Jiamian, John A. Jansen, and Fang Yang. "Electrospraying: possibilities and challenges of engineering carriers for biomedical applications—a mini review." Frontiers in Chemistry 7 (2019): 258.
Ward H, Vigues S, Poole S, Bristow AF. The rat interleukin 10 receptor: cloning and sequencing of cDNA coding for the alpha-chain protein sequence, and demonstration by western blotting of expression in the rat brain. Cytokine. 2001;15(5):237-40.
Wawman, Rebecca Ellen, Helen Bartlett, and Ye Htun Oo. "Regulatory T cell metabolism in the hepatic microenvironment." Frontiers in immunology 8 (2018): 1889.
Weber et al., "White Paper on Adoptive Cell Therapy for Cancer with Tumor-Infiltrating Lymphocytes: A Report of the CTEP Subcommittee on Adoptive Cell Therapy," Clinical Cancer Research, vol. 17, No. 7, pp. 1664-1673, Apr. 1, 2011.
Weiss RA, Weiss MA, Beasley KL, Munavalli G (2007) Autologous cultured fibroblast injection for facial contour deformities: a prospective, placebo-controlled, Phase III clinical trial. Dermatol Surg 33(3): 263-268.
Widdel, F. 2010. "Theory and measurement of bacterial growth" http://www.mpi-bremen.de/Binaries/Binary13037/Wachstumsversuch.pdf.
Yamada, Noriko, et al. "Thermo?responsive polymeric surfaces; control of attachment and detachment of cultured cells." Die Makromolekulare Chemie, Rapid Communications 11.11 (1990): 571-576.
Yang, Hee Seok, et al. "Suspension culture of mammalian cells using thermosensitive microcarrier that allows cell detachment without proteolytic enzyme treatment." Cell transplantation 19.9 (2010): 1123-1132.
Yi, Zhuan, et al. "A readily modified polyethersulfone with amino-substituted groups: its amphiphilic copolymer synthesis and membrane application." Polymer 53.2 (2012): 350-358.
Yoshinari, Masao, et al. "Effect of cold plasma-surface modification on surface wettability and initial cell attachment." International Journal of Biomedical and Biological Engineering 3.10 (2009): 507-511.
Zappasodi et al., "The Effect Of Artificial Antigen-Presenting Cells with Preclustered Anit-CD28/-CD3/LFA-1 Monoclonal Antibodies on the Induction of ex vivo Expansion of Functional Human Antitumor T Cells," Haematologica, vol. 93, No. 10, pp. 1523-1534, 2008.
Zemmour D, Zilionis R, Kiner E, Klein AM, Mathis D, Benoist C. Publisher Correction: Single-cell gene expression reveals a landscape of regulatory T cell phenotypes shaped by the TCR. Nat Immunol. 2018;19(6):645.
Zeng B, Kwak-Kim J, Liu Y, Liao AH. Treg cells are negatively correlated with increased memory B cells in pre-eclampsia while maintaining suppressive function on autologous B-cell proliferation. Am J Reprod Immunol. 2013;70(6):454-63.
Zheng, et al at the University of Iowa have shown that the differential effects of pulsatile blood flow and cyclic stretch are an important growth stimulus (American Journal of Physiology—Heart and Circulatory Physiology, 2008).
Anamelechi, Charles C., et al. "Streptavidin binding and endothelial cell adhesion to biotinylated fibronectin." Langmuir 23.25 (2007): 12583-12588.
Barker, Juliet N., et al. "CD34+ cell content of 126 341 cord blood units in the US inventory: implications for transplantation and banking." Blood advances 3.8 (2019): 1267-1271.
Bluestone, Jeffrey A., et al. "Type 1 diabetes immunotherapy using polyclonal regulatory T cells." Science translational medicine 7.315 (2015): 315ra189-315ra189.
Claudio G. Brunstein, Jeffrey S. Miller, Qing Cao, Daivd H. McKenna, Keli L. Hippen, Julie Curtsinger, Todd Defor, Bruce L. Levine, Carl H. June, Pablo Rubinstein, Philip B. McGlave, Bruce R. Blazar, and John E. Wagner. Infusion of ex vivo expanded T regulatory cells in adults transplanted with umbilical cord blood: safety profile and detection kinetics. Blood, 117(3): 1061-1070, 2010.
Lang, Julie, et al. "Generation of hematopoietic humanized mice in the newborn BALB/c-Rag2nullIl2r?null mouse model: a multivariable optimization approach." Clinical Immunology 140.1 (2011): 102-116.
Kim, Do-Hyung, et al. "mTOR interacts with raptor to form a nutrient-sensitive complex that signals to the cell growth machinery." Cell 110.2 (2002): 163-175.
Kishore M, Cheung KCP, Fu H, Bonacina F, Wang G, Coe D, Ward EJ, Colamatteo A, Jangani M, Baragetti A, Matarese G, Smith DM, Haas R, Mauro C, Wraith DC, Okkenhaug K, Catapano AL, De Rosa V, Norata GD, Marelli-Berg FM. Regulatory T Cell Migration Is Dependent on Glucokinase-Mediated Glycolysis. Immunity. 2017;47(5):875-889 e10.
Klysz D, Tai X, Robert PA, Craveiro M, Cretenet G, Oburoglu L, Mongellaz C, Floess S, Fritz V, Matias MI, Yong C, Surh N, Marie JC, Huehn J, Zimmermann V, Kinet S, Dardalhon V, Taylor N. Glutamine-dependent alpha-ketoglutarate production regulates the balance between T helper 1 cell and regulatory T cell generation. Sci Signal. 2015;8(396):ra97.
Lampugnani MG, Caveda L, Breviario F, Del Maschio A, Dejana E. Endothelial cell-to-cell junctions. Structural characteristics and functional role in the regulation of vascular permeability and leukocyte extravasation. Bailliere's clinical haematology. 1993;6:539-558.
Lataillade, Jean-Jacques, et al. "Chemokine SDF-1 enhances circulating CD34+ cell proliferation in synergy with cytokines: possible role in progenitor survival." Blood, The Journal of the American Society of Hematology 95.3 (2000): 756-768.
Lindstein, Tullia, et al. "Regulation of lymphokine messenger RNA stability by a surface-mediated T cell activation pathway." Science 244.4902 (1989): 339-343.
Liotta, Francesco, et al. "Frequency of regulatory T cells in peripheral blood and in tumour?infiltrating lymphocytes correlates with poor prognosis in renal cell carcinoma." BJU international 107.9 (2011): 1500-1506.
Liu W, Putnam AL, Xu-Yu Z, Szot GL, Lee MR, Zhu S, Gottlieb PA, Kapranov P, Gingeras TR, Fazekas de St Groth B, Clayberger C, Soper DM, Ziegler SF, Bluestone JA. CD127 expression inversely correlates with FoxP3 and suppressive function of human CD4+ T reg cells. J Exp Med. 2006;203(7):1701-1711.
Högstedt, Benkt, Anita Karlsson, and Anders Holmén. "Frequency and size distribution of micronuclei in lymphocytes stimulated with phytohemagglutinin and pokeweed mitogen in workers exposed to piperazine." Hereditas 109.(1988): 139-142.
Hollyman et al., "Manufacturing Validation of Biologicall Functional T Cells Targeted to CD19 Antigen for Autologous Adoptive Cell Therapy," J Immunother, vol. 32, No. 2, pp. 169-180, Feb.-Mar. 2009.
MRI| Small Animal Imaging| University of Colorado Cancer Center, http://www.ucdenver.edu/academics/colleges/medicalschool/centers/cancercenter/Research/sharedresources/Animallmaging/smallanimalimaging/Pages/MRI.aspx, 2019, 2 pages.
SCT Webinar "Volume Reduction technology for Large Scale Harvest or Post-thaw Manipulation of Cellular Therapeutics". Feb. 8, 2012, 60 pages.
Itkin, Tomer, and Tsvee Lapidot. "SDF-1 keeps HSC quiescent at home." Blood, The Journal of the American Society of Hematology 117.2 (2011): 373-374.
Iwashima, Shigejiro, et al. "Novel culture system of mesenchymal stromal cells from human subcutaneous adipose issue." Stem cells and development 18.4 (2009): 533-544.
Jang, Eugene, et al. "Syndecan-4 proteoliposomes enhance fibroblast growth factor-2 (FGF-2)-induced proliferation, migration, and neovascularization of ischemic muscle." Proceedings of the National Academy of Sciences 109.5 (2012): 1679-1684.
Jarocha D, Stangel-Wojcikiewicz K, Basta A, Majka M (2014) Efficient myoblast expansion for regenerative medicine use. Int J Mol Med 34(1): 83-91.

(56) References Cited

OTHER PUBLICATIONS

Jo CH, Lee YG, Shin WH, et al. (2014) Intra-articular injection of mesenchymal stem cells for the treatment of osteoarthritis of the knee: a proof-of-concept clinical trial. Stem Cells 32(5): 1254-1266.
Johansson, Ulrika, et al. "Pancreatic islet survival and engraftment is promoted by culture on functionalized spider silk matrices." PloS one 10.6 (2015): e0130169.
John Carvell, et al. Monitoring Live Biomass in Disposable Bioreactors, BioProcess International 14(3)s, Mar. 2016.
John Nicolette, et al (Abbott Laboratories). In Vitro Micronucleus Screening of Pharmaceutical Candidates by Flow Cyto9metry in Chinese Hamster V79 Cells, Environmental and Molecular Mutagenesis 00:000-000, 2010.
John P. Carvell and Jason E. Dowd. On-line measurements and control of viable cell density in cell culture manufacturing processes using radio frequency impedance. Cytotechnology 50: 35-48, 2006.
Johnson, Patrick A., et al. "Interplay of anionic charge, poly (ethylene glycol), and iodinated tyrosine incorporation within tyrosine?derived polycarbonates: Effects on vascular smooth muscle cell adhesion, proliferation, and motility." Journal of Biomedical Materials Research Part A: An Official Journal of The Society for Biomaterials, The Japanese Society for Biomaterials, and The Australian Society for Biomaterials and the Korean Society for Biomaterials 93.2 (2010): 505-514.
Johnston LC, Su X, Maguire-Zeiss K, Horovitz K, Ankoudinova I, Guschin D, Hadaczek P, Federoff HJ, Bankiewicz K, Forsayeth J. Human interleukin-10 gene transfer is protective in a rat model of Parkinson's disease. Mol Ther. 2008;16(8):1392-9.
Jones M, Varella-Garcia M, Skokan M, et al. (2013) Genetic stability of bone marrow-derived human mesenchymal stromal cells in the Quantum System. Cytotherapy 15(11): 1323-1339.
Jones2016ISCT 2016 Poster 69.
Joy, Abraham, et al. "Control of surface chemistry, substrate stiffness, and cell function in a novel terpolymer methacrylate library." Langmuir 27.5 (2011): 1891-1899.
Kalamasz et al., "Optimization of Human T-Cell Expansion Ex Vivo Using Magnetic Beads Conjugated with Anti-CD3 and Anti-CD28 Antibodies," J Immunother, vol. 27, No. 5, pp. 405-418, Sep.-Oct. 2004.
Klapper et al., "Single-Pass, Closed-System Rapid Expansion of Lymphocyte Cultures for Adoptive Cell Therapy," Journal of Immunological Methods, 345, pp. 90-99, Apr. 21, 2009.
Klein, Elias, Eva Eichholz, and Don H. Yeager. "Affinity membranes prepared from hydrophilic coatings on microporous polysulfone hollow fibers." Journal of membrane science 90.1-2 (1994): 69-80.
Korpanty et al., "Tageting Vascular Enothelium with Avidin Microbubbles," Ultrasound in Medicine and Biology, vol. 31, No. 9, pp. 1279-1283, May 24, 2005.
Krauss et al., "Signaling Takes a Breath—New Quantitative Perspectives on Bioenergetics and Signal Transduction," Immunity, vol. 15, pp. 497-502, Oct. 2001.
Kulikov, A. V., et al. "Application of multipotent mesenchymal stromal cells from human adipose tissue for compensation of neurological deficiency induced by 3-nitropropionic acid in rats." Bulletin of experimental biology and medicine 145.4 (2008): 514-519.
Kumar P, Marinelarena A, Raghunathan D, Ragothaman VK, Saini S, Bhattacharya P, Fan J, Epstein AL, Maker AV, Prabhakar BS. Critical role of OX40 signaling in the TCR-independent phase of human and murine thymic Treg generation. Cell Mol Immunol. 2019;16(2):138-153.
Kwan, J. and Borden, M., "Lipid Monolayer Collapse and Microbubble Stability," Advances in Colloid and Interface Science, vols. 183-184, pp. 82-99, Aug. 21, 2012.
Lee et al., "Continued Antigen Stimulation Is Not Required During CD4+ T Cell Clonal Expansion," The Journal of Immunology, 168, pp. 1682-1689, 2002.
Lee, Jae W., et al. "Allogeneic human mesenchymal stem cells for treatment of E. coli endotoxin-induced acute lung injury in the ex vivo perfused human lung." Proceedings of the national academy of Sciences 106.38 (2009): 16357-16362.
Levine, B., "T Lymphocyte Engineering ex vivo for Cancer and Infectious Disease," Expert Opinion on Biological Therapy, vol. 4, No. 4, pp. 475-489, 2008.
Lum et al., "Ultrasound Radiation Force Enables Targeted Deposition of Model Drug Carriers Loaded on Microbubbles," Journal of Controlled Release, 111, pp. 128-134, 2006.
M. R. Koller, et al. Clinical-scale human umbilical cord blood cell expansion in a novel automated perfusion culture system. Bone Marrow Transplantion 21:653-663, 1998.
Malin, Stephen F., et al. "Noninvasive prediction of glucose by near-infrared diffuse reflectance spectroscopy." (1999): 1651-1658.
Malone et al., "Characterization of Human Tumor-Infiltrating Lymphocytes Expanded in Hollow-Fiber Bioreactors for Immunotherapy of Cancer," Cancer Biotherapy & Radiopharmaceuticals, vol. 16, No. 5, pp. 381-390, 2001.
Mao AS, Mooney DJ (2015) Regenerative medicine: current therapies and future directions. Proc Natl Acad Sci USA 112(47): 14452-14459.
Marek-Trzonkowska, Natalia, et al. "Administration of CD4+ CD25highCD127-regulatory T cells preserves ß-cell function in type 1 diabetes in children." Diabetes care 35.9 (2012): 1817-1820.
Streltsova et al., "Recurrent Stimulation of Natural Killer Cell Clones with K562 Expressing Membrane-Bound Interleukin-21 Affects Their Phenotype, Interferon-y Production, and Lifespan," International Journal of Molecular Sciences, vol. 20, No. 443, 2019, pp. 1-18.
Markgraf CG, Clifton GL, Aguirre M, Chaney SF, Knox-Du Bois C, Kennon K, Verma N. Injury severity and sensitivity to treatment after controlled cortical impact in rats. Journal of neurotrauma. 2001;18:175-186.
Mathew et al. A Phase I Clinical Trials I with Ex Vivo Expanded Recipient Regulatory T cells in Living Donor Kidney Transplants. Nature, Scientific Reports 8:7428 (1-12), 2018.
Matthay, Michael A., et al. "Therapeutic potential of mesenchymal stem cells for severe acute lung injury." Chest 138.4 (2010): 965-972.
Maynard CL, Harrington LE, Janowski KM, Oliver JR, Zindl CL, Rudensky AY, Weaver CT. Regulatory T cells expressing interleukin 10 develop from Foxp3+ and Foxp3-precursor cells in the absence of interleukin 10. Nat Immunol. 2007;8(9):931-41.
McKenna DH, Jr., Sumstad D, Kadidlo DM, et al. Optimization of cGMP purification and expansion of umbilical cord blood-derived T-regulatory cells in support of first-in-human clinical trials. Cytotherapy 2017;19:250-62.
McLimans W, Kinetics of Gas Diffusion in Mammalian Cell Culture Systems. Biotechnology and Bioengineering 1968; 10:725-740.
McMurtrey, Richard J. "Analytic models of oxygen and nutrient diffusion, metabolism dynamics, and architecture optimization in three-dimensional tissue constructs with applications and insights in cerebral organoids." Tissue Engineering Part C: Methods 22.3 (2016): 221-249.
Menge, Tyler, et al. "Mesenchymal stem cells regulate blood-brain barrier integrity through TIMP3 release after traumatic brain injury." Science translational medicine 4.161 (2012): 161ra150-161ra150.
Miska J, Lee-Chang C, Rashidi A, Muroski ME, Chang AL, Lopez-Rosas A, Zhang P, Panek WK, Cordero A, Han Y, Ahmed AU, Chandel NS, Lesniak MS. HIF-1alpha Is a Metabolic Switch between Glycolytic-Driven Migration and Oxidative Phosphorylation-Driven Immunosuppression of Tregs in Glioblastoma. Cell Rep. 2019;27(1):226-237 e4.
Miyara M, Yoshioka Y, Kitoh A, Shima T, Wing K, Niwa A, Parizot C, Taflin C, Heike T, Valeyre D, Mathian A, Nakahata T, Yamaguchi T, Nomura T, Ono M, Amoura Z, Gorochov G, Sakaguchi S. Functional delineation and differentiation dynamics of human CD4+ T cells expressing the FoxP3 transcription factor. Immunity. 2009;30(6):899-911.
Murugappan, G., et al. "Human hematopoietic progenitor cells grow faster under rotational laminar flows." Biotechnology progress 26.5 (2010): 1465-1473.

(56) References Cited

OTHER PUBLICATIONS

Nankervis B, Jones M, Vang B et al. (2018) Optimizing T Cell Expansion in a Hollow-Fiber Bioreactor. Curr Stem Cell Rep. Advanced online publication. https://doi.org/10.1007/s40778-018-0116-x.
Nankervis, Brian, et al. "Optimizing T cell expansion in a hollow-fiber bioreactor." Current Stem Cell Reports 4.1 (2018): 46-51.
Nedoszytko B, Lange M, Sokolowska-Wojdylo M, Renke J, Trzonkowski P, Sobjanek M, Szczerkowska-Dobosz A, Niedoszytko M, Gorska A, Romantowski J, Czarny J, Skokowski J, Kalinowski L, Nowicki R. The role of regulatory T cells and genes involved in their differentiation in pathogenesis of selected inflammatory and neoplastic skin diseases. Part II: The Treg role in skin diseases pathogenesis. Postepy Dermatol Alergol. 2017;34(5):405-417.
Mathew, James M., et al. "A phase I clinical trial with ex vivo expanded recipient regulatory T cells in living donor kidney transplants." Scientific reports 8.1 (2018): 1-12.
Ueda, Ryosuke, et al. "Interaction of natural killer cells with neutrophils exerts a significant antitumor immunity in hematopoietic stem cell transplantation recipients." Cancer medicine 5.1 (2015): 49-60.
Jin, H., and J. Bae. "Neuropeptide Y regulates the hematopoietic stem cell microenvironment and prevents nerve injury in the bone marrow." 22nd Annual ISCT Meeting (2016): S29.
Bai, Tao, et al. "Expansion of primitive human hematopoietic stem cells by culture in a zwitterionic hydrogel." Nature medicine 25.10 (2019): 1566-1575.
Horwitz, Mitchell E., et al. "Phase I/II study of stem-cell transplantation using a single cord blood unit expanded ex vivo with nicotinamide." Journal of Clinical Oncology 37.5 (2019): 367-373.
Lee III, Daniel W., et al. "Long-term outcomes following CD19 CAR T cell therapy for B-ALL are superior in patients receiving a fludarabine/cyclophosphamide preparative regimen and post-CAR hematopoietic stem cell transplantation." Blood 128.22 (2016): 218.
Goh, Celeste, Sowmya Narayanan, and Young S. Hahn. "Myeloid-derived suppressor cells: the dark knight or the joker in viral infections?." Immunological reviews 255.1 (2013): 210-221.
Pati, Shibani, and Todd E. Rasmussen. "Cellular therapies in trauma and critical care medicine: Looking towards the future." PLoS Medicine 14.7 (2017): e1002343.
Pati, Shibani, et al. "Lyophilized plasma attenuates vascular permeability, inflammation and lung injury in hemorrhagic shock." PLoS one 13.2 (2018): e0192363.
Celeste Nelson et al in Christopher Chen's Lab demonstrated, in separate experiments, that curved surfaces with a radius of curvature (200 ?m) that is greater than the cell diameter and surfaces that have undulating special patterning (depressions) increase the patterned growth of ECs [PNAS 102(33): 11594-11599, 2005].
Maria Streltsova, Dean Lee (Nationwide Children's Hospital, OSU, Columbus, OH) et al (Int'l Journal of Molecular Sciences, 2019).
Creed JA, DiLeonardi AM, Fox DP, Tessler AR, Raghupathi R. Concussive brain trauma in the mouse results in acute cognitive deficits and sustained impairment of axonal function. Journal of neurotrauma. 2011;28:547-563.
Cuchiara, Maude L., et al. "Covalent immobilization of stem cell factor and stromal derived factor 1a for in vitro culture of hematopoietic progenitor cells." Acta biomaterialia 9.12 (2013): 9258-9269.
Da Silva, Ricardo MP, Joao F. Mano, and Rui L. Reis. "Smart thermoresponsive coatings and surfaces for tissue engineering: switching cell-material boundaries." Trends in Biotechnology 25.12 (2007): 577-583.
Dash PK, Hochner B, Kandel ER. Injection of the camp-responsive element into the nucleus of aplysia sensory neurons blocks long-term facilitation. Nature. 1990;345:718-721.
Dash PK, Johnson D, Clark J, Orsi SA, Zhang M, Zhao J, Grill RJ, Moore AN, Pati S. Involvement of the glycogen synthase kinase-3 signaling pathway in tbi pathology and neurocognitive outcome. PloS one. 2011;6:e24648.

Dash PK, Mach SA, Blum S, Moore AN. Intrahippocampal wortmannin infusion enhances long-term spatial and contextual memories. Learn Mem. 2002;9:167-177.
Dash PK, Orsi SA, Zhang M, Grill RJ, Pati S, Zhao J, Moore AN. Valproate administered after traumatic brain injury provides neuroprotection and improves cognitive function in rats. PloS one. 2010;5:e11383.
Dash PK, Zhao J, Orsi SA, Zhang M, Moore AN. Sulforaphane improves cognitive function administered following traumatic brain injury. Neuroscience letters. 2009;460:103-107.
Davila et al., "Efficacy and Toxicity Management of 19-28z CAR T Cell Therapy in B cell Acute Lymphoblastic Leukemia," Science Translational Medicine, vol. 6, No. 224, pp. 1-10, Feb. 19, 2014.
Dejana E, Orsenigo F, Lampugnani MG. The role of adherens junctions and ve-cadherin in the control of vascular permeability. Journal of cell science. 2008; 121:2115-2122.
Dejana E, Spagnuolo R, Bazzoni G. Interendothelial junctions and their role in the control of angiogenesis, vascular permeability and leukocyte transmigration. Thrombosis and haemostasis. 2001;86:308-315.
Dejana E, Tournier-Lasserve E, Weinstein BM. The control of vascular integrity by endothelial cell junctions: Molecular basis and pathological implications. Developmental cell. 2009;16:209-221.
Del Pino A, Ligero G, Lopez MB, et al. (2015) Morphology, cell viability, karyotype, expression of surface markers and plasticity of three primary cell line cultures before and after the cryostorage in LN2 and GN2. Cryobiology 70(1): 1-8.
Delaney, Colleen, et al. "Notch-mediated expansion of human cord blood progenitor cells capable of rapid myeloid reconstitution." Nature medicine 16.2 (2010): 232-236.
Ding, Zhongli, Guohua Chen, and Allan S. Hoffman. "Synthesis and purification of thermally sensitive oligomer? enzyme conjugates of poly (N-isopropylacrylamide)? trypsin." Bioconjugate chemistry 7.1 (1996): 121-125.
Dixon CE, Clifton GL, Lighthall JW, Yaghmai AA, Hayes RL. A controlled cortical impact model of traumatic brain injury in the rat. Journal of neuroscience methods. 1991;39:253-262.
Dominici M, Le Blanc K, Mueller I, et al. (2006) Minimal criteria for defining multipotent mesenchymal stromal cells. The International Society for Cellular Therapy position statement. Cytotherapy 8(4): 315-317.
Durrani S, Konoplyannikov M, Ashraf M, Haider KH (2010) Skeletal myoblasts for cardiac repair. Regen Med 5(6): 919-932.
Esensten JH, Muller YD, Bluestone JA, Tang Q. Regulatory T-cell therapy for autoimmune and autoinflammatory diseases: The next frontier. J Allergy Clin Immunol. 2018;142(6):1710-1718.
Fakin R, Hamacher J, Gugger M, Gazdhar A, Moser H, Schmid RA. Prolonged amelioration of acute lung allograft rejection by sequential overexpression of human interleukin-10 and hepatocyte growth factor in rats. Exp Lung Res. 2011;37(9):555-62.
Fedorov et al., "PD-1- and CTLA-4-Based Inhibitory Chimeric Antigen Receptors (iCARs) Divert Off-Target Immunotherapy Responses," Science Translational Medicine, vol. 5, No. 215, pp. 1-12, Dec. 11, 2013.
Ferreira LMR, Muller YD, Bluestone JA, Tang Q. Next-generation regulatory T cell therapy. Nat Rev Drug Discov. 2019;18(10):749-769.
Fischbach, Michael A., Jeffrey A. Bluestone, and Wendell A. Lim. "Cell-based therapeutics: the next pillar of medicine." Science translational medicine 5.179 (2013): 179ps7-179ps7.
Fisk, Nicholas M., et al. "Can routine commercial cord blood banking be scientifically and ethically justified?." PLoS medicine 2.2 (2005): e44.
Forbes Jun. 23, 2014 article "Will this man cure cancer?".
Fowler DH. Rapamycin-resistant effector T-cell therapy. Immunol Rev. 2014;257(1):210-25.
Fraser H, Safinia N, Grageda N, Thirkell S, Lowe K, Fry LJ, Scotta C, Hope A, Fisher C, Hilton R, Game D, Harden P, Bushell A, Wood K, Lechler RI, Lombardi G. A Rapamycin-Based GMP-Compatible Process for the Isolation and Expansion of Regulatory T Cells for Clinical Trials. Mol Ther Methods Clin Dev. 2018;8:198-209.

(56) References Cited

OTHER PUBLICATIONS

Frauwirth KA, Riley JL, Harris MH, Parry RV, Rathmell JC, Plas DR, Elstrom RL, June CH, Thompson CB. The CD28 signaling pathway regulates glucose metabolism. Immunity. 2002;16(6):769-77.
Fuchs A, Gliwinski M, Grageda N, Spiering R, Abbas AK, Appel S, Bacchetta R, Battaglia M, Berglund D, Blazar B, Bluestone JA, Bornhauser M, Ten Brinke A, Brusko TM, Cools N, Cuturi MC, Geissler E, Giannoukakis N, Golab K, Hafler DA, van Ham SM, Hester J et al. Minimum Information about T Regulatory Cells: A Step toward Reproducibility and Standardization. Front Immunol. 2017;8:1844.
G0211: Study for Gamma Irradiation of Bioreactor Membranes, undated, available at least one year prior to Jun. 1, 2020, author unknown, 3 pages.
Galgani M, De Rosa V, La Cava A, Matarese G. Role of Metabolism in the Immunobiology of Regulatory T Cells. J Immunol. 2016;197(7):2567-75.
Garlie, Nina K., et al. "T cells coactivated with immobilized anti-CD3 and anti-CD28 as potential immunotherapy for cancer." Journal of immunotherapy (Hagerstown, Md.: 1997) 22.4 (1999): 336-345.
Gedaly R, De Stefano F, Turcios L, Hill M, Hidalgo G, Mitov MI, Alstott MC, Butterfield DA, Mitchell HC, Hart J, Al-Attar A, Jennings CD, Marti F. mTOR Inhibitor Everolimus in Regulatory T Cell Expansion for Clinical Application in Transplantation. Transplantation. 2019;103(4):705-715.
Gimble, Jeffrey M., Adam J. Katz, and Bruce A. Bunnell. "Adipose-derived stem cells for regenerative medicine." Circulation research 100.9 (2007): 1249-1260.
Gingras AC, Raught B, Sonenberg N. Regulation of translation initiation by FRAP/mTOR. Genes Dev. 2001;15(7):807-26.
Godin, Michel, et al. "Measuring the mass, density, and size of particles and cells using a suspended microchannel resonator." Applied physics letters 91.12 (2007): 123121.
Golab K, Leveson-Gower D, Wang XJ, Grzanka J, Marek-Trzonkowska N, Krzystyniak A, Millis JM, Trzonkowski P, Witkowski P. Challenges in cryopreservation of regulatory T cells (Tregs) for clinical therapeutic applications. Int Immunopharmacol. 2013;16(3):371-5.
Goldring CE, Duffy PA, Benvenisty N, Andrews PW, Ben-David U, Eakins R, French N, Hanley NA, Kelly L, Kitteringham NR, Kurth J, Ladenheim D, Laverty H, McBlane J, Narayanan G, Patel S, Reinhardt J, Rossi A, Sharpe M, Park BK. Assessing the safety of stem cell therapeutics. Cell stem cell. 2011;8:618-628.
Griesche, Nadine, et al. "A simple modification of the separation method reduces heterogeneity of adipose-derived stem cells." cells tissues organs 192.2 (2010): 106-115.
Gutcher I, Donkor MK, Ma Q, Rudensky AY, Flavell RA, Li MO. Autocrine transforming growth factor-beta1 promotes in vivo Th17 cell differentiation. Immunity. 2011;34(3):396-408.
Haack-Sorensen M, Follin B, Juhl M, et al. (2016) Culture expansion of adipose derived stromal cells. A closed automated Quantum Cell Expansion System compared with manual flask-based culture. J Transl Med 14(1): 319.
Hall ED, Sullivan PG, Gibson TR, Pavel KM, Thompson BM, Scheff SW. Spatial and temporal characteristics of neurodegeneration after controlled cortical impact in mice: More than a focal brain injury. Journal of neurotrauma. 2005;22:252-265.
Hami et al., "GMP Production and Testing of Xcellerated T Cells for the Treatment of Patients with CLL," Cytotherapy, pp. 554-562, 2004.
Hamm RJ, Dixon CE, Gbadebo DM, Singha AK, Jenkins LW, Lyeth BG, Hayes RL. Cognitive deficits following traumatic brain injury produced by controlled cortical impact. Journal of neurotrauma. 1992;9:11-20.
Hanley PJ, Mei Z, Durett AG, et al. (2014) Efficient manufacturing of therapeutic mesenchymal stromal cells with the use of the Quantum Cell Expansion System. Cytotherapy 16(8): 1048-1058.
Harimoto, Masami, et al. "Novel approach for achieving double-layered cell sheets co-culture: overlaying endothelial cell sheets onto monolayer hepatocytes utilizing temperature-responsive culture dishes." Journal of Biomedical Materials Research: An Official Journal of The Society for Biomaterials, The Japanese Society for Biomaterials, and The Australian Society for Biomaterials and the Korean Society for Biomaterials 62.3 (2002): 464-470.
He N, Fan W, Henriquez B, Yu RT, Atkins AR, Liddle C, Zheng Y, Downes M, Evans RM. Metabolic control of regulatory T cell (Treg) survival and function by Lkb1. Proc Natl Acad Sci U S A. 2017;114(47):12542-12547.
He X, Landman S, Bauland SC, van den Dolder J, Koenen HJ, Joosten I. A TNFR2-Agonist Facilitates High Purity Expansion of Human Low Purity Treg Cells. PLoS One. 2016;11(5):e0156311.
Heskins, Michael, and James E. Guillet. "Solution properties of poly (N-isopropylacrylamide)." Journal of Macromolecular Science—Chemistry 2.8 (1968): 1441-1455.
Hill JA, Feuerer M, Tash K, Haxhinasto S, Perez J, Melamed R, Mathis D, Benoist C. Foxp3 transcription-factor-dependent and -independent regulation of the regulatory T cell transcriptional signature. Immunity. 2007;27(5):786-800.
International Search Report and Written Opinion for related International Application No. PCT/US2023/013819; Dated: May 10, 2023; 10 pages.
Abumiya, et al at National Cardiovascular Center Research Institute in Japan, suggest that subjecting human umbilical vein endothelial cells (HUVECs) to laminar shear stress for a period of 8 hours increased the relative expression of VEGFR-2 mRNA (Ateriosclerosis, Thrombosis, and Vascular Biology, 2002).
Afzali B, Edozie FC, Fazekasova H, Scotta C, Mitchell PJ, Canavan JB, Kordasti SY, Chana PS, Ellis R, Lord GM, John S, Hilton R, Lechler RI, Lombardi G. Comparison of regulatory T cells in hemodialysis patients and healthy controls: implications for cell therapy in transplantation. Clin J Am Soc Nephrol. 2013;8(8):1396-405.
Akram, Khondoker M., et al. "Mesenchymal stem cells promote alveolar epithelial cell wound repair in vitro through distinct migratory and paracrine mechanisms." Respiratory research 14.1 (2013): 1-16.
Alberts B, Johnson A, Lewis J, et al. Molecular Biology of the Cell. 4th edition. New York: Garland Science; 2002. Fibroblasts and Their Transformations: The Connective-Tissue Cell Family. Available from: https://www.ncbi.nlm.nih.gov/books/NBK26889.
Alenazi, Noof A., et al. "Modified polyether-sulfone membrane: A mini review." Designed monomers and polymers 20.1 (2017): 532-546.
Almeida L, Lochner M, Berod L, Sparwasser T. Metabolic pathways in T cell activation and lineage differentiation. Semin Immunol. 2016;28(5):514-524.
Amy Putnam, Todd M. Brusko, Michael R. Lee, Weihong Liu, Gregory L. Szot, Taumoha Ghosh, Mark A. Atkinson, and Jeffrey A. Bluestone. Expansion of human regulatory T-Cells from patients with Type 1 Diabetes. Diabetes, 58: 652-662, 2009.
Anurathapan et al., "Engineered T cells for cancer treatment," Cytotherapy, vol. 16, pp. 713-733, 2014.
Aronowski J, Samways E, Strong R, Rhoades HM, Grotta JC. An alternative method for the quantitation of neuronal damage after experimental middle cerebral artery occlusion in rats: Analysis of behavioral deficit. Journal of cerebral blood flow and metabolism : official journal of the International Society of Cerebral Blood Flow and Metabolism. 1996;16:705-713.
Arrigoni, Chiara, et al. "Rotating versus perfusion bioreactor for the culture of engineered vascular constructs based on hyaluronic acid." Biotechnology and bioengineering 100.5 (2008): 988-997.
Azar, Toni, Jody Sharp, and David Lawson. "Heart rates of male and female Sprague-Dawley and spontaneously hypertensive rats housed singly or in groups." Journal of the American Association for Laboratory Animal Science 50.2 (2011): 175-184.
Baecher-Allan, Clare, et al. "CD4+ CD25high regulatory cells in human peripheral blood." The Journal of Immunology 167.3 (2001): 1245-1253.
Bai/Delaney (Nohla Therapeutics) showed that expanding Cord Blood derived CD34+CD38-CD45RA-HSPCs in a biodegradable

(56) References Cited

OTHER PUBLICATIONS zwitterionic hydrogel with a rNotch ligand cocktail for 24 days mitigated HSPC differentiation and promoted self-renewal of lymphoid and myeloid cell phenotypes in an NSG mouse model (Nature Medicine, 2019).
Ballas CB, Zielske SP, Gerson SL (2002) Adult bone marrow stem cells for cell and gene therapies: implications for greater use. J Cell Biochem Suppl 38: 20-28.
Ballke C, Gran E, Baekkevold ES, Jahnsen FL. Characterization of Regulatory T-Cell Markers in CD4+ T Cells of the Upper Airway Mucosa. PLoS One. 2016;11(2):e0148826.
Baraniak PR, McDevitt TC (2010) Stem cell paracrine actions and tissue regeneration. Regen Med 5(1): 121-143.
Barckhausen C, Rice B, Baila S, et al. (2016) GMP-Compliant Expansion of Clinical-Grade Human Mesenchymal Stromal/Stem Cells Using a Closed Hollow Fiber Bioreactor. Methods Mol Biol 1416: 389-412.
Barker et al. "CD34+ Cell Content of 126 341 Cord Blood Units in the US Inventory: Implications for Transplantation and Banking," blood Advances, vol. 3, No. 8, pp. 1267-1271, Apr. 23, 2019.
Bazarian JJ, Cemak I, Noble-Haeusslein L, Potolicchio S, Temkin N. Long-term neurologic outcomes after traumatic brain injury. The Journal of head trauma rehabilitation. 2009;24:439-451.
Bending D, Pesenacker AM, Ursu S, Wu Q, Lom H, Thirugnanabalan B, Wedderburn LR. Hypomethylation at the regulatory T cell-specific demethylated region in CD25hi T cells is decoupled from FOXP3 expression at the inflamed site in childhood arthritis. J Immunol. 2014;193(6):2699-708.
Berendse M, Grounds MD, Lloyd CM (2003) Myoblast structure affects subsequent skeletal myotube morphology and sarcomere assembly. Exp Cell Res 291(2): 435-450.
Bernard, A., Payton, Mar. 1995. "Fermentation and Growth of Escherichia coli for Optimal Protein Production", John Wiley & Sons. Current Protocols in Protein Science (1995) 5.3.1-5.3.18.
Berney SM, Schaan T, Wolf RE, van der Heyde H, Atkinson TP. CD2 (OKT11) augments CD3-mediated intracellular signaling events in human T lymphocytes. J Investig Med. 2000;48(2):102-9.
Bioheart Clinical Trial Clinica 1302 Apr. 18, 2008.
Biomolecular and Cellular Interactions with the Hollow Fiber Membrane Currently Used in the Quantum® Cell Expansion System. 12th NJ Symposium on Biomaterials Science, Oct. 6-7, 2014, New Brunswick, NJ.
Blache C, Chauvin JM, Marie-Cardine A, Contentin N, Pommier P, Dedreux I, Francois S, Jacquot S, Bastit D, Boyer O. Reduced frequency of regulatory T cells in peripheral blood stem cell compared to bone marrow transplantations. Biol Blood Marrow Transplant. 2010;16(3):430-4.
Bluestone et al. Type 1 diabetes immunotherapy using polyclonal regulatory T cells. Science Translational Medicine 7 (315): 1-34, 2015.
Bluestone JA, Tang Q. Treg cells-the next frontier of cell therapy. Science. 2018;362(6411):154-155.
Blum S, Moore AN, Adams F, Dash PK. A mitogen-activated protein kinase cascade in the ca1/ca2 subfield of the dorsal hippocampus is essential for long-term spatial memory. The Journal of neuroscience : the official journal of the Society for Neuroscience. 1999;19:3535-3544.
Boitano, Anthony E., et al. "Aryl hydrocarbon receptor antagonists promote the expansion of human hematopoietic stem cells." Science 329.5997 (2010): 1345-1348.
Bojun Li et al. Heparin-induced conformation changes of fibronectin within the extracellular matrix promote hMSC osteogenic differentiation. Biomaterials Science 3: 73-84, 2015.
Boquest AC, Shahdadfar A, Brinchmann JE, Collas P. Isolation of Stromal Stem Cells from Human Adipose Tissue. Methods Mol Biol. 2006;325:35-46. doi: 10.1385/1-59745-005-7:35. PMID: 16761717.

Borden, M. and Longo, M., "Dissolution Behavior of Lipid Monolayer-Coated, Air-Filled Microbubbles: Effect of Lipid Hydrophobic Chain Length," Langmuir, vol. 18, pp. 9225-9233, 2002.
Bourke, Sharon L., and Joachim Kohn. "Polymers derived from the amino acid L-tyrosine: polycarbonates, polyarylates and copolymers with poly (ethylene glycol)." Advanced drug delivery reviews 55.4 (2003): 447-466.
Brand, K. and Hermfisse, U., "Aerobic Glycolysis by Proliferating Cells: a Protective Strategy against Reactive Oxygen Species," The FASEB Journal, vol. 11, pp. 388-395, Apr. 1997.
Brentjens et al., "CD19-Targeted T Cells Rapidly Induce Molecular Remission in Adults with Chemotherapy-Refractory Acute Lympohblastic Leukemia," Science Translational Medicine, vol. 5, Issue 177, pp. 1-9, Mar. 20, 2013.
Brentjens et al., "Safety and Persistance of Adoptively Transferred Autologous CD19-Target T Cells in Patients with Relapsed or Chemotherapy Refractory B-Cell Leukemias," Blood, vol. 118, No. 18, pp. 4817-4828, Nov. 3, 2011.
Brunstein C, Miller J, Cao Q, McKenna D, Hippen K, Curtsinger J, DeFor T, Levine B, June C, Rubinstein P, McGlave P, Blazar B, Wagner J. Infusion of ex vivo expanded T regulatory cells in adults transplanted with umbilical cord blood: safety profile and detection kinetics. Blood 2011; 117(3):1061-1070.
C. H. Weaver, et al. An Analysis of Engraftment Kinetics as a function of the CD34 Content of the Peripheral Blood Progenitor Cell Collections in 692 Patients After the Administration of Myeloblative Chemotherapy. Blood 86(10):3691-3969, 1995.
Cano, Angels, Cristina Minguillón, and Cristina Palet. "Immobilization of endo-1, 4-ß-xylanase on polysulfone acrylate membranes: Synthesis and characterization." Journal of membrane science 280. 1-2 (2006): 383-388.
Carswell, K. and Papoutsakis, E. "Culture of Human T Cells in Stirred Bioreactors for Cellular Immunotherapy Applications: Shear, Proliferation, and the IL-2 Receptor," Biotechnology and Bioengineering, vol. 68, No. 3, pp. 329-338, May 5, 2000.
Celeste Nelson et al., Emergent patterns of growth controlled by multicellular form and mechanics, (in Christopher Chen's Lab demonstrated, in separate experiments, that curved surfaces with a radius of curvature (200 ?m) that is greater than the cell diameter and surfaces that have undulating special patterning (depressions) increase the patterned growth of ECs [PNAS 102(33): 11594-11599, 2005].
Chapman NM, Chi H. mTOR signaling, Tregs and immune modulation. Immunotherapy. 2014;6(12):1295-311.
Chaudhry A, Samstein RM, Treuting P, Liang Y, Pils MC, Heinrich JM, Jack RS, Wunderlich FT, Bruning JC, Muller W, Rudensky AY. Interleukin-10 signaling in regulatory T cells is required for suppression of Th17 cell-mediated inflammation. Immunity. 2011;34(4):566-78.
Chen, C. and Broden, M., "The Role of Poly(theylene glycol) Brush Architecture in Complement Activation on Targeted Microbubble Surfaces," Biomaterials, vol. 32, No. 27, pp. 6579-6587, Jun. 17, 2011.
Choi W, Kwon SJ, Jin HJ, et al. (2017) Optimization of culture conditions for rapid clinical-scale expansion of human umbilical cord blood-derived mesenchymal stem cells. Clin Transl Med 6(1): 38.
Chullikana A, Majumdar AS, Gottipamula S, et al. (2015) Randomized, double-blind, phase I/II study of intravenous allogeneic mesenchymal stromal cells in acute myocardial infarction. Cytotherapy 17(3): 250-261.
Coeshott C, Vang B, Jones M, Nankervis B. Large-scale expansion and characterization of CD3(+) T-cells in the Quantum((R)) Cell Expansion System. J Transl Med. 2019;17(1):258.
Coombes JL, Robinson NJ, Maloy KJ, Uhlig HH, Powrie F. Regulatory T cells and intestinal homeostasis. Immunol Rev. 2005;204:184-94.
Coquillard C. mTOR Signaling in Regulatory T cell Differentiation and Expansion. SOJ Immunology. 2015;3(1):1-10.

* cited by examiner

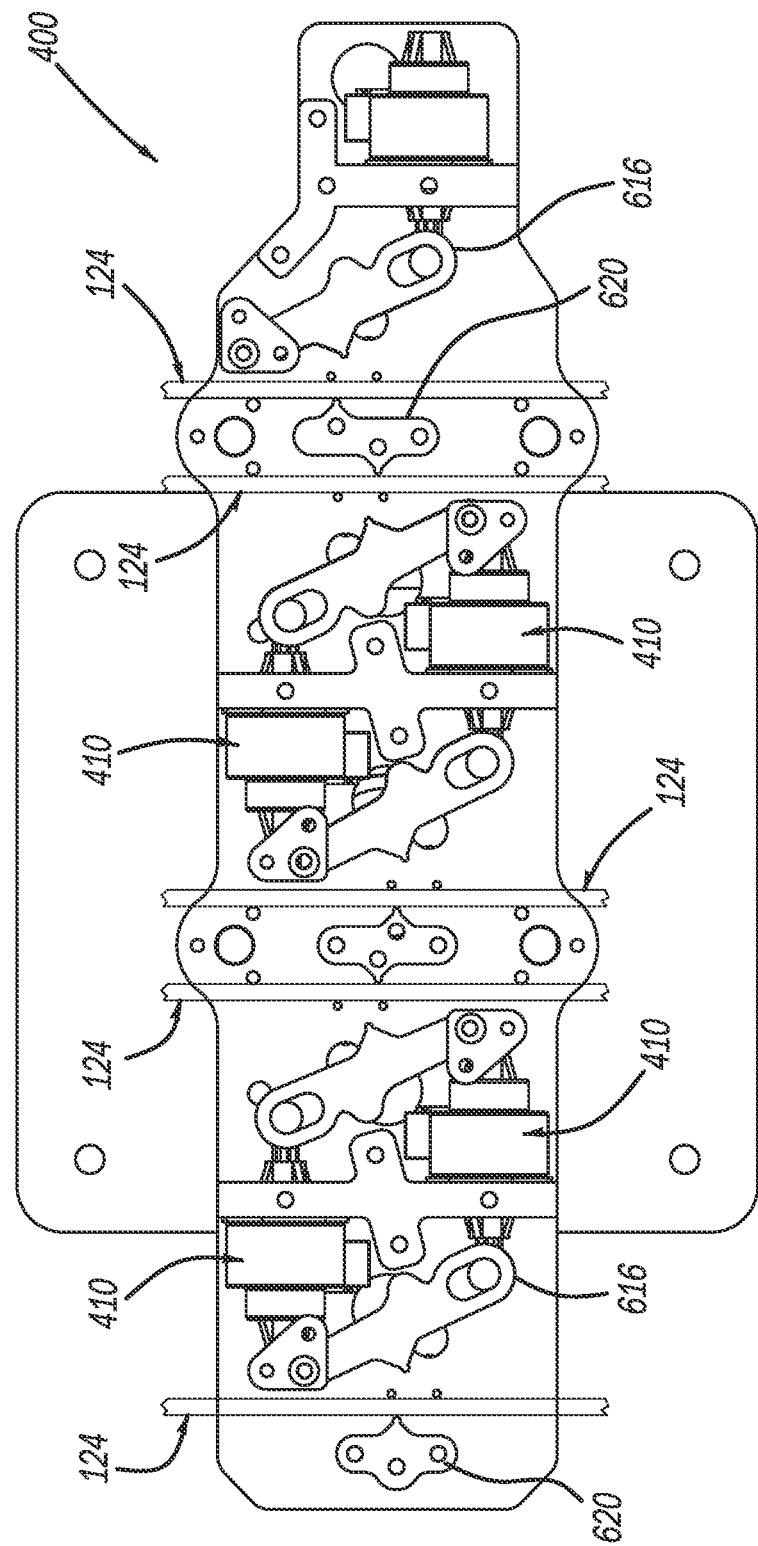

MULTIPLE-TUBE PINCH VALVE ASSEMBLY

CROSS-REFERENCE TO RELATED PATENT APPLICATION

This application claims the benefit of U.S. Provisional Patent Application No. 63/314,931 filed on Feb. 28, 2022, the entire disclosure of which is incorporated herein by reference.

BACKGROUND

The present disclosure is generally directed to pinch valves, in particular, toward pinch valves for selectively controlling flow through multiple tubes.

In general, internal and/or external valves have been used to selectively control the flow of a fluid (e.g., a gas, a liquid, etc., and/or combinations thereof) through tubing or some other conduit. These valves may be operated to completely or partially block fluid flow. While internal valves are arranged at least partially within a lumen of the tubing, external valves allow fluid flow control from outside of the tubing. In particular, an external valve allows a force to be applied to an external surface of the tubing, or soft conduit, deforming the lumen of the tubing from an unrestricted state to an occluded, or partially occluded, state.

BRIEF SUMMARY

External valves (e.g., pinch valves, etc.) provide the ability to control fluid flow in tubing without requiring the installation of expensive and complex internal valves. Typical pinch valves control fluid flow in tubing by compressing an outer portion of the tubing thereby closing a lumen disposed in an inner portion of the tubing. As can be appreciated, pinch valves offer a sterile fluid flow control for tubing where the components of the pinch valve do not come into direct contact with fluid inside the tubing.

In some examples, a tubing arrangement or system design may require that more than one tube, or section of tubing, be closed at the same time or at different times. In conventional systems, a pinch valve may be positioned at each discrete area where fluid flow control may be desired. Each pinch valve may be independently operated by a respective actuator. In this conventional approach, as the number of the discrete fluid flow control areas increases, so does the number of pinch valves required to service the system. Since each pinch valve includes its own actuator, the cost and complexity of this conventional approach necessarily increases. In addition, the number of components required to perform the fluid control operations under the conventional approach increases the potential for failure and the time required for routine maintenance operations.

It is with respect to the above issues and other problems that the embodiments presented herein were contemplated. Among other things, the present disclosure provides a multiple-tubing, or multi-tubing, pinch valve assembly that is capable of pinching more than one tube, or section of tubing, with a single actuator. In some examples, the multi-tubing pinch valve assembly may be configured to pinch various tubes, or tubing sections, simultaneously. Additionally or alternatively, the multi-tubing pinch valve assembly may pinch a first set of tubes at a first time and pinch a second set of tubes at a different second time. In one example, the multi-tubing pinch valve assembly may allow flow through the first set of tubes while pinching the second set of tubes (e.g., preventing flow, etc.), and vice versa.

In one example, the multi-tubing pinch valve assembly may comprise a compact valve array that is capable of executing a sequence of opening and closing flow paths to each bioreactor in a multiple-bioreactor system. The multi-tubing pinch valve assembly may comprise a valve mechanism that may be built into a bioreactor rocker assembly. This design, among other things, greatly simplifies a disposable set (e.g., tubing set, etc.) used in cell expansion systems, sterile fluid management systems, any suitable system that uses a multi-tubing valving scheme for sterile fluid pathway management, etc. Additionally or alternatively, the multi-tubing pinch valve assembly may integrate with a soft cassette of a disposable set.

In some examples, the multi-tubing pinch valve assembly may correspond to a cam-driven valve array that provides a compact method of opening/closing many parallel tubes in a set sequence. This approach may allow a multiple-bioreactor cell expansion system to execute a "time share" or "duty cycle" method of servicing multiple bioreactors, with the valve array being located on the bioreactor rocker rather than on a static cassette. As can be appreciated, the multi-tubing pinch valve assembly is not limited to use in a multiple-bioreactor system. For instance, the mechanism of the multi-tubing pinch valve assembly may be adapted to any situation where multiple valves may be required to have their positions fixed relative to others.

In a cam-driven approach, the multi-tubing pinch valve assembly may utilize a finger pump type mechanism having the orientation of the tube and fingers rotated 90 degrees relative to the cam. Rather than pumping a single tube, the multi-tubing pinch valve assembly is capable of valving many tubes simultaneously. This multi-tubing pinch valve assembly design can be paired with a soft cassette, as the fingers actuate in a direction normal to the soft cassette plane. The multi-tubing pinch valve assembly allows the occlusion depth to be tightly controlled, which allows for the possibility of intentionally partially occluding tubes (e.g., partial restriction of fluid flow, etc.). Another benefit of the examples described herein include the compact size and simplified electronics of the multi-tubing pinch valve assembly. Among other things, these features allow the valve unit to be mounted to a bioreactor rocker, in some cases, thereby simplifying a disposable set used in cell expansion systems, for example, by reducing the number of tubes that must run from the bioreactors to the static cassette. Further, the multi-tubing pinch valve assembly may ensure that valve positions are locked relative to each other, allowing assurance of correct flow. For example, it can be assured that one of the tubes in the time share model is always open, preventing pressure buildup, or two tubes may always be open or closed relative to each other, assuring a complete fluid path.

In some examples, the multi-tubing pinch valve assembly may be driven by a motor operatively connected to a camshaft comprising two cam profiles. A first anvil assembly may be disposed adjacent a first cam profile of the two cam profiles and a second anvil assembly may be disposed adjacent a second cam profile of the two cam profiles. As the motor rotates the camshaft, the two cam profiles rotate relative to the first anvil assembly and the second anvil assembly. At specific angles of rotation, at least one cam lobe, or protrusion, disposed on the cam profile may contact the first anvil assembly and the second anvil assembly. For instance, a first cam lobe associated with the first cam profile may contact the first anvil assembly at a first angle of rotation of the camshaft. As the first cam lobe contacts the first anvil assembly, the shape of the first cam lobe may cause the first anvil assembly to move in a direction away from the camshaft toward a pinch plate. A first section of tubing may be disposed in a first space between the first anvil and the pinch plate. In this arrangement, as the first anvil assembly moves toward the pinch plate, a first anvil of the first anvil assembly may contact and deform the first section of tubing such that a lumen of the first section of tubing closes. The first section of tubing may remain closed while the first cam lobe is at, or within a predetermined angular range (e.g., 1-5 degrees) of, a highest displacement point of the first cam lobe and the first anvil maintains the first section of tubing in a closed state.

The multi-tubing pinch valve assembly may be configured as an array of independently actuated multiple-tubing pinch valves. For instance, the multi-tubing pinch valve assembly may include a five-valve array of independently actuated four-tube pinch valves. At least one benefit to this independent actuation arrangement includes, but is in no way limited to, operating the multi-tubing pinch valve assembly in any combination of open or closed states.

This present disclosure describes, among other things, a multi-tubing pinch valve assembly comprising an array that is split into discrete multi-tube valves (e.g., an array of five 4-tube pinch valves), each multi-tube valve in the array capable of being driven by a small linear actuator (e.g., a solenoid, piezoelectric actuator, screw-type actuator, pneumatic cylinder, hydraulic cylinder, and/or a stepper motor linear actuator, etc.). This approach allows for any combination of valve states during a protocol (e.g., system operation, etc.). For example, in a cell expansion system, all valves may be opened during loading of a disposable (e.g., tubing set, etc.), valves may cycle continuously on a 10-second duty cycle during a cell feed, and valves may be opened sequentially for longer durations during tasks such as cell harvest, and/or the like.

In some examples, the pinching jaws of each multi-tube valve (e.g., 4-tube valve, etc.) of the multi-tubing pinch valve assembly may be slightly offset from one another. Among other things, this arrangement may reduce the pinch force from the actuator that may be required to occlude the tubing and increase the jaw gap range that results in occlusion. Such an increased jaw gap may provide enhanced cycling life and tubing integrity over time compared to designs including a decreased jaw gap. In one example, a single set of opposing jaws may pinch four tubes at once. Additionally or alternatively, the independent operability of each of the multi-tube valves may allow for disposable design optimization and simplification when compared with designs that require different valving.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 6A shows a first perspective view of a multi-tubing pinch valve assembly in an array configuration in accordance with examples of the present disclosure;

DETAILED DESCRIPTION

Figure 1A:
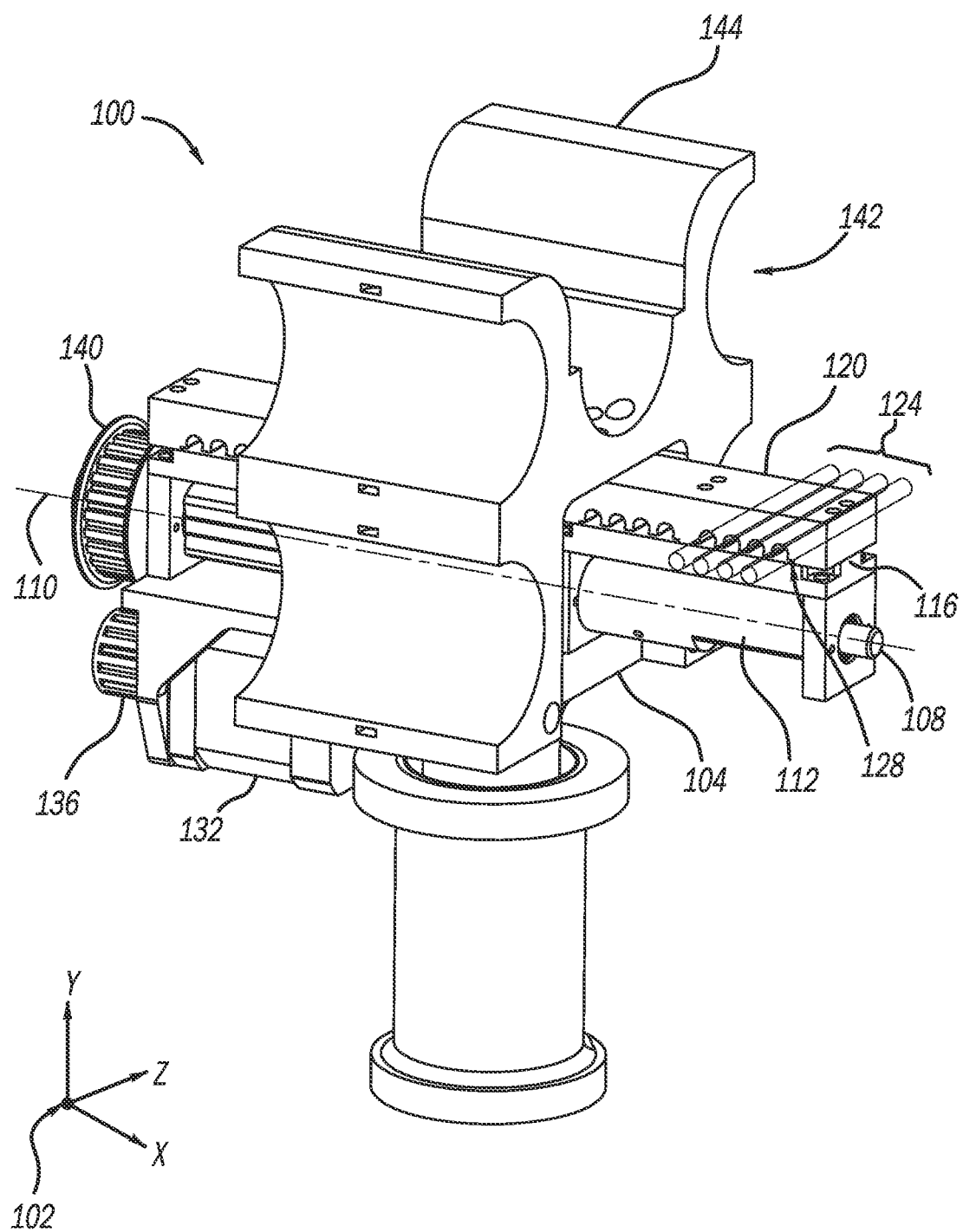
FIG. 1A shows a first perspective view of a multi-tubing pinch valve assembly in accordance with embodiments of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Various aspects of the present disclosure will be described herein with reference to drawings that may be schematic illustrations of idealized configurations.

Conventional external valving solutions generally utilize a single pinch valve to control fluid flow in a single tube. When fluid flow control is required for multiple tubes, each tube of the multiple tubes may employ a respective pinch valve. As can be appreciated, this conventional arrangement increases the number of components needed for a multiple-tube fluid flow control application. With the increased number of components, the complexity of the conventional multiple-tube fluid flow control application increases. Additionally or alternatively, control of each pinch valve in a multiple-tube fluid flow control application, where each tube has its own pinch valve, requires complex valve controls, timing, wiring, and programming. In any event, employing a single pinch valve for every tube, or section of tubing, that is to be pinched in a conventional approach results in increased maintenance times, failures, and system complexity.

It is with respect to the above issues and other problems that the embodiments presented herein were contemplated.

Referring now to FIGS. 1A-1D, a multiple-tube pinch valve assembly 100 is shown in accordance with embodiments of the present disclosure. The multiple-tube pinch valve assembly 100 may comprise a base 104 (e.g., baseplate, frame, support structure, etc.), a camshaft 108, at least one cam 112 attached to the camshaft 108, at least one anvil assembly 150, and a tubing platen 120. In some examples, the tubing platen 120 may comprise a plurality of tube receiving apertures 128 disposed along a length of the tubing platen 120. Each tube receiving aperture 128 of the plurality of tube receiving apertures 128 may be configured to receive a tube, or section of tubing, therein. The plurality of tube receiving apertures 128 may extend in a direction that is perpendicular to the longitudinal axis 110 of the camshaft 108.

Features of the multiple-tube pinch valve assembly 100 may be described in conjunction with a coordinate system 102. The coordinate system 102, as shown in the figures, includes three-dimensions comprising an X-axis, a Y-axis, and a Z-axis. Additionally or alternatively, the coordinate system 102 may be used to define planes (e.g., the XY-plane, the XZ-plane, and the YZ-plane) of the multiple-tube pinch valve assembly 100. These planes may be disposed orthogonal, or at 90 degrees, to one another. While the origin of the coordinate system 102 may be placed at any point on or near the components of the multiple-tube pinch valve assembly 100, for the purposes of description, the axes of the coordinate system 102 are always disposed along the same directions from figure to figure. In some examples, reference may be made to dimensions, angles, directions, relative positions, and/or movements associated with one or more components of the multiple-tube pinch valve assembly 100 with respect to the coordinate system 102. For example, the width of the multiple-tube pinch valve assembly 100 may be defined as a dimension along the X-axis of the coordinate system 102, the height of the multiple-tube pinch valve assembly 100 may be defined as dimension along the Y-axis of the coordinate system 102, and the depth of the multiple-tube pinch valve assembly 100 may be defined as a dimension along the Z-axis of the coordinate system 102. Additionally or alternatively, the width of the tubing platen 120 may be defined as a dimension along the X-axis of the coordinate system 102, the height of the tubing platen 120 may be defined as dimension along the Y-axis of the coordinate system 102, and the depth of the tubing platen 120 may be defined as a dimension along the Z-axis of the coordinate system 102.

The multiple-tube pinch valve assembly 100 may include a motor 132 having an output shaft 134, a drive body 136, and a cam drive body 140. As the output shaft 134 of the motor 132 rotates, power is transmitted from the drive body 136 to the cam drive body 140. In one example, the drive body 136 and the cam drive body 140 may be configured as respective gears in meshing contact with one another. In one example, the drive body 136 and the cam drive body 140 may correspond to pulleys (e.g., timing belt pulleys, V-pulleys, etc.). In this example, power may be transmitted from the drive body 136 to the cam drive body 140 via a drive belt 138. The drive belt 138 may correspond to a timing belt, a V-belt, a ribbed V-belt, a link V-belt, etc., and/or any other continuous belt. In any of these examples, as the output shaft 134 of the motor 132 rotates, the camshaft 108 is caused to rotate about the longitudinal axis 110. Rotation of the camshaft 108 causes the cam 112 having at least one cam profile shape to rotate about the longitudinal axis 110. The cam 112 may be keyed (e.g., via a key and keyway, a spline, etc.), fixed, formed from, and/or otherwise affixed to the camshaft 108. The cam 112 may rotate through 360 degrees. At various angular rotations, different portions of the cam profile shape of the cam 112 may be presented to an anvil assembly 150. For instance, as a protrusion of the cam 112 contacts the anvil assembly 150, the anvil assembly 150 may lift (e.g., move in the positive Y-axis direction) toward the tubing platen 120 and as a recess, or heel, of the cam 112 contacts the anvil assembly 150, the anvil assembly 150 may lower (e.g., move in the negative Y-axis direction) away from the tubing platen 120. In this manner, the rotation of the camshaft 108 may cause the anvil assembly 150 to pinch the multiple tubes 124 in the tube receiving apertures 128 of the multiple-tube pinch valve assembly 100.

In some examples, the multiple-tube pinch valve assembly 100 may include a bioreactor support frame 144. The bioreactor support frame 144 may comprise a plurality of recesses 142 configured to receive and/or hold a respective bioreactor (e.g., hollow fiber bioreactor, cell expansion system bioreactor, etc.). In some examples, the multiple tubes 124 that are disposed in the tube receiving apertures 128 may be interconnected to the multiple bioreactors that are held, or supported, by the bioreactor support frame 144. Fluid flow control to multiple bioreactors may benefit from altering the timing associated with opening and closing the multiple tubes 124 associated with each bioreactor at a same time or at different times.

Figure 1B:
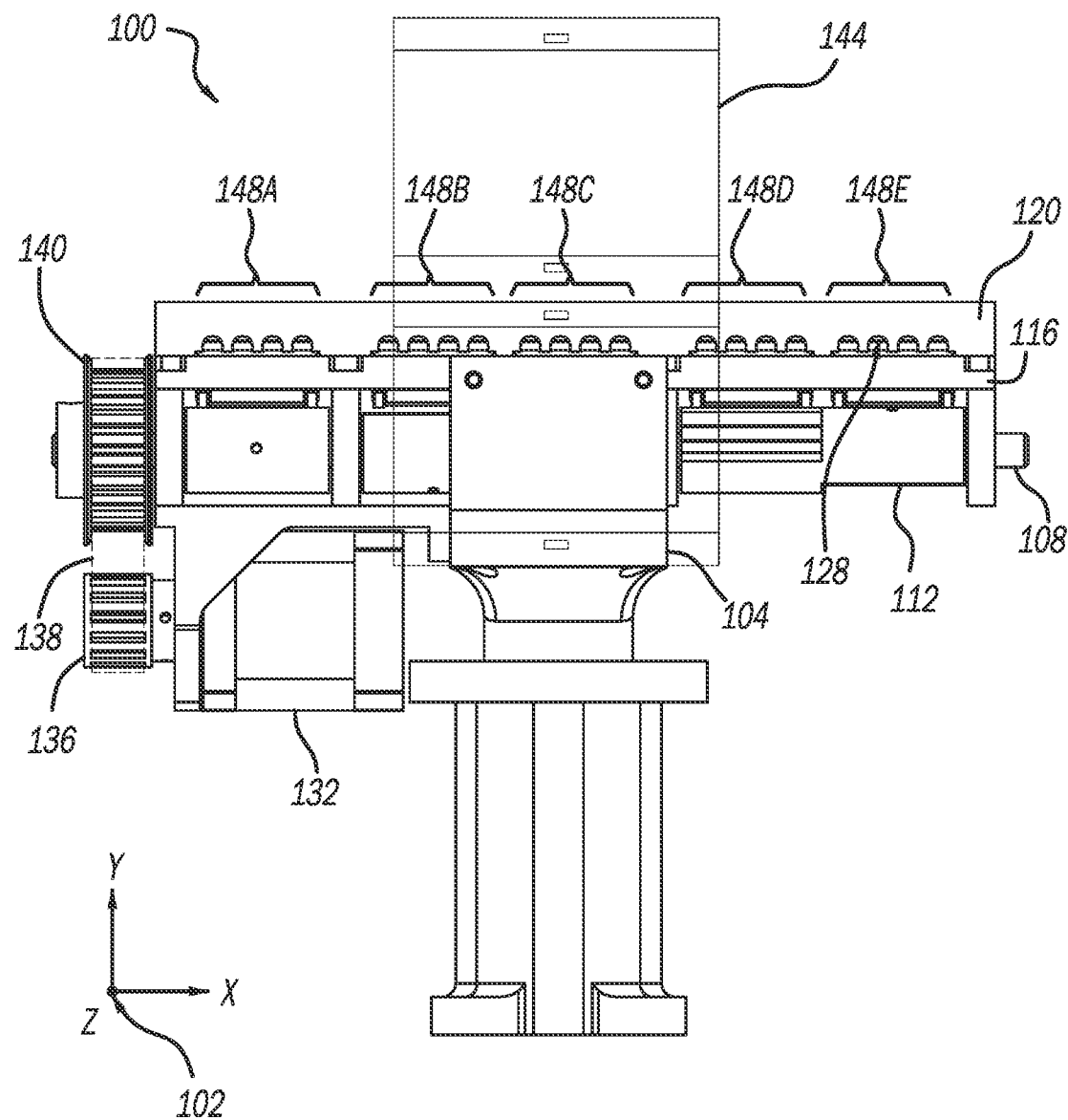
FIG. 1B shows a front elevation view of the multi-tubing pinch valve assembly shown in FIG. 1A.
Figure 1C:
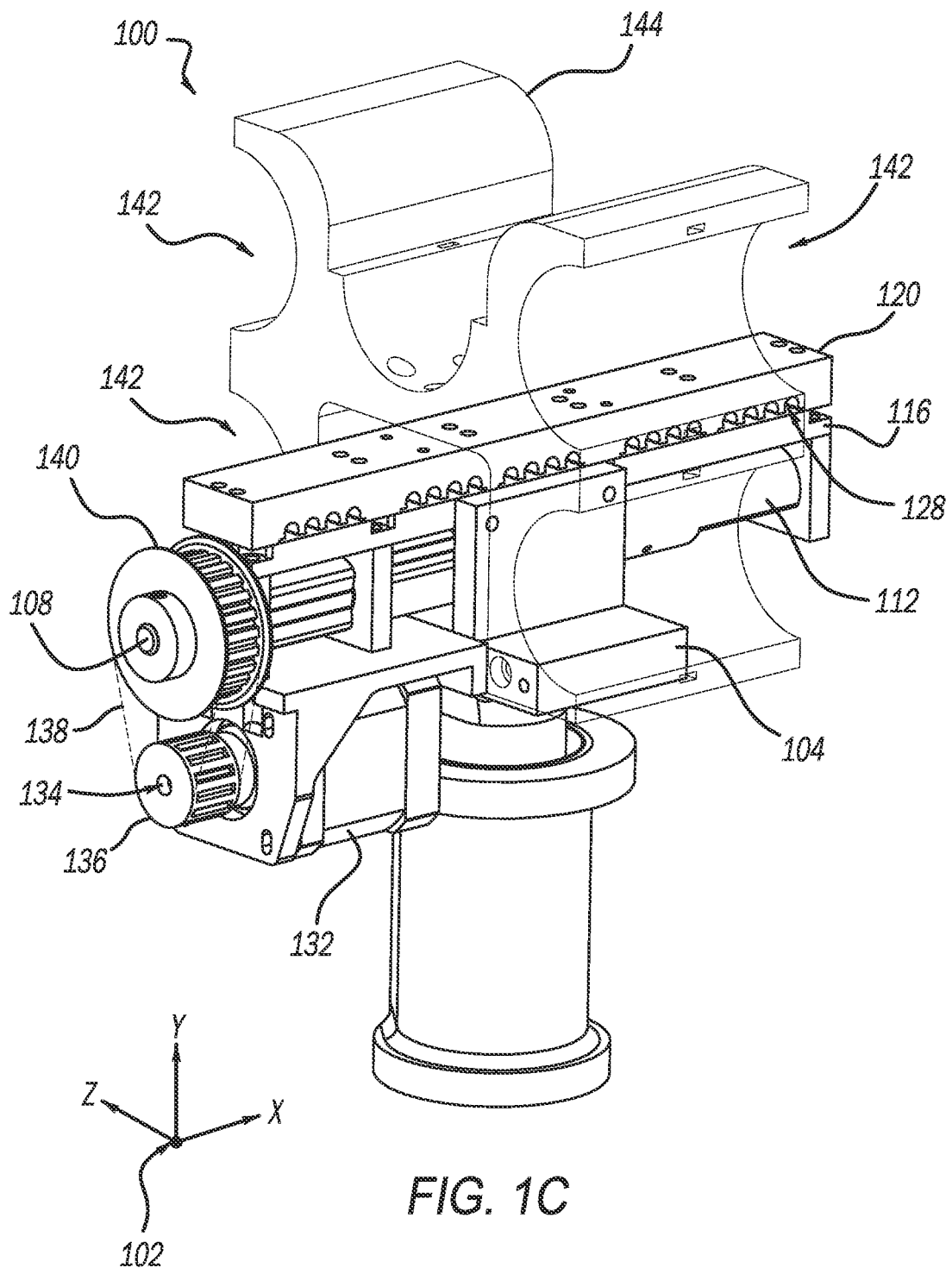
FIG. 1C shows a second perspective view of the multi-tubing pinch valve shown in FIG. 1A.

As shown in the front elevation view of FIG. 1B, the multiple-tube pinch valve assembly 100 may be configured to have a valve array 148A-148E, or an array of valves, comprising a first multi-tube valve 148A, a second multi-tube valve 148B, a third multi-tube valve 148C, a fourth multi-tube valve 148D, and/or a fifth multi-tube valve 148E. Each multi-tube valve of the valve array 148A-148E, may be associated with a set of tubes dedicated to a particular bioreactor. For instance, the first multi-tube valve 148A may control the fluid flow of multiple tubes 124 that are received in the tube receiving apertures 128 associated with the first multi-tube valve 148A. Continuing this example, the second multi-tube valve 148B may control the fluid flow of multiple tubes 124 that are received in the tube receiving apertures 128 associated with the second multi-tube valve 148B, and so on. Each multi-tube valve of the valve array 148A-148E may include a respective anvil assembly 150 and a respective cam 112. In this manner, the cam 112 may be arranged on the camshaft 108 such that one multi-tube valve of the valve array 148A-148E can be operated at an individual, or independent, timing relative to the other multi-tube valves in the valve array 148A-148E. Stated another way, a cam 112 of one multi-tube valve of the valve array 148A-148E may be rotationally oriented out of phase from at least one other multi-tube valve of the valve array 148A-148E. In this example, as the camshaft 108 rotates, the valves in the valve array 148A-148E may open and close at the same or different times. In some examples, the valve array 148A-148E may be disposed along a length of the longitudinal axis 110 (e.g., in the X-axis direction) of the camshaft 108. Although shown comprising five separate valves 148A-148E, the multi-tubing pinch valve assembly 100 may include any number of valves. In some examples, the number of valves may be configured to match a number of bioreactors or sets of multiple tubes 124 that require fluid flow control. As can be appreciated, the valve array of the multi-tubing pinch valve assembly 100 may comprise one, two, three, four, five, or more valves.

Figure 1D:
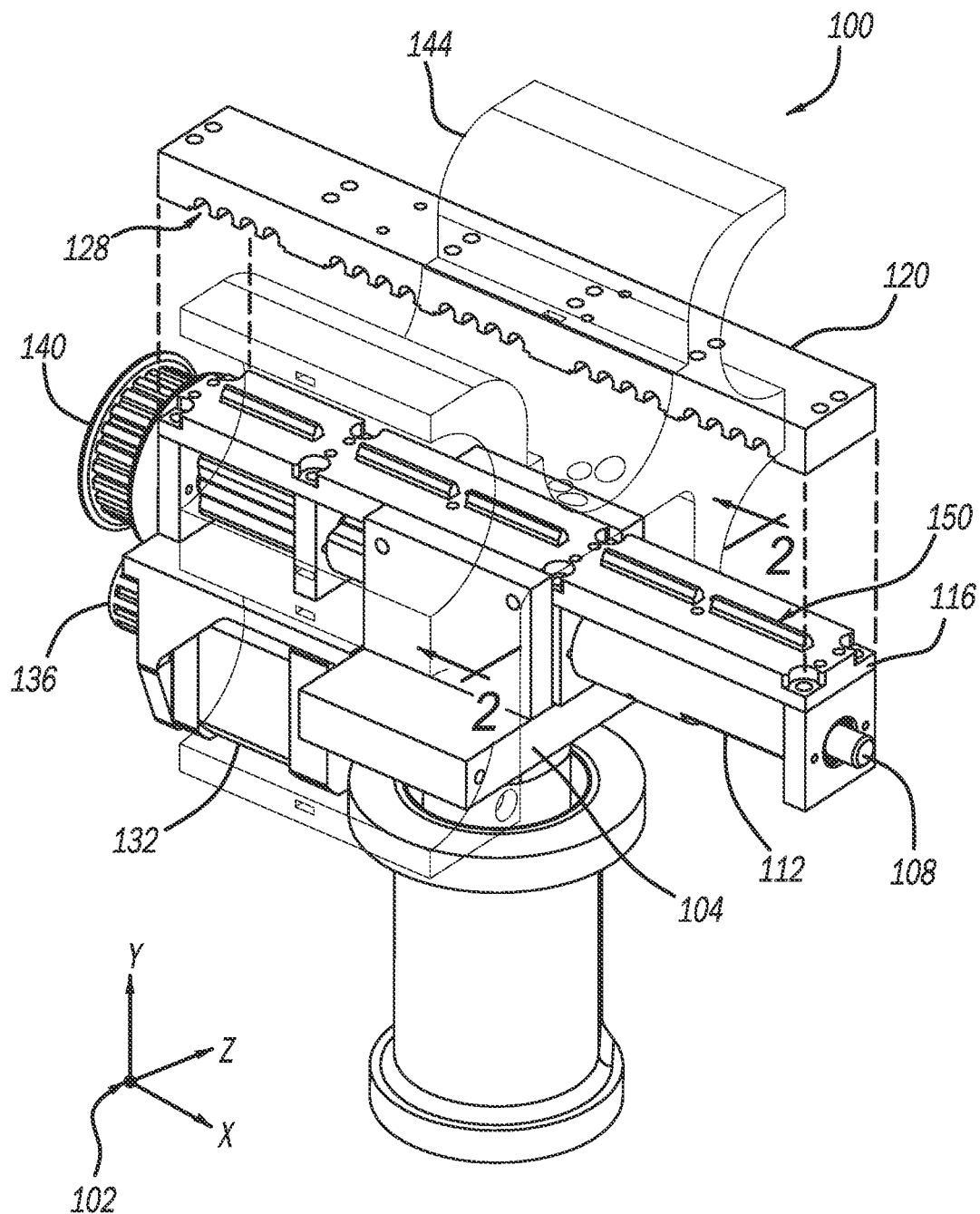
FIG. 1D shows a partially exploded perspective view of the multi-tubing pinch valve assembly shown in FIG. 1A.

FIG. 1D shows a partially exploded perspective view of the multi-tubing pinch valve assembly 100, exposing the anvil grating plate 116. The anvil grating plate 116 may comprise a number of apertures passing therethrough. The apertures may be arranged along the X-axis of the anvil grating plate 116. Each aperture may be sized to receive a portion of the anvil assembly 150. As the camshaft 108 rotates, the cam 112 may contact the anvil assembly 150 moving a portion of the anvil assembly 150 into and/or out of the apertures. The anvil grating plate 116 may comprise a top surface that is arranged a distance from a tubing platen contact surface of the tubing platen 120. This distance may provide a space in which the multiple tubes 124 are disposed. As can be appreciated, as the portion of the anvil assembly 150 enters this space, the multiple tubes 124 may be closed (e.g., pinched) and as the portion of the anvil assembly 150 leaves this space, the multiple tubes 124 may be opened. Additional detail regarding this cam-actuated pinching and fluid flow control of multiple tubes is described in conjunction with FIGS. 2A-3C.

Figure 2A:
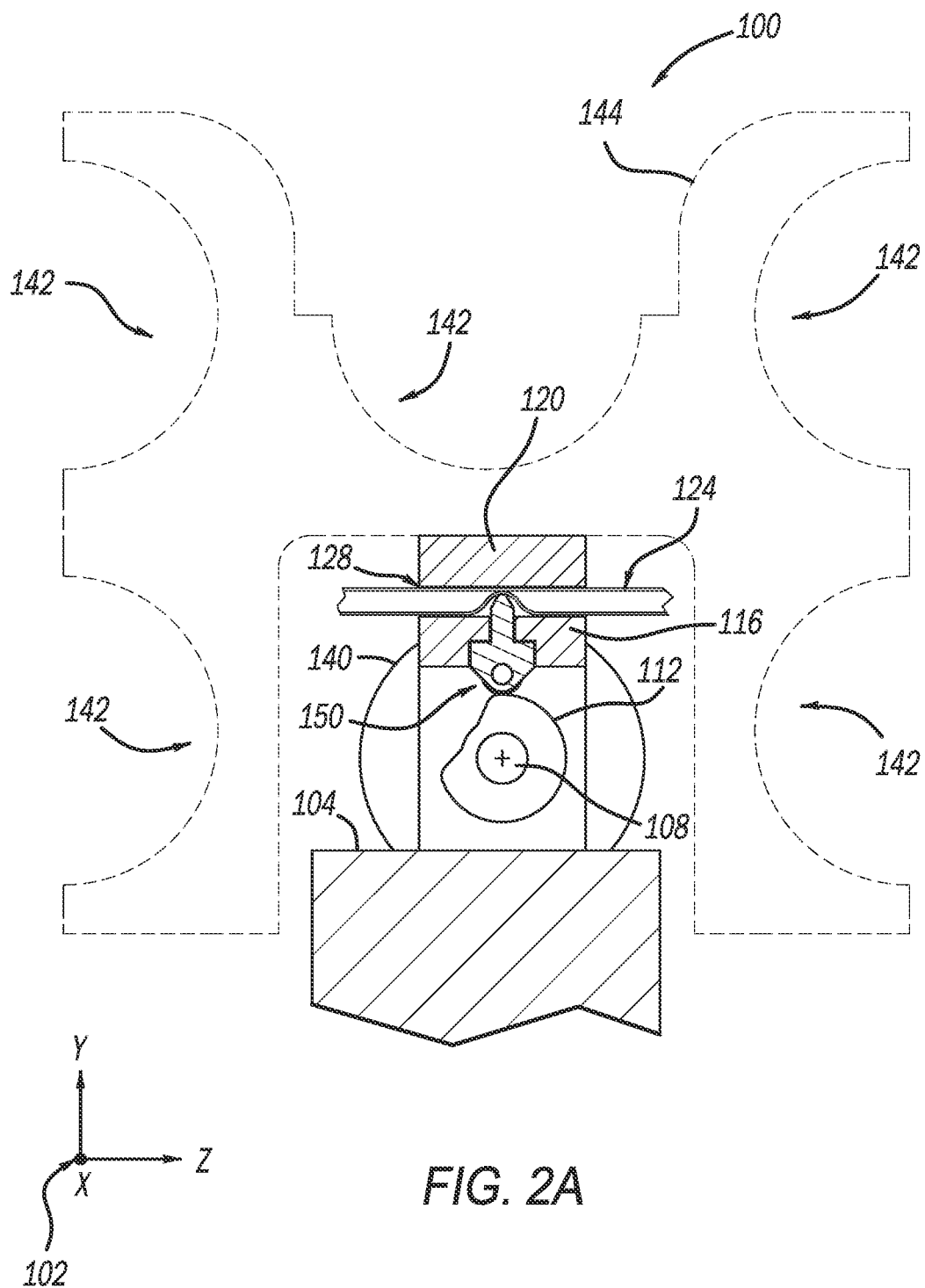
FIG. 2A shows a schematic section view of the multi-tubing pinch valve assembly taken through line 2-2 shown in FIG. 1D.

FIG. 2A shows a schematic section view of the multi-tubing pinch valve assembly taken through line 2-2 shown in FIG. 1D. The camshaft 108 is shown having the cam 112 oriented rotationally in a position where the anvil assembly 150 is pinching the multiple tubes 124 disposed in the tube receiving apertures 128 (e.g., in the space between the anvil grating plate 116 and the tubing platen 120). In this position, the anvil assembly 150 is in contact with a cam lobe of the cam 112 and the multiple tubes 124 are shown in a pinched state. Fluid flow through the multiple tubes 124 is restricted in the pinched state where the anvil assembly 150 contacts the multiple tubes 124.

Figure 2B:
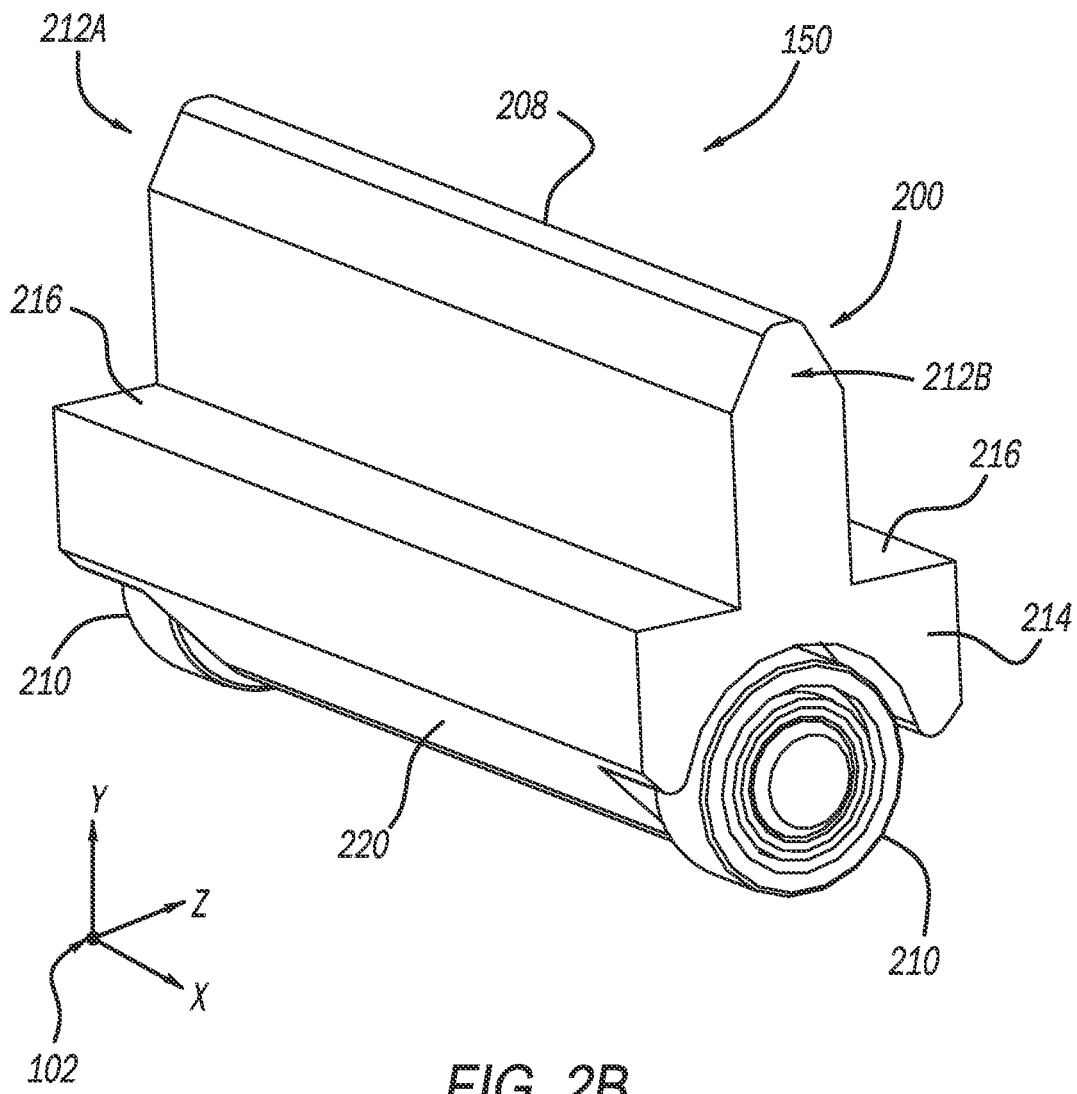
FIG. 2B shows a perspective view of an anvil assembly in accordance with examples of the present disclosure.

The anvil assembly 150, shown in greater detail in FIG. 2B, includes an anvil 200 comprising an anvil body 204 and a pinch edge 208 extending from a first end 212A to a second end 212B of the anvil assembly 150. The anvil 200 may comprise a protrusion extending from at least one stop ledge 216 of the anvil body 204 in the Y-axis direction. The protrusion may be sized to engage with an aperture, or receptacle, in the anvil grating plate 116 (e.g., in a slip fit, clearance fit, and/or the like). The protrusion may terminate at the pinch edge 208. In some examples, the pinch edge 208 may be flat, radiused, or sharp. The pinch edge 208 may comprise a tapered portion that slopes away from the pinch edge 208 toward the stop ledge 216. In some examples, the tapered portion may allow a section of the multiple tubes 124 being pinched to flex and move around the pinch edge 208. This shape, among other things, may reduce stresses placed on the multiple tubes 124 during pinching.

The anvil assembly 150 may comprise at least one cam contact portion disposed on a lower portion of the anvil body 204. The at least one cam contact portion may extend past the anvil body 204. In any event, the at least one cam contact portion may provide a contact surface between the anvil body 204 and the cam 112 of the multiple-tube pinch valve assembly 100. In some examples, the at least one cam contact portion may correspond to a cam follower 210, or other bearing. The cam follower 210, in some cases, may be made to include a hardened steel wheel and a bearing (e.g., roller bearing, ball bearing, etc.). The lower portion of the anvil body 204 may include a tapered surface 220 disposed on either side of a plane running through a center of the anvil body 204 (e.g., along the XY-plane). The tapered surface 220 may provide clearance for portions of the cam 112 and the cam profile shape as the cam 112 moves relative to the anvil body 204 and anvil assembly 150.

Figure 3A:
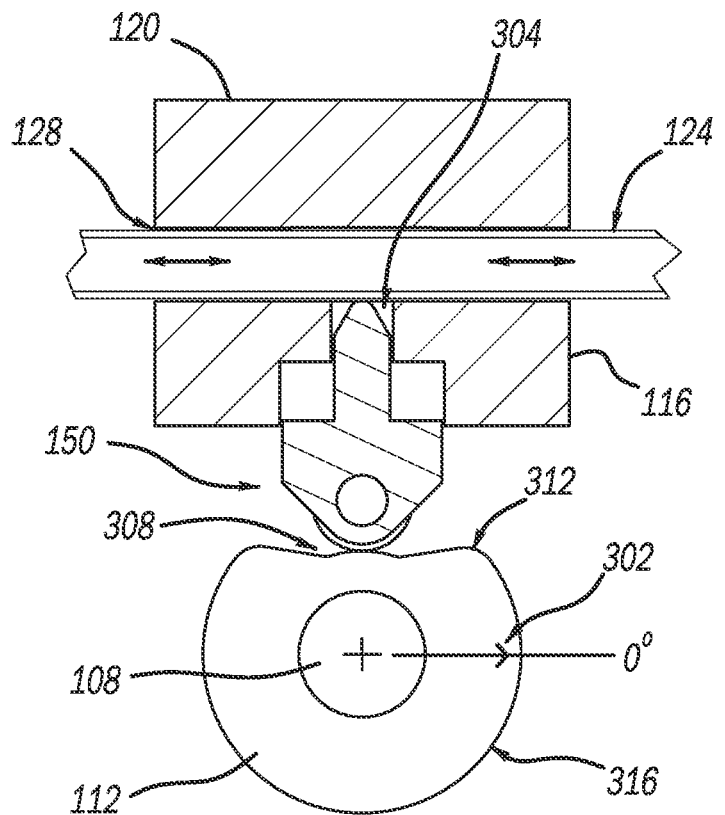
FIG. 3A is a schematic section view of the anvil assembly and cam of a multi-tubing pinch valve assembly at a first rotational position in accordance with examples of the present disclosure.
Figure 3B:
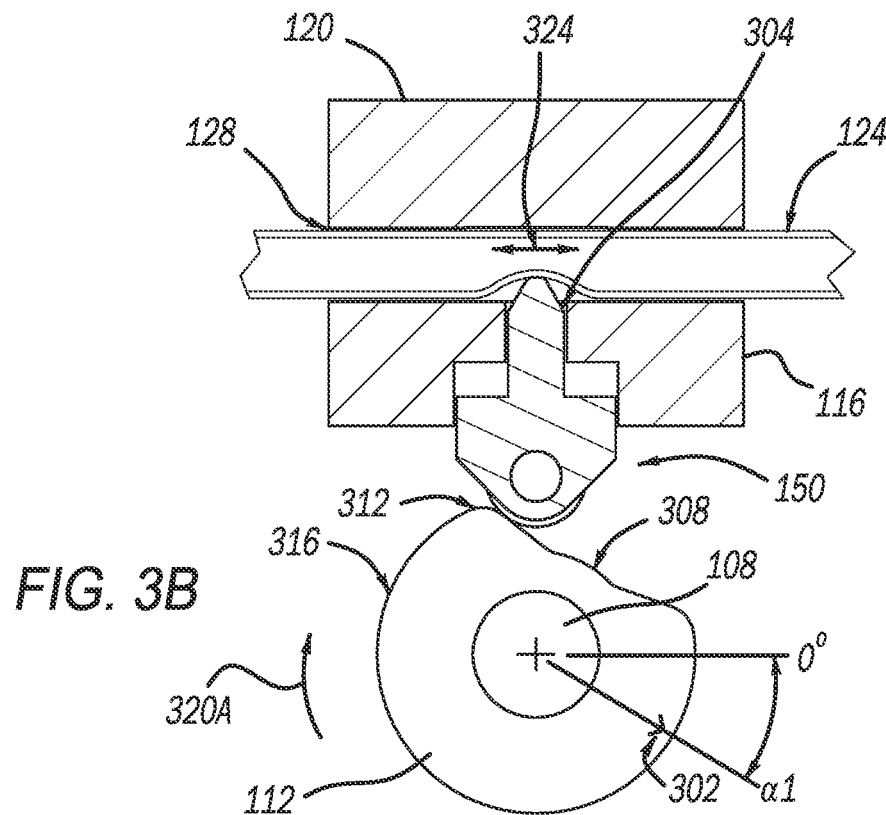
FIG. 3B is a schematic section view of the anvil assembly and cam of a multi-tubing pinch valve assembly at a second rotational position in accordance with examples of the present disclosure.
Figure 3C:
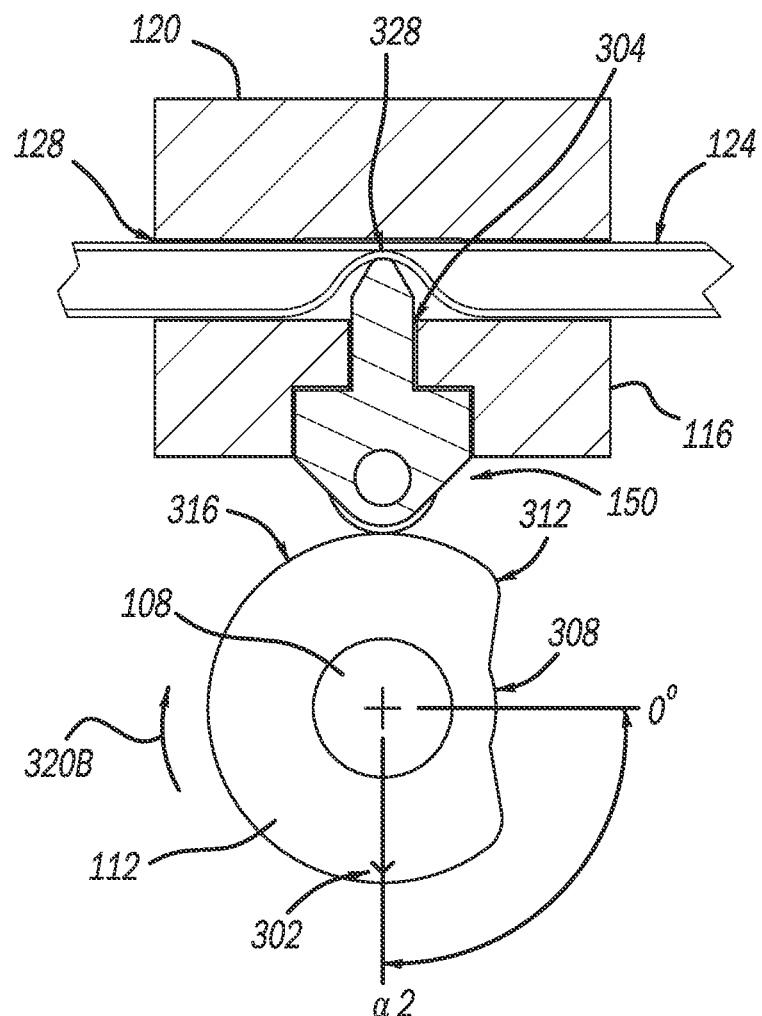
FIG. 3C is a schematic section view of the anvil assembly and cam of a multi-tubing pinch valve assembly at a third rotational position in accordance with examples of the present disclosure.

FIGS. 3A-3C shown schematic section views of the anvil assembly 150 as the cam 112 rotates about the longitudinal axis 110. A rotation position fiducial 302 is shown on the cam 112 to illustrate the position from a first angular reference (e.g., illustrated as a zero degree line). The cam 112 may comprise a cam profile shape (e.g., disposed around a periphery of the cam 112) including a cam heel 308 (e.g., a low point), a cam lobe 316 (e.g., a high point), and a cam transition 312 disposed between the cam heel 308 and the cam lobe 316. The cam heel 308 may correspond to a first point along the cam profile shape where a distance from the periphery of the cam 112 to the center of the cam 112 (e.g., the longitudinal axis 110 of the camshaft 108) is closest than other points along the cam profile shape. Additionally or alternatively, the cam lobe 316 may correspond to a second point along the cam profile shape where a distance from the periphery of the cam 112 to the center of the cam 112 (e.g., the longitudinal axis 110 of the camshaft 108) is further than other points along the cam profile shape. As can be appreciated, the distance from the periphery of the cam 112 to the center of the cam 112 at the cam transition 312 may be a distance that is between the distance measured at the first point and the second point.

In FIGS. 3A-3C, the multiple tubes 124 are disposed in a space between the anvil grating plate 116 and the tubing platen 120. In some examples, this space may correspond to the tube receiving apertures 128 described above. FIG. 3A corresponds to the anvil assembly 150 at a first cam 112 rotational position, FIG. 3B corresponds to the anvil assembly 150 at a second cam 112 rotational position, and FIG. 3C corresponds to the anvil assembly 150 at a third cam 112 rotational position. In the first rotational position of the cam 112, the multiple tubes 124 are shown in an open fluid flow state. In this position, fluid may be allowed to flow through each of the multiple tubes 124. In the second rotational position of the cam 112, the multiple tubes 124 are shown in a partially occluded, restricted fluid flow, state. In this position, fluid may be allowed to flow through each of the multiple tubes 124 but in a restricted, partially closed, state. For example, the flow rate of fluid flowing through the multiple tubes 124 may be reduced in the second rotational position when compared to the first rotational position. In the third rotational position of the cam 112, the multiple tubes 124 are shown in a closed state. In this position, fluid is restricted from flowing through each of the multiple tubes 124. This third rotational position may correspond to a completely occluded tubing state, which may also be referred to herein as a pinched or pinched closed state of the multiple tubes 124.

As shown in FIG. 3A, the anvil assembly 150 is in a lowermost position, where the protrusion of the anvil 200 is disposed in the anvil aperture 304 of the anvil grating plate 116. In particular, the cam follower 210 of the anvil assembly 150 is disposed in contact with the cam heel 308 of the cam 112. In this lowermost position, the pinch edge 208 may be disposed adjacent the multiple tubes 124. The multiple tubes 124 are not pinched by the anvil 200 in FIG. 3A, allowing fluid flow through the multiple tubes 124 from the left-hand side of the page to the right-hand side of the page, or vice versa.

When the camshaft 108 is rotated by a first rotation 320A (e.g., shown as a first clockwise rotation), the cam 112 rotates from the zero-degree reference to the α1 angular position (e.g., comprising a non-zero angle measured from the zero-degree reference), as shown in FIG. 3B. In the α1 angular position, the cam follower 210 of the anvil assembly 150 is shown in contact with the cam transition 312 of the cam 112. Since the distance from the periphery of the cam 112 at the cam transition 312 is greater than the distance from the periphery of the cam 112 at the cam heel 308, the anvil assembly 150 raises, or lifts, upward disposing the pinch edge 208 in the space between the anvil grating plate 116 and the tubing platen 120. More specifically, the pinch edge 208 contacts the multiple tubes 124 disposed in the tube receiving apertures 128 and deforms the multiple tubes 124 restricting flow therethrough. In the rotational position shown in FIG. 3B, the anvil assembly 150 deforms the multiple tubes 124 providing a partially occluded flow path 324 at least along the pinch edge 208 (e.g., extending into the page).

Continuing the rotation from FIG. 3B, the camshaft 108 is rotated by a second rotation 320B (e.g., shown as a second continuing clockwise rotation) further rotating the cam 112 from the α1 angular position to the α2 angular position. In the α2 angular position, the cam follower 210 of the anvil assembly 150 is shown in contact with the cam lobe 316 of the cam 112. Since the distance from the periphery of the cam 112 at the cam lobe 316 is greater than the distance from the periphery of the cam 112 measured at the cam transition 312, the anvil assembly 150 further raises, or lifts, upward disposing the pinch edge 208 further in the space between the anvil grating plate 116 and the tubing platen 120. In this raised position, the pinch edge 208 deforms the multiple tubes 124 disposed in the tube receiving apertures 128 completely restricting flow therethrough. In the rotational position shown in FIG. 3C, the anvil assembly 150 deforms the multiple tubes 124 providing a pinched tubing point 328 at least along the pinch edge 208 (e.g., extending into the page).

The cam 112 may also be configured to provide an "all-open" state in which all of the tubes 124 are open and not constricted by the anvil assembly 150. Such an "all open" state improves loading of the bioreactor support frame 144. The cam 112 may also be configured to be removable from the assembly 100 to allow all of the bioreactors to be opened simultaneously.

Although described as rotating in a clockwise direction, it should be appreciated that the camshaft 108 may be rotated in a counterclockwise direction, a clockwise direction, and/ or combinations thereof. In some examples, the motor 132 may be rotated in any rotational direction causing the rotation of the camshaft 108. Additionally or alternatively, while described as having a cam heel 308, cam transitions 312, and a cam lobe 316, it should be appreciated that the cam 112 may include greater or fewer protrusions, shapes, dwells, lobes, and recesses than are shown and described in FIGS. 1A-3C.

Figure 4A:
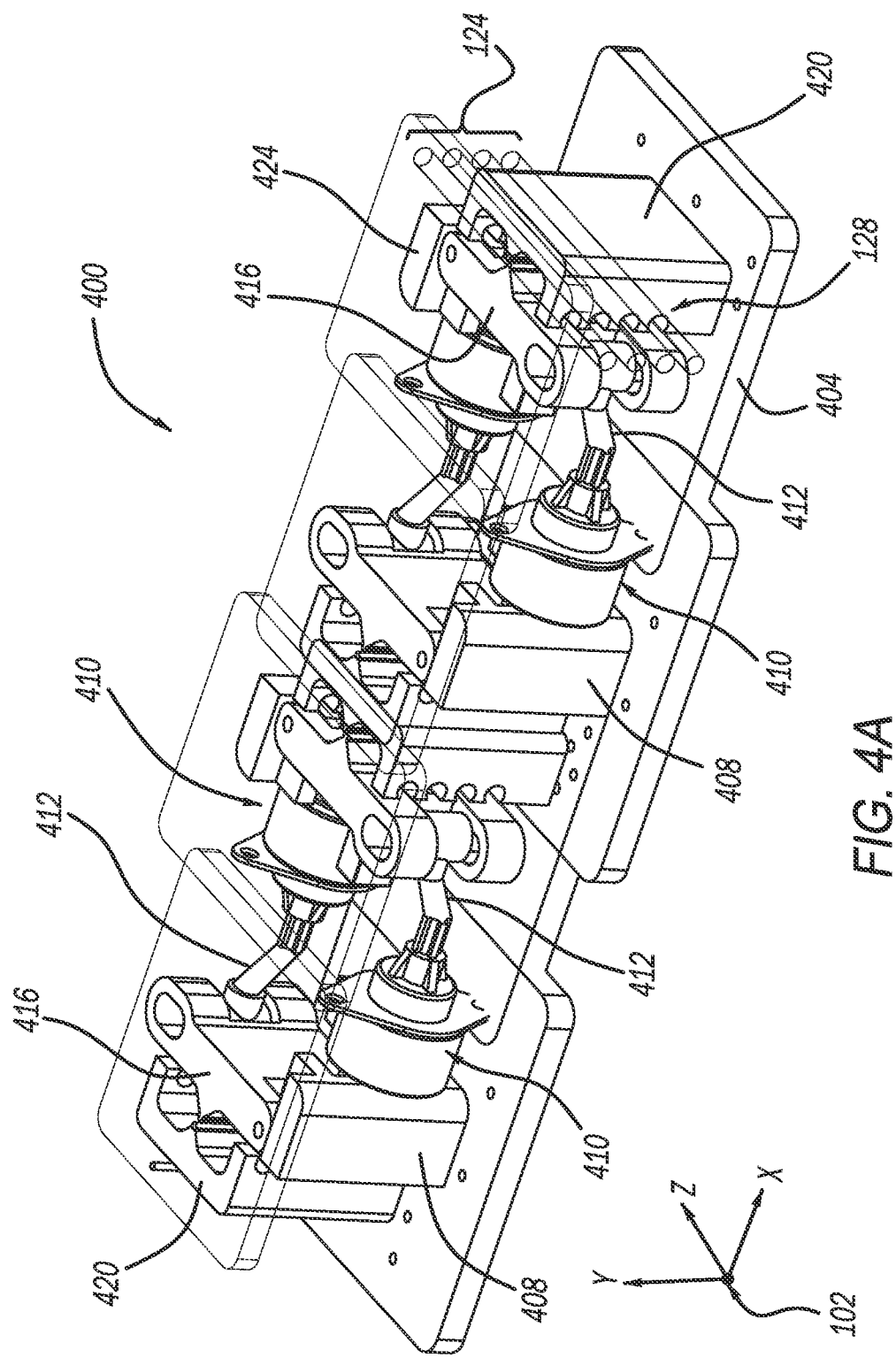
FIG. 4A shows a first perspective view of a multi-tubing pinch valve assembly in accordance with embodiments of the present disclosure.
Figure 4B:
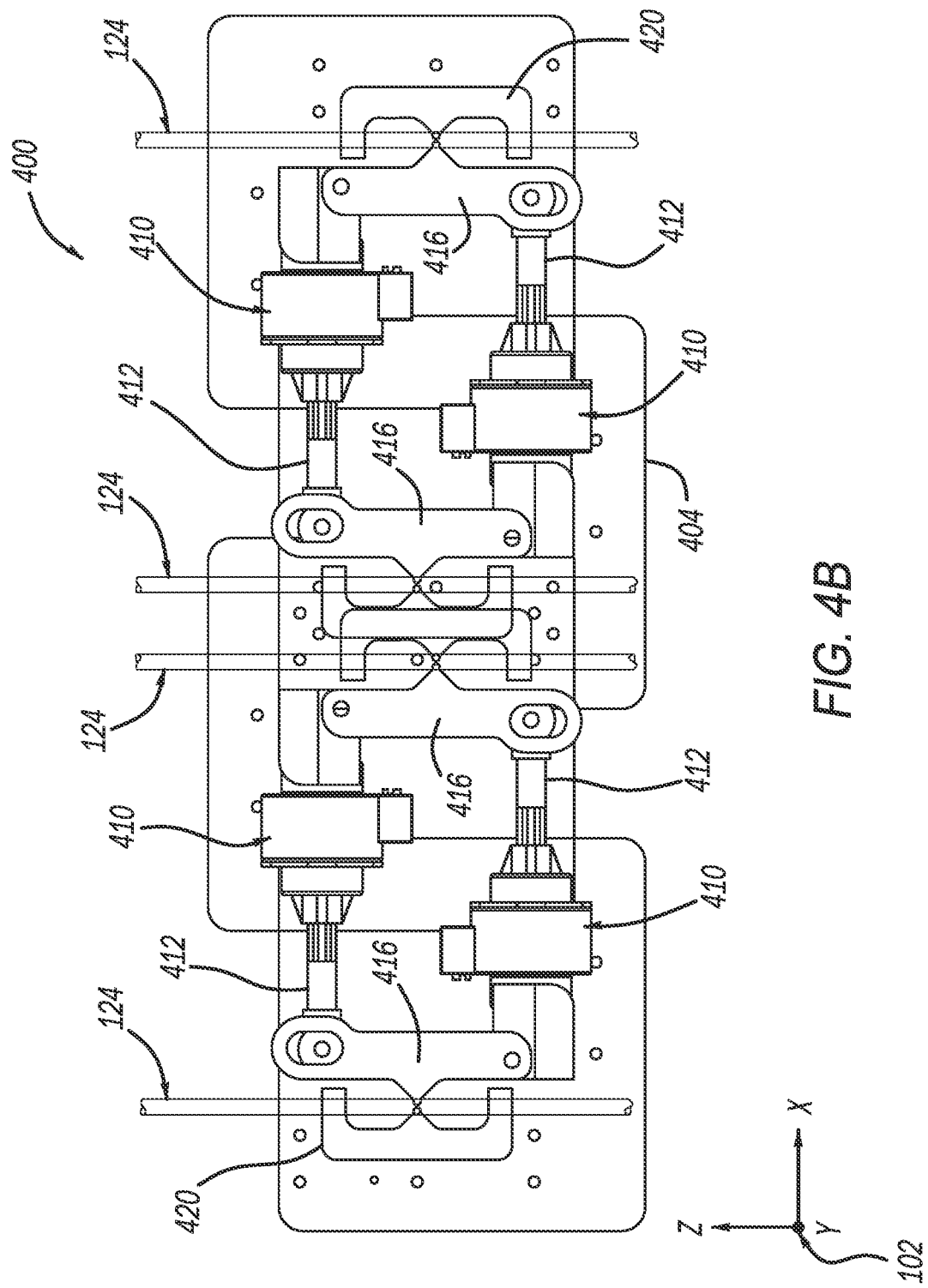
FIG. 4B shows a plan view of the multi-tubing pinch valve assembly shown in FIG. 4A.

Referring to FIGS. 4A and 4B, various views of a multi-tubing pinch valve assembly 400 is shown in accordance with embodiments of the present disclosure. The multi-tubing pinch valve assembly 400 may provide an array of pinch valves that utilize independently controllable hinged clamp mechanisms. In some examples, the multi-tubing pinch valve assembly 400 may include at least one base 404, hinge plate 416, and clamp platen 420. Multiple tubes 124 may be disposed between the hinge plate 416 and the clamp platen 420. In one example, the multiple tubes 124 may be disposed in tube receiving apertures 128 associated with each valve. The hinge plate 416 may be pivotally connected to a hinge support block 424 at a first point via a pivot axis. An actuator, for example, linear actuator 410, may be attached to a second point of the hinge plate 416. The linear actuator 410 may correspond to a solenoid, a screw-type actuator, and/or a stepper motor-actuated screw-type actuator.

The linear actuator 410 may be mounted to a mount body 408 that is fixed relative to the base 404 of the multi-tubing pinch valve assembly 400. As the linear actuator 410 is actuated, a translation rod 412 may move between a retracted state and an extended state, or vice versa. Extending the translation rod 412 may move the hinge plate 416 toward the clamp platen 420. In this extended position, the multiple tubes 124 disposed in the tube receiving aperture 128 may be pinched by one or more features of the hinge plate 416 and the clamp platen 420.

The clamp platen 420 may be fixed relative to the base 404. As the linear actuator 410 is actuated, the translation rod 412 may move the hinge plate 416 from an open state to a closed state, or vice versa. In the open state, at least one portion of the hinge plate 416 may be separated further from the clamp platen 420 than when in the closed state. When in the open state, the multiple tubes 124 may be loaded and/or removed from the tube receiving aperture 128. Stated another way, the multiple tubes 124 may not be clamped, or pinched, when in the open state. However, when in the closed state, the multiple tubes 124 may be pinched between the hinge plate 416 and the clamp platen 420. Additional detail regarding the construction of the hinge plate 416 and the clamp platen 420 and the fluid flow control (e.g., pinching) arrangement is described in conjunction with FIGS. 5A-5C.

Figure 6B:
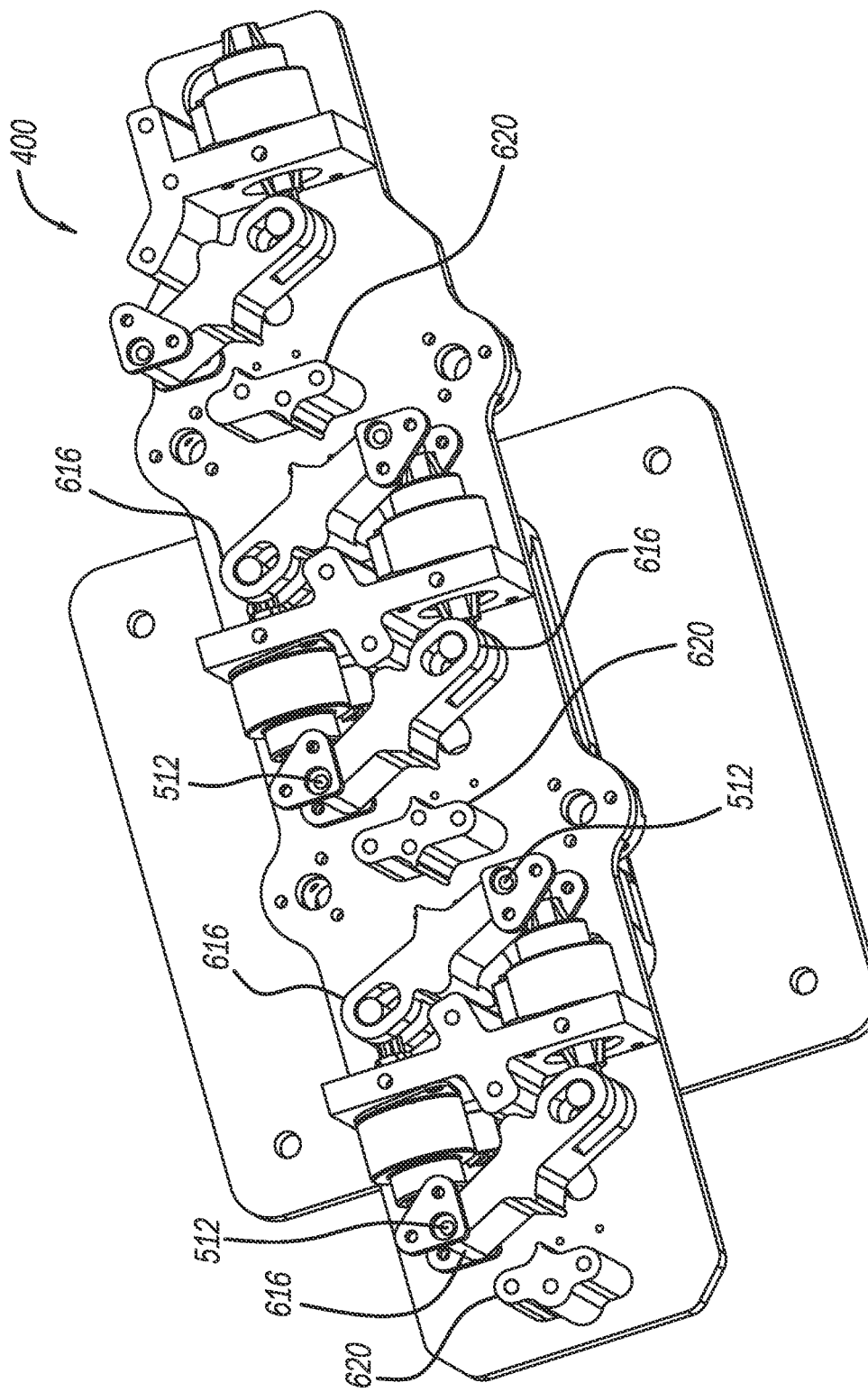
FIG. 6B shows a second perspective view of a multi-tubing pinch valve assembly in an array configuration in accordance with examples of the present disclosure.

In some examples, the multi-tubing pinch valve assembly 400 may comprise an array of valves arranged adjacent to one another. As shown in the plan view of FIG. 4B, four separate valves are shown, each valve configured to pinch multiple tubes 124 associated therewith. Each valve of the multi-tubing pinch valve assembly 400 may comprise a linear actuator 410, a translation rod 412, and a hinge plate 416. Although shown with separate clamp platens 420 in FIGS. 4A and 4B, it should be appreciated that different valves may share a clamp platen 420. For instance, and as shown in FIGS. 6A and 6B, the dual clamp platen 620 is used by more than one valve. The array of valves of the multi-tubing pinch valve assembly 400 shown in FIG. 4B, show a first row comprising two valves with linear actuators 410 that are configured to extend from right to left and a second row comprising two valves with linear actuators 410 that are configured to extend from left to right. Although shown comprising four separate valves, the multi-tubing pinch valve assembly 400 may include any number of valves. In some examples, the number of valves may be configured to match a number of bioreactors or sets of multiple tubes 124 that require fluid flow control. As can be appreciated, the valve array of the multi-tubing pinch valve assembly 400 may comprise one, two, three, four, five, or more valves.

Figure 5A:
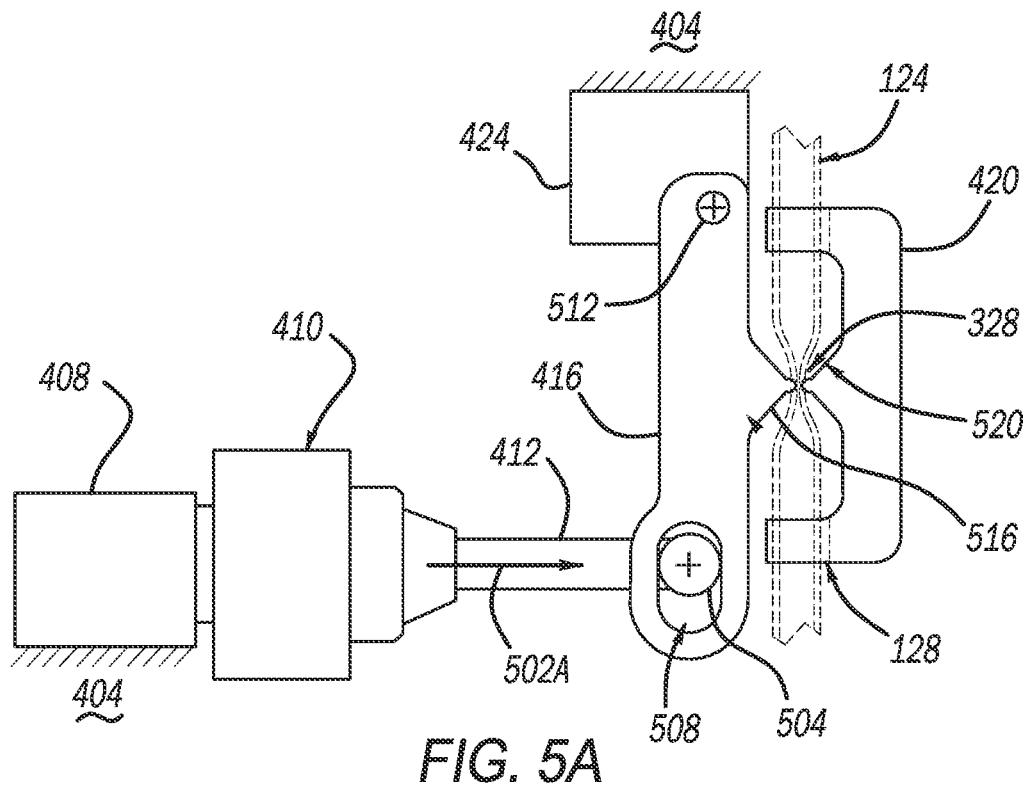
FIG. 5A shows a schematic plan view of the multi-tubing pinch valve assembly shown in FIG. 4A in a closed, tubing-occluded, state in accordance with examples of the present disclosure.
Figure 5B:
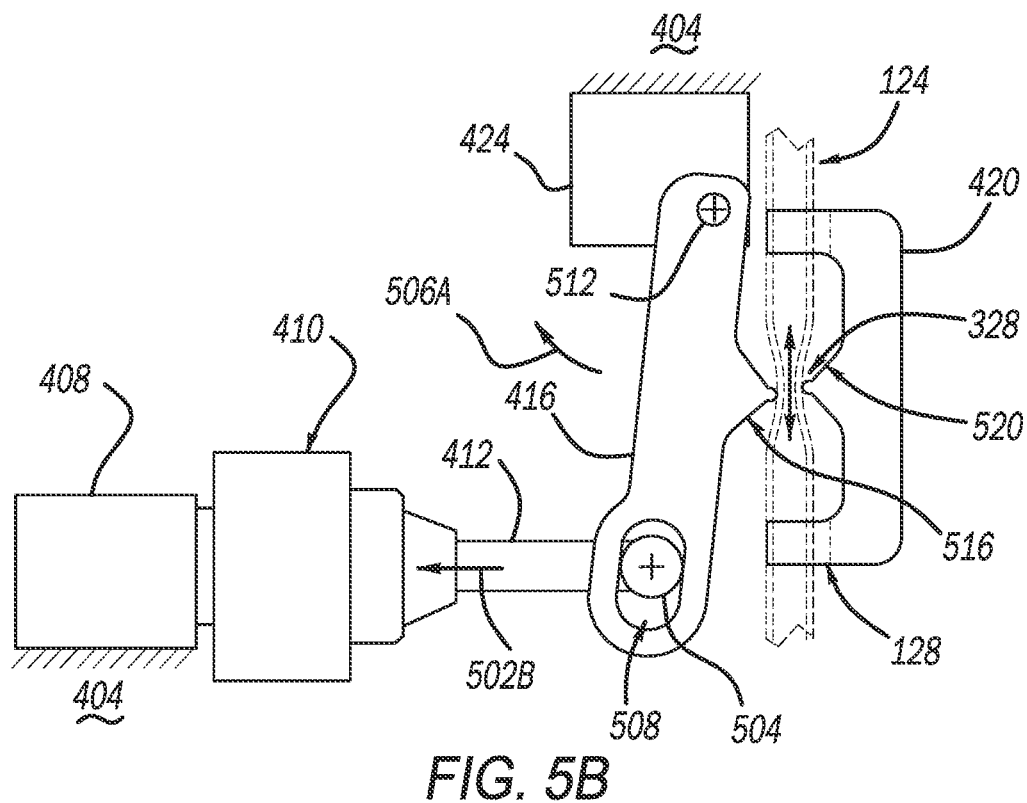
FIG. 5B shows a schematic plan view of the multi-tubing pinch valve assembly shown in FIG. 4A in a partially closed, tubing-partially-occluded, state in accordance with examples of the present disclosure.
Figure 5C:
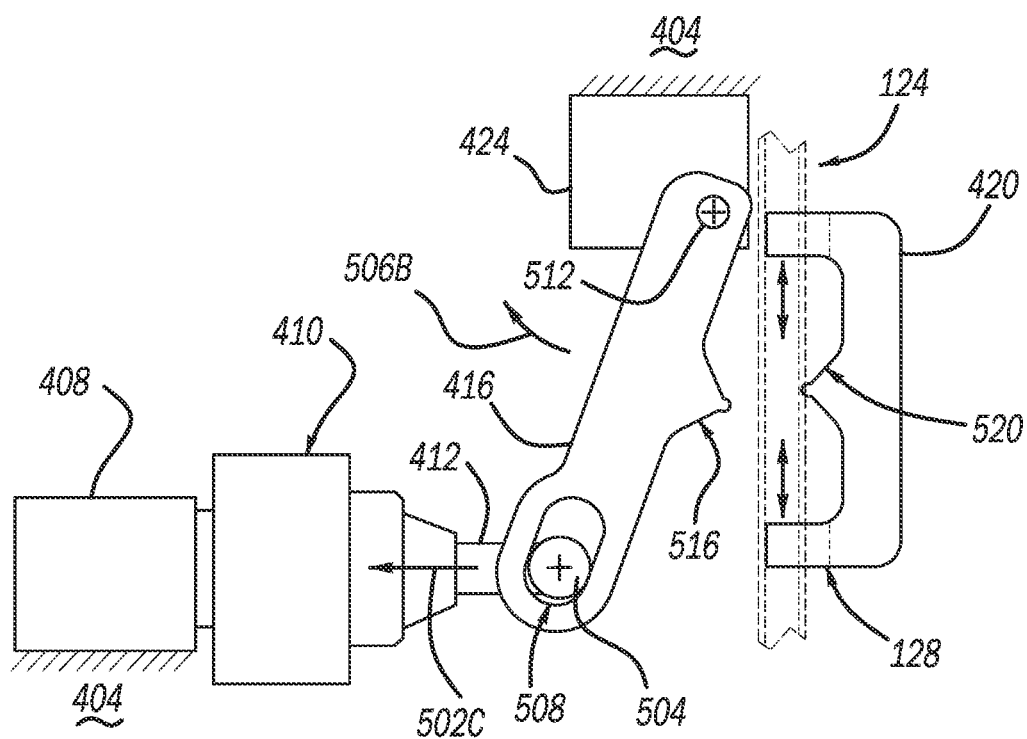
FIG. 5C shows a schematic plan view of the multi-tubing pinch valve assembly shown in FIG. 4A in an open, tubing-open, state in accordance with examples of the present disclosure.

FIGS. 5A-5C show schematic plan views of the multi-tubing pinch valve assembly 400 described above moving between a closed state and an open state. The linear actuator 410 is shown attached to a mount body 408 that is fixed to the base 404. A hinge plate 416 is shown pivotally attached to a hinge support block 424 that is fixed to the base 404. The clamp platen 420 may be fixed to the base 404 or other portion of the multi-tubing pinch valve assembly 400. The hinge plate 416 may comprise a hinge pinch protrusion 516 extending from a surface of the hinge plate 416 in a direction toward the clamp platen 420. In some examples, the clamp platen 420 may comprise a tubing contact portion that is configured to contact the multiple tubes 124 disposed in the tube receiving aperture 128. In some examples, the tubing contact portion may correspond to a flat plate surface and/or a platen pinch protrusion 520 that extends from a surface of the clamp platen 420 (e.g., in a direction of the hinge plate 416).

The linear actuator 410 may be attached to a mount body 408. The mount body 408 may be fixed relative to the base 404. The linear actuator 410 may include a translation rod 412 that moves relative to the mount body 408 (e.g., in a direction toward or away from the mount body 408). The translation rod 412 may comprise a clevis pin 504 that engages with a clevis of the hinge plate 416. In some examples, the hinge plate 416 may comprise a clevis slot 508 in which the clevis pin 504 may be disposed.

FIG. 5A shows a schematic plan view of the multi-tubing pinch valve assembly 400 in a closed, tubing-occluded, state in accordance with examples of the present disclosure. In this state, the translation rod 412 of the linear actuator 410 is extended by a first translation vector 502A. The clevis pin 504 moving in the clevis slot 508 of the hinge plate 416 pivots the hinge plate 416 about the hinge pin 512 (e.g., pivot axis) in this state moving the hinge pinch protrusion 516 into contact with the multiple tubes 124 pinching the multiple tubes 124 between the hinge pinch protrusion 516 of the hinge plate 416 and the platen pinch protrusion 520 of the clamp platen 420. When the translation rod 412 is extended in this state, fluid flow through the multiple tubes 124 is occluded completely at the pinched tubing point 328.

FIG. 5B shows a schematic plan view of the multi-tubing pinch valve assembly 400 in a partially closed or partially open, tubing-partially-occluded, state in accordance with examples of the present disclosure. In this tubing-partially-occluded state, the translation rod 412 of the linear actuator 410 is retracted by a second translation vector 502B from the position shown in FIG. 5A. As the translation rod 412 retracts, the clevis pin 504 moves in the clevis slot 508 of the hinge plate 416 pivoting the hinge plate 416 about the hinge pin 512 (e.g., pivot axis) in a first hinge plate rotation 506A. In this position, the hinge pinch protrusion 516 is in contact with the multiple tubes 124 partially deforming the multiple tubes 124 and the fluid flow lumens of each of the multiple tubes 124. More specifically, the multiple tubes 124 are captured between the hinge pinch protrusion 516 of the hinge plate 416 and the platen pinch protrusion 520 of the clamp platen 420 providing a partially occluded flow path 324 through the multiple tubes 124. In the tubing-partially-occluded state, fluid flow rate through the multiple tubes 124 disposed in the tube receiving aperture 128 may be reduced when compared to a tubing-open state.

FIG. 5C shows a schematic plan view of the multi-tubing pinch valve assembly 400 in an open, tubing-open, state in accordance with examples of the present disclosure. In this tubing-open state, the translation rod 412 of the linear actuator 410 is retracted by a third translation vector 502C from the position shown in FIGS. 5A and 5B. As the translation rod 412 retracts, the clevis pin 504 moves in the clevis slot 508 of the hinge plate 416 pivoting the hinge plate 416 about the hinge pin 512 (e.g., pivot axis) in a second hinge plate rotation 506B. In this open position, the hinge pinch protrusion 516 is brought out of deforming contact with the multiple tubes 124. In some examples, the multiple tubes 124 may return to an undeformed state and the fluid flow lumens of each of the multiple tubes 124 may open in this state. When the multi-tubing pinch valve assembly 400 is in the tubing-open state, the multiple tubes 124 may be removed from, or loaded into, the clamp platen 420. While described as moving between a closed and an open state, it should be appreciated that the multi-tubing pinch valve assembly 400 may move between an open and closed state by reversing the order and movements described above.

FIGS. 6A and 6B show perspective views of a multi-tubing pinch valve assembly 400 in an array configuration in accordance with examples of the present disclosure. As described above, the array of valves may comprise a plurality of linear actuators 410 and hinge plates 616 that are similar, if not identical, to the hinge plate 416 described above. In FIGS. 6A and 6B, the multi-tubing pinch valve assembly 400 and array may include two immediately adjacent valves that share a dual clamp platen 620. The dual clamp platen 620 may comprise a first platen pinch protrusion 520 extending from a first surface toward a first hinge plate 616 and a second platen pinch protrusion 520 extending from an opposite second surface toward a second hinge plate 616. Among other things, this arrangement may allow for a more compact arrangement of valves in the array of valves making up the multi-tubing pinch valve assembly 400.

Figure 7:
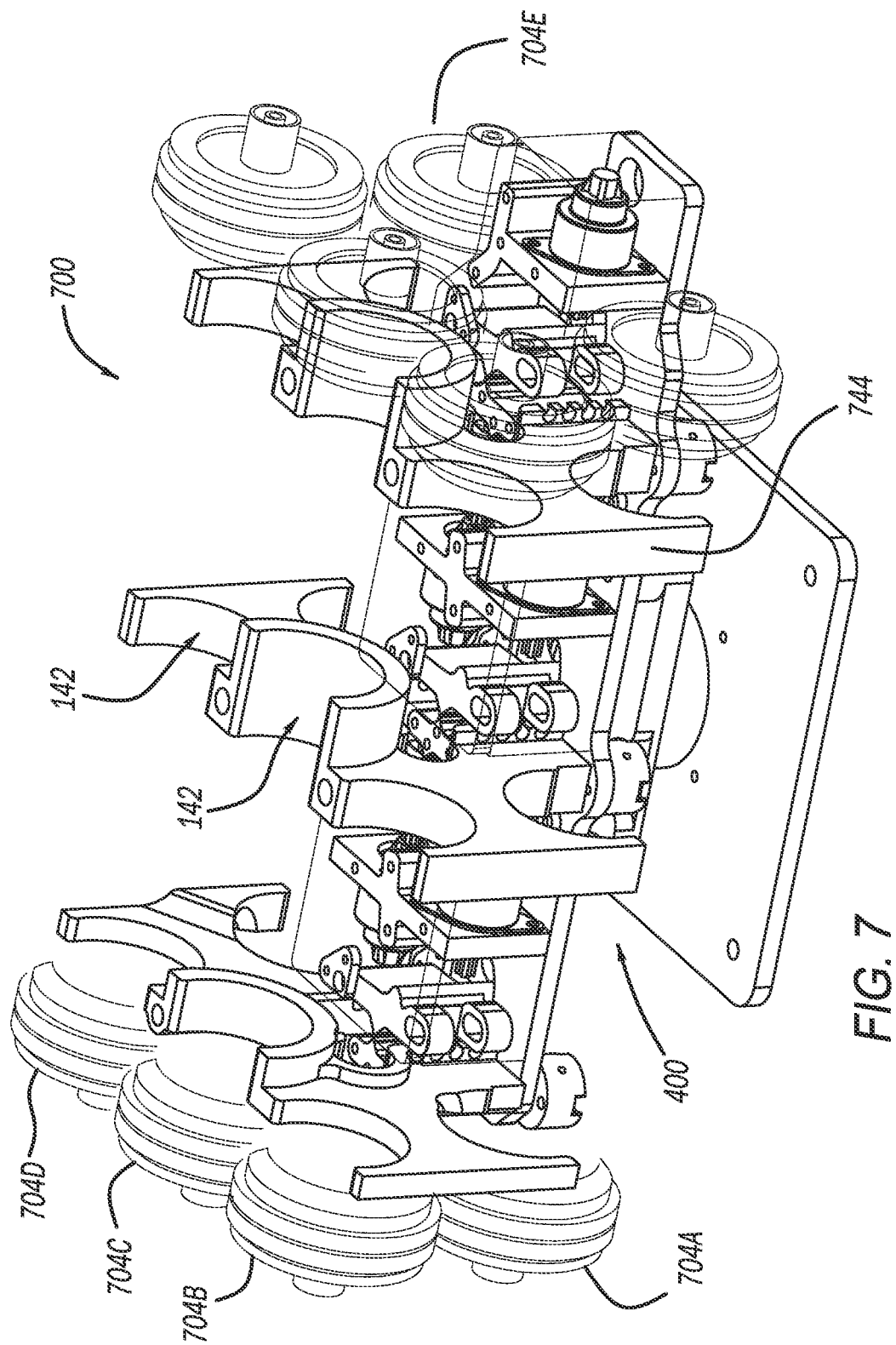
FIG. 7 shows a perspective view of a multi-tubing pinch valve assembly in an array configuration for a multiple-bioreactor system.

FIG. 7 shows a perspective view of a multi-tubing pinch valve assembly 700 in an array configuration, for example, in a multiple-bioreactor system. In some examples, the multi-tubing pinch valve assembly 700 may correspond to the multi-tubing pinch valve assembly 400 described in FIGS. 4A-6B. In FIG. 7, the bioreactor support frame 744 includes a plurality of recesses 142 configured to receive and hold a respective bioreactor 704A-704E. As shown in FIG. 7, the multi-tubing pinch valve assembly 700 may include five separate bioreactors 704A-704E. In this example, the multi-tubing pinch valve assembly 700 may include an array of valves comprising five separate valves, one valve per bioreactor 704A-704E. Each valve in the array of valves of the multi-tubing pinch valve assembly 700 may be configured to pinch multiple tubes 124 for each bioreactor 704A-704E. For instance, each bioreactor 704A-704E may include at least four tubes. A first pair of these four tubes may be associated with an intracapillary loop of a respective bioreactor 704A-704E and a second pair of these four tubes may be associated with the extracapillary loop of the respective bioreactor 704A-704E. Among other things, the multi-tubing pinch valve assembly 700 may allow independent opening and closing of the multiple tubes 124 for each bioreactor 704A-704E.

Figure 8:
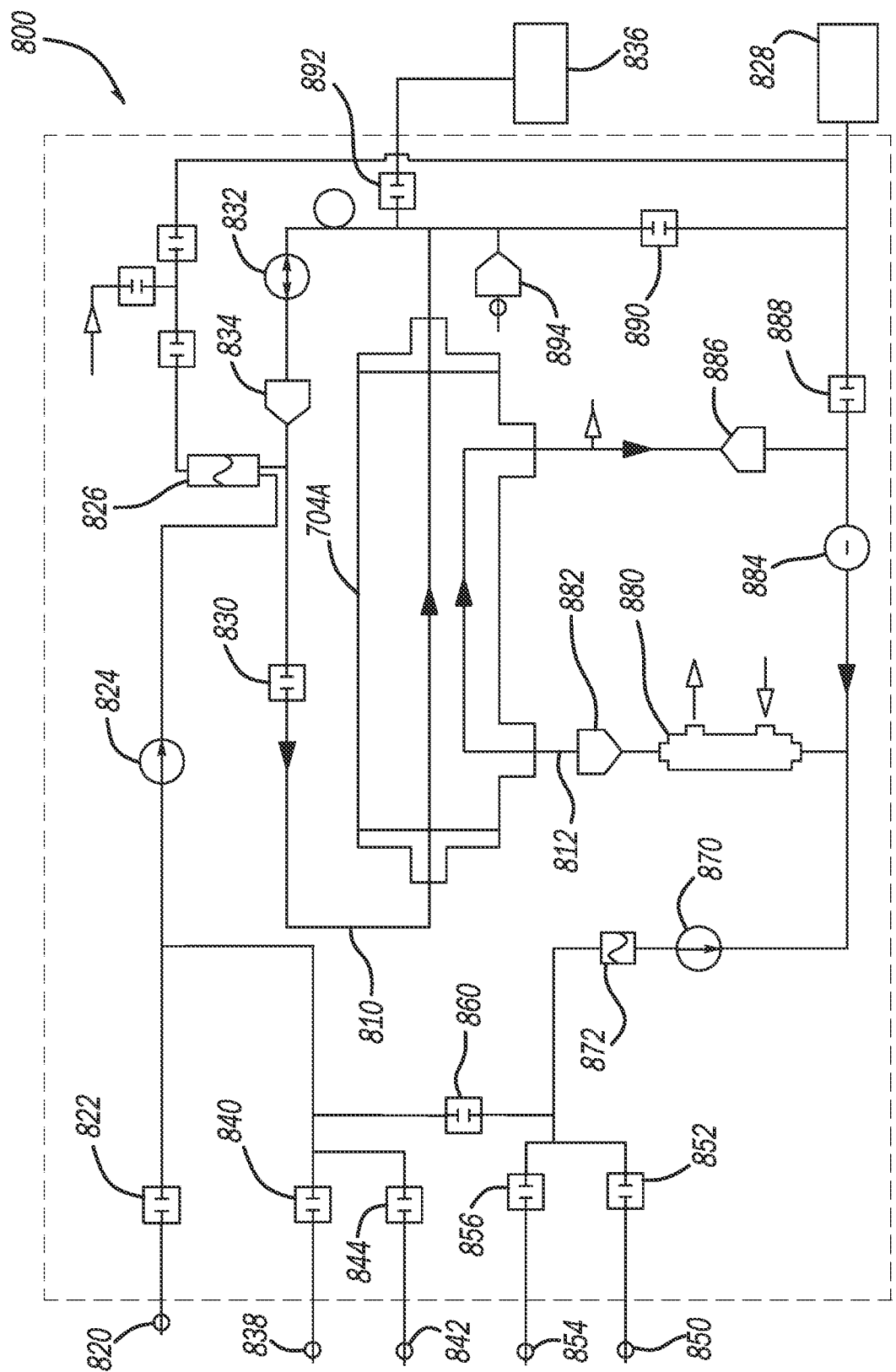
FIG. 8 is a schematic block diagram of a hydraulic layout for a cell expansion system having a single bioreactor in accordance with examples of the present disclosure.

FIG. 8 is a schematic block diagram 800 of a hydraulic layout for a cell expansion system having a single bioreactor 704A in accordance with examples of the present disclosure. As shown, the bioreactor of FIG. 8 includes an intracapillary circulation (IC) loop 810 and an extracapillary circulation (EC) loop 812. In a single bioreactor these loops may be opened and closed by one or more valves. A cell inlet bag attachment point is at 820. A cell inlet line extends through a cell inlet valve 822 to an IC inlet pump 824. From the pump 824, the line extends to an air removal chamber/level detection 826. From the air removal chamber/level detection 826, the line branches off to waste 828 and to IC circulation valve 830. From valve 830 the line extends into the bioreactor 704A. From the bioreactor 704A, the line branches to waste 828, IC circulation pump 832, and to harvest 836. Harvest valve 892 controls flow to harvest 836. From pump 832, the line goes to IC inlet pressure sensor 834 and to the IC circulation valve 830.

A reagent attachment point is at 838. A regent line extends through a reagent valve 840 to the cell inlet line. An IC media attachment point is at 842. An IC media line extends through IC media valve 844 to the reagent line.

An EC media attachment point is at 850. From the EC media attachment point 850, an EC line extends through EC media valve 852. A wash connection point is at 854, and a wash valve is at 856. A distribution valve is along a line connecting the EC loop 812 and the IC loop 810. The EC loop 812 includes an EC inlet pump 870, which is downstream from an EC fluid detector 872. The EC loop 812 further includes a GTM chamber 880, an EC inlet pressure sensor 882, an EC circulation pump 884, and an EC outlet pressure sensor 886. An EC waste valve 888 is on an EC waste line extending to waste 828. An IC waste valve 890 and an IC outlet pressure sensor 894 are upstream of waste 828 on the IC side.

Figure 9:
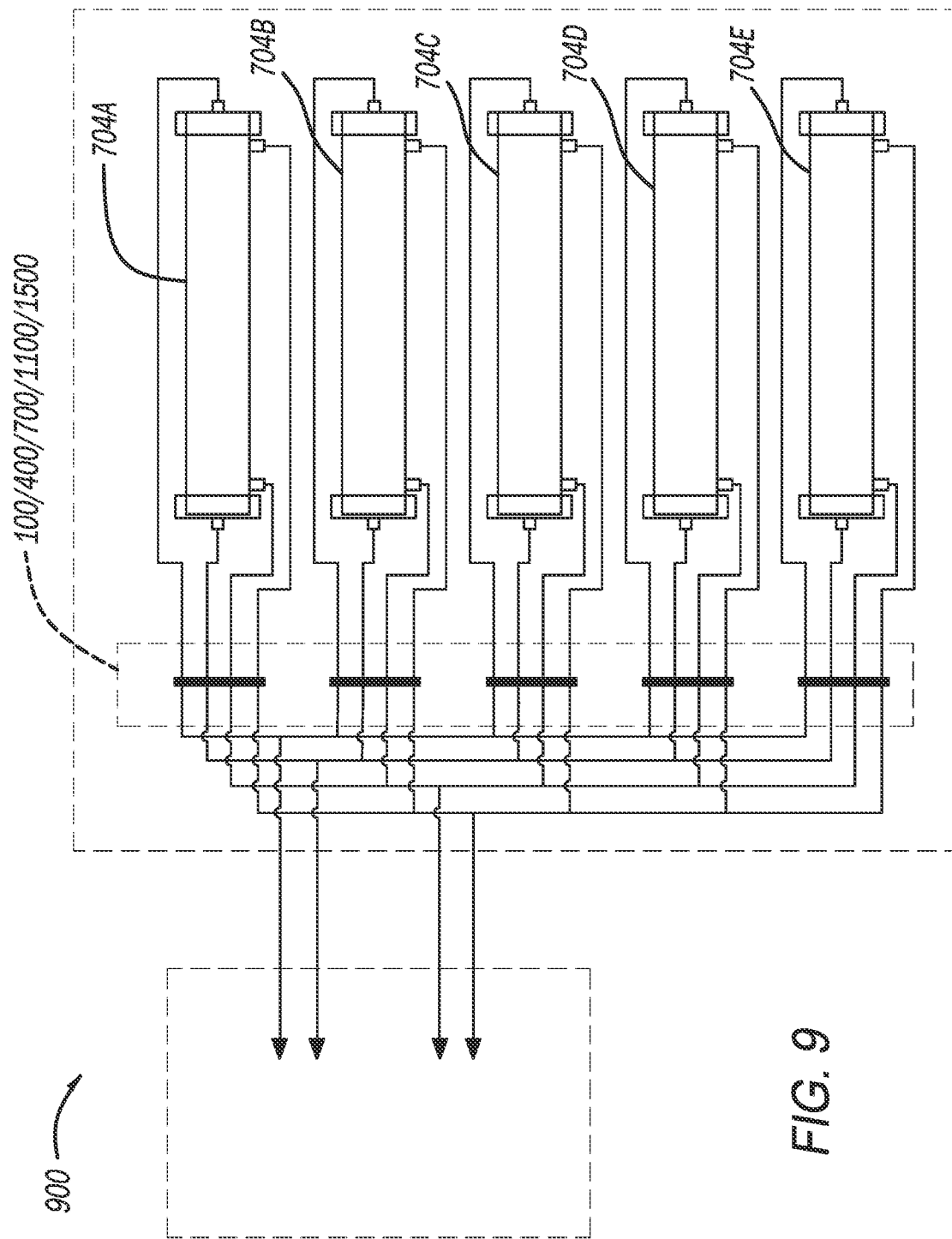
FIG. 9 is a schematic block diagram of a hydraulic layout for a cell expansion system having multiple bioreactors and a multi-tubing pinch valve assembly in accordance with examples of the present disclosure.
Figure 10:
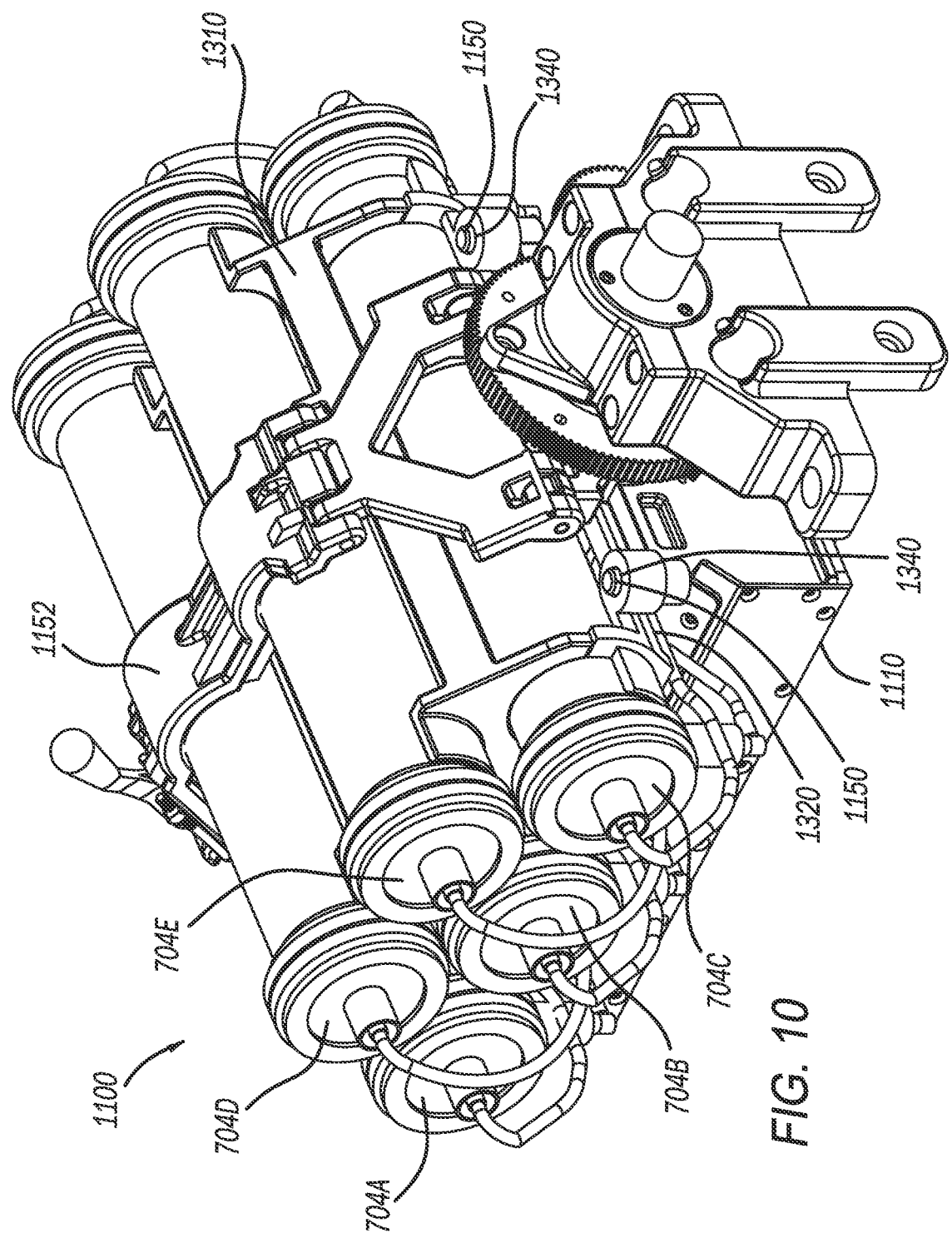
FIG. 10 is a perspective view of another exemplary multitube pinch valve assembly in accordance with the present disclosure.

FIG. 9 is a schematic block diagram 900 of a hydraulic layout for a cell expansion system having multiple bioreactors and a multi-tubing pinch valve assembly 100, 400, 700 in accordance with examples of the present disclosure. As shown in the schematic block diagram 900, the tubing associated with the IC loop and the EC loop of each of the five bioreactors may be controlled by the valves in the valve array. These valves may correspond to any of valves shown in the multiple-tube pinch valve assemblies 100, 400, 700 described herein. In some examples, the valve array shown in the schematic block diagram 900 may correspond to the valve array 148A-148E described in conjunction with FIGS. 1A-3C. In one example, each valve in the valve array shown in the schematic block diagram 900 may correspond to the hinge plate 416 and clamp platen 420 of the multi-tubing pinch valve assembly 400 described in conjunction with FIGS. 4A-5C and/or the hinge plate 616 and dual clamp platen 620 shown in FIGS. 6A and 6B.

Figure 11:
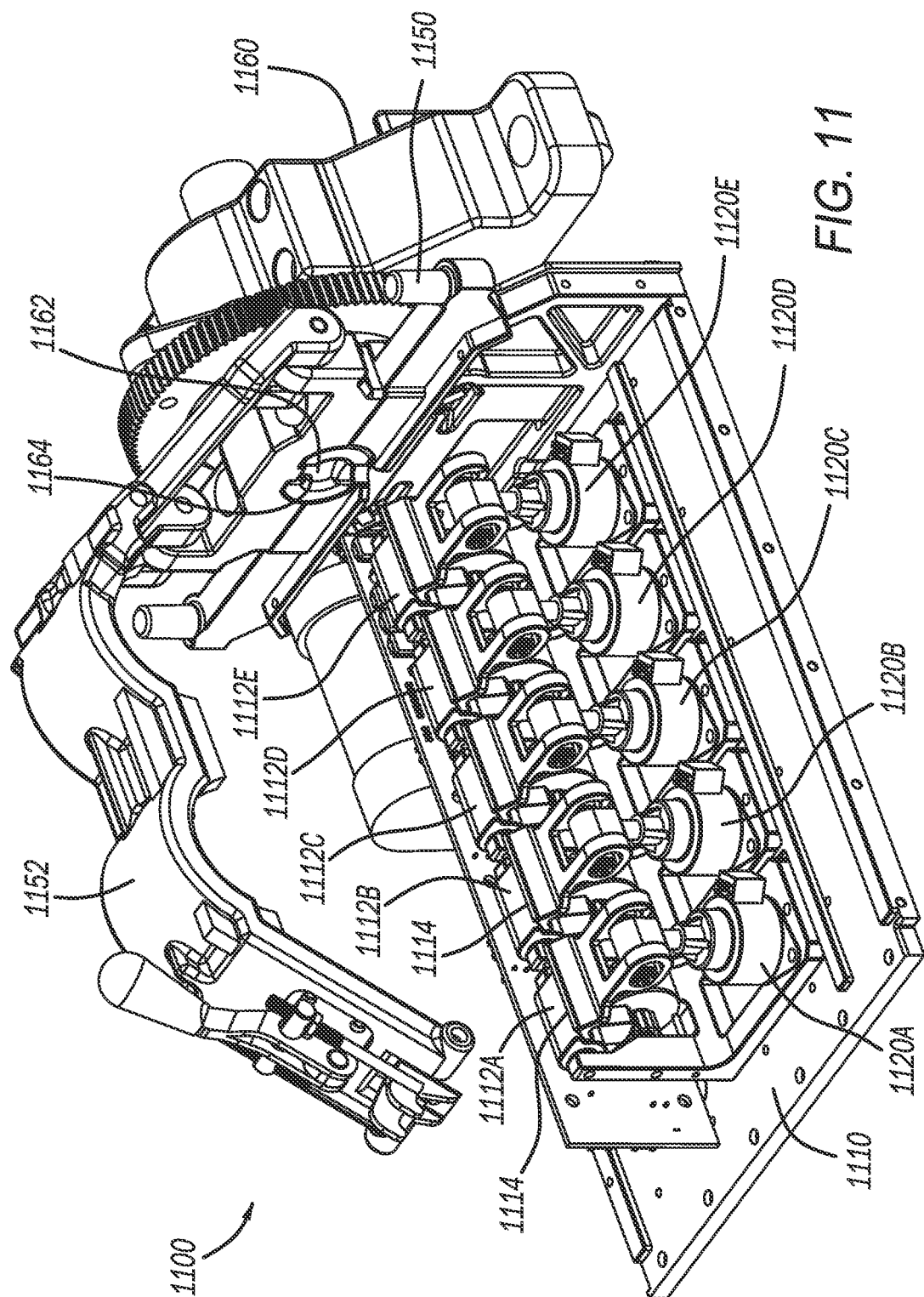
FIG. 11 is a perspective view of the multitube pinch valve assembly of FIG. 10 with a cover removed.
Figure 12:
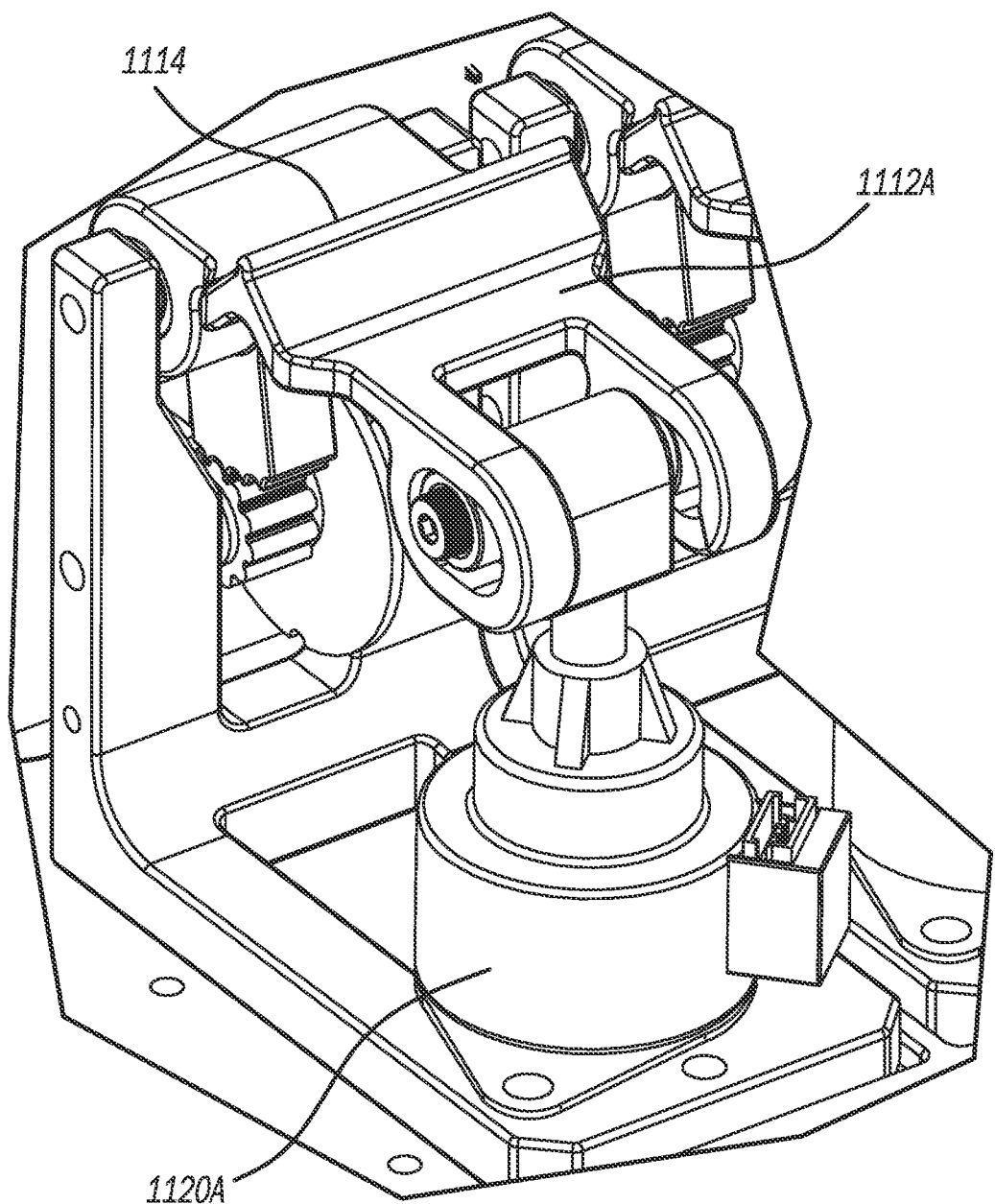
FIG. 12 is a perspective view of an exemplary actuation member of the multitube pinch valve assembly of FIG. 10.

FIGS. 10-13 illustrate a multitube pinch valve assembly 1100 in accordance with the present disclosure. The assembly 1100 generally includes a base 1110 and a bioreactor support frame 1310. With particular reference to FIGS. 11 and 12, the base 1110 includes a plurality of hinge plates 1112A-1112E. Any suitable number of the hinge plates may be included. In the example illustrated, five hinge plates 1112A, 1112B, 1112C, 1112D, and 1112E are included. Each one of the hinge plates 1112A-1112E includes a hinge pinch protrusion 1114. The hinge plates 1112A-1112E are each individually actuated by any suitable actuation mechanism. In the example illustrated, each one of the hinge plates 1112A-1112E is actuated by a different actuation mechanism 1120A, 1120B, 1120C, 1120D, 1120E respectively. Each one of the actuation mechanisms 1120A-1120E may include any suitable linear actuator, such as any suitable solenoid, linear stepper motor, pneumatic actuator, etc., for example.

The base 1110 further includes a plurality of support posts 1150. The support posts 1150 are configured to cooperate with the bioreactor support frame 1310 as explained below to support the bioreactor support frame 1310 on the base 1110 and over the hinge plates 1112A-1112E. A strap 1152 is included to hold the bioreactor support frame 1310 on the base 1110.

The multitube pinch valve assembly 1100 further includes a rocker assembly 1160. The rocker assembly 1160 includes a rocker rod 1162, which cooperates with the base 1110 at an aperture 1164 defined by the base 1110. The rocker assembly 1160 includes a motor configured to rotate the rocker rod 1162. The rocker rod 1162 is mounted to the base 1110 in any suitable manner such that rotation of the rocker rod 1162 rocks the base 1110 and the bioreactors 704A-704E mounted thereto. In come configurations, the rocker assembly 1160 may be configured to invert the bioreactors 704A-704E.

Figure 13:
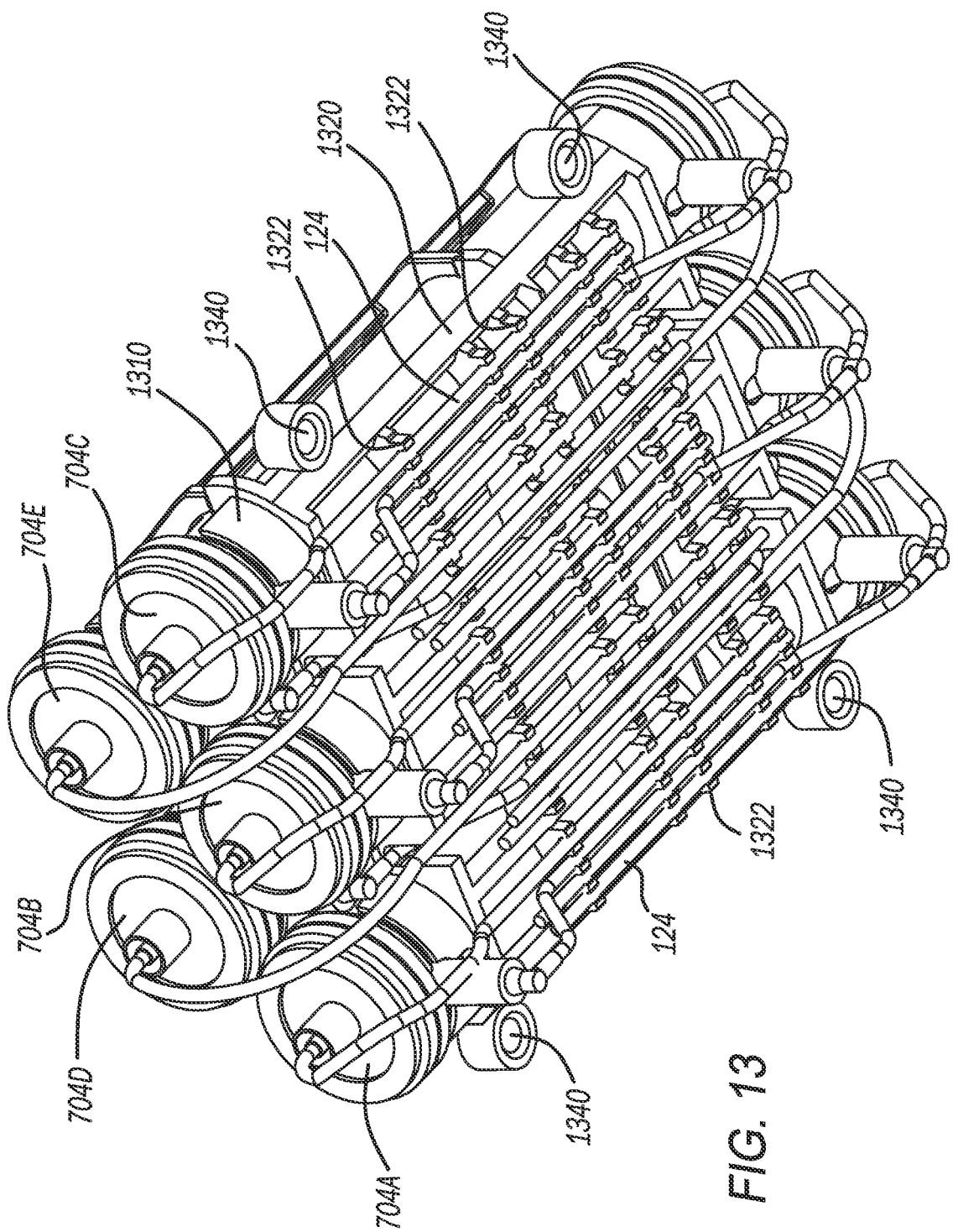
FIG. 13 is a perspective view of a bioreactor support frame configured for the multitube pinch valve assembly of FIG. 10.

With particular reference to FIG. 13, the bioreactor support frame 1310 may be configured to support five bioreactors 704A, 704B, 704C, 704D, 704E, or any other suitable number of bioreactors. The number of bioreactors included with the bioreactor support frame 1310 typically equals, or is less than, the number of hinge plates 1112A-1112E. The support frame 1310 includes a tubing platen 1320. The tubing platen 1320 includes a plurality of tube receiving apertures 1322 configured to secure the tubes 124 of the bioreactors 704A-704E to the tubing platen 1320. The tubes 124 extend generally parallel to lengths of the bioreactors 704A-704E. In some applications, the tubes 124 may extend perpendicular to the bioreactors 704A-704E, or at any other suitable angle.

The bioreactor support frame 1310 further includes a plurality of receptacles 1340, each of which are configured to cooperate with the support posts 1150 of the base 1110. The support posts 1150 support the bioreactor support frame 1310 on top of the base 1110 and position the support frame 1310 such that the tubes 124 are arranged opposite to, and extend perpendicularly across, the hinge pinch protrusions 1114 of the hinge plates 1112A-1112E. Actuation of the different hinge plates 1112A-1112E moves the hinge pinch protrusions 1114 towards tubes to pinch the tubes 124 and restrict fluid flow through the tubes 124 and to the bioreactors 704A-704E in generally the same manner illustrated in FIGS. 5A, 5B, and 5C illustrating the multi-tubing pinch valve assembly 400. When actuated upward, the hinge pinch protrusions 1114 will contact the tubes 124 on either side of any of the receiving apertures 1322 to bend the tubes 124 into occlusion. Bending the tubes 124 into occlusion reduces the amount of pinch force required from the actuation mechanisms 1120A-1120E as compared to when the pinch protrusions 1114 directly contact an opposing platen pinch protrusion. In some applications, the tubing platen 1320 may include platen pinch protrusions aligned with the hinge pinch protrusions 1114.

Figure 14:
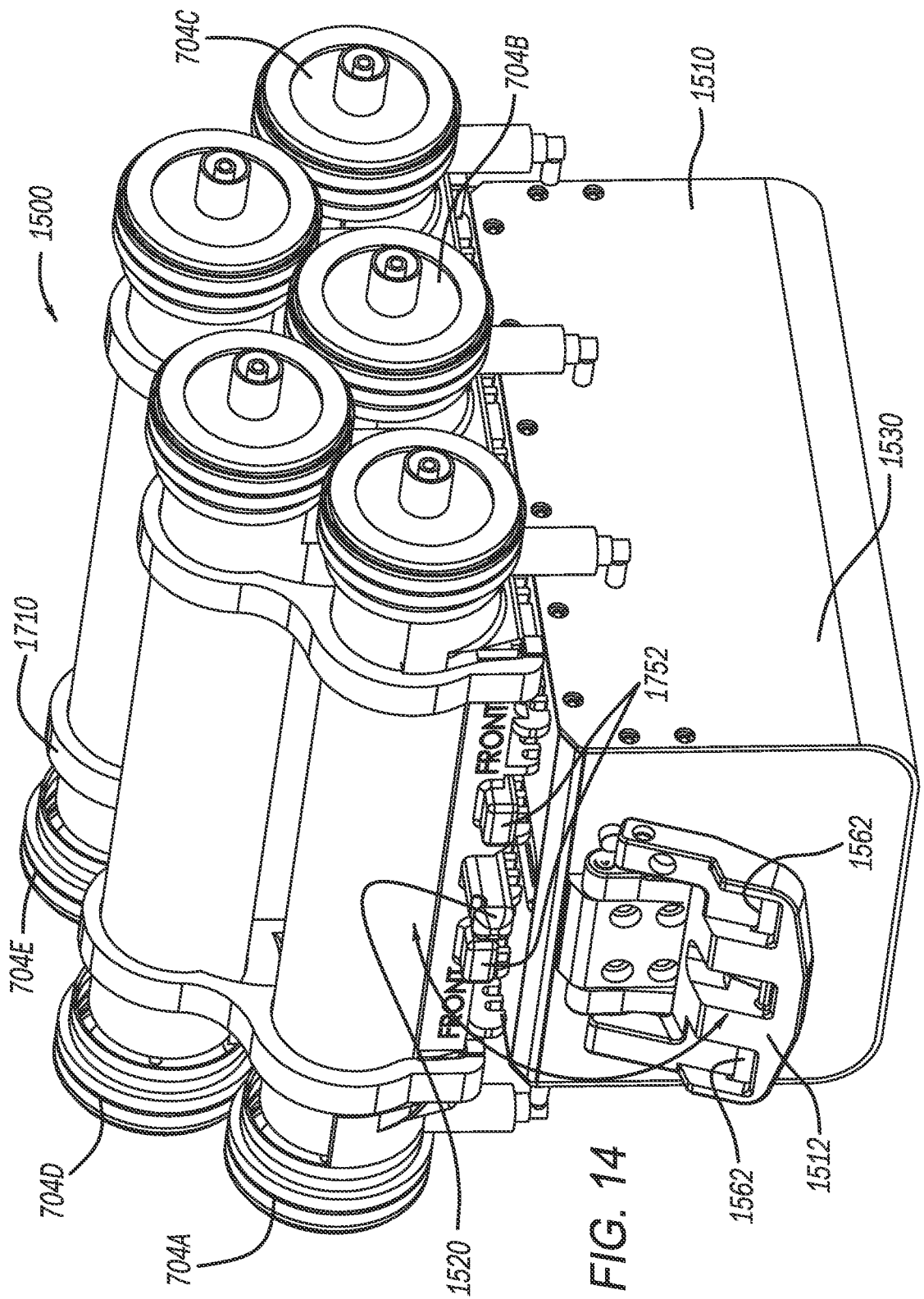
FIG. 14 is a perspective view of an additional exemplary multitube pinch valve assembly in accordance with the present disclosure.
Figure 15:
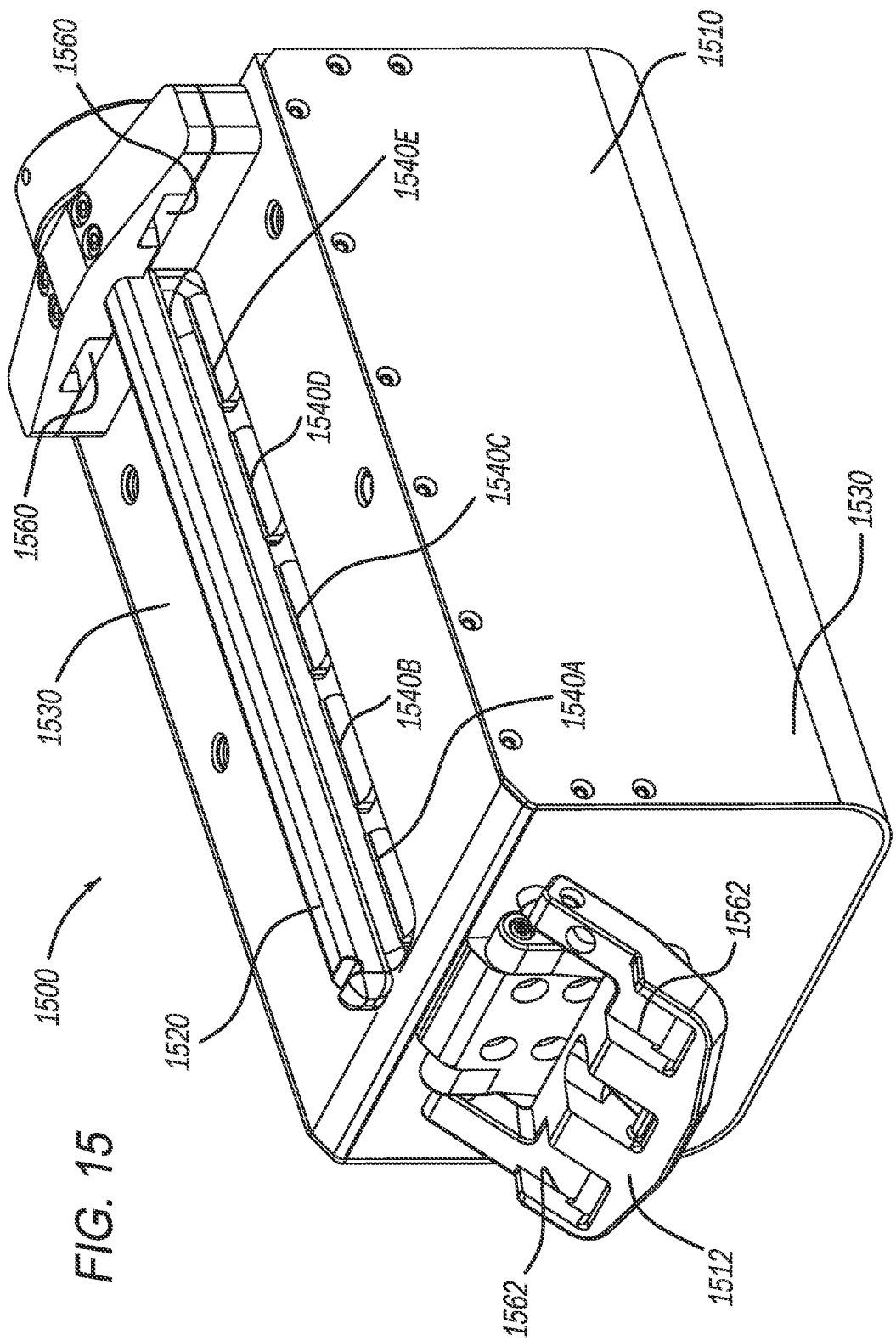
FIG. 15 is a perspective view of the multitube pinch valve assembly of FIG. 14 with a bioreactor support frame removed.
Figure 16:
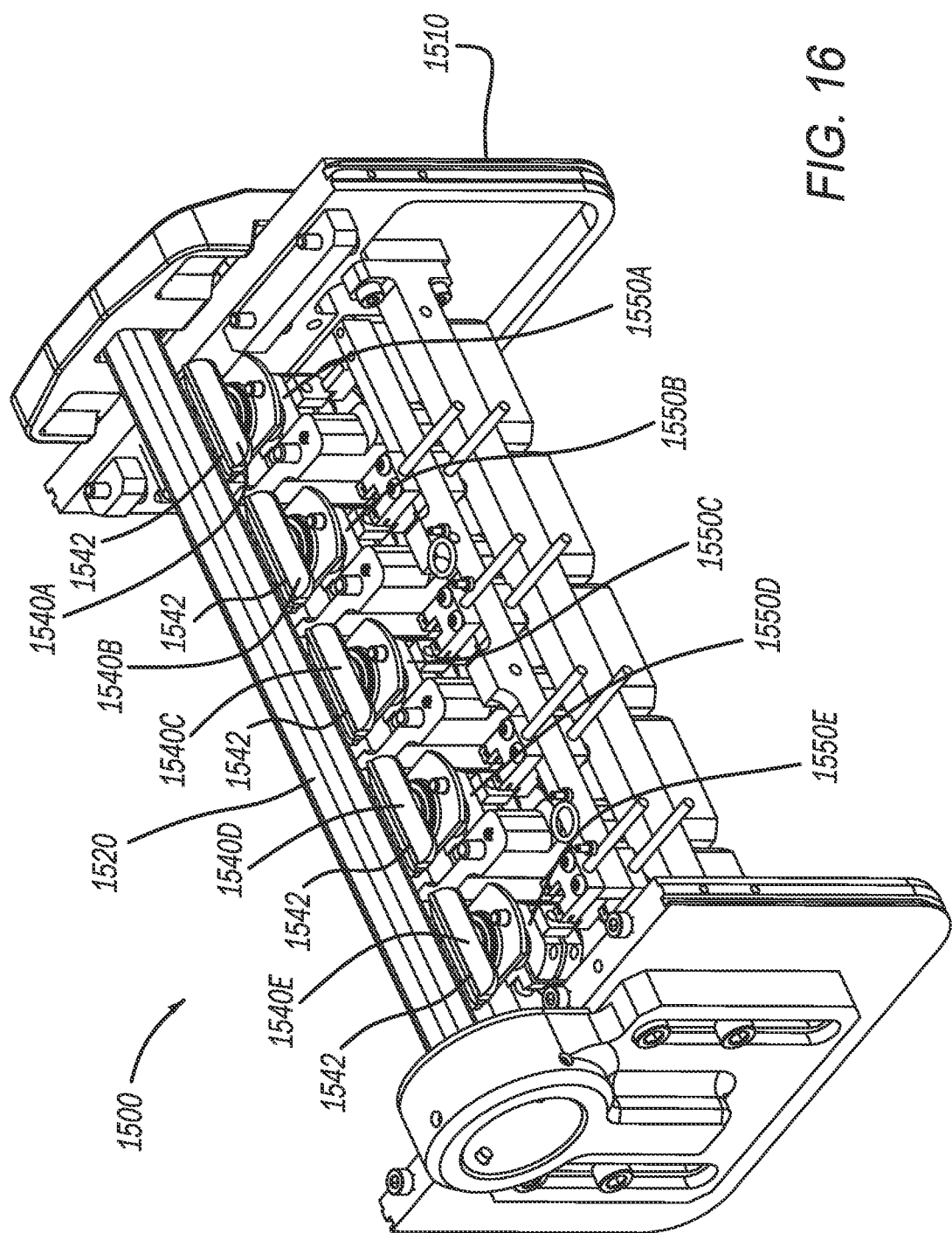
FIG. 16 is a perspective view of the multitube pinch valve assembly of FIG. 14 with a cover removed.
Figure 17:
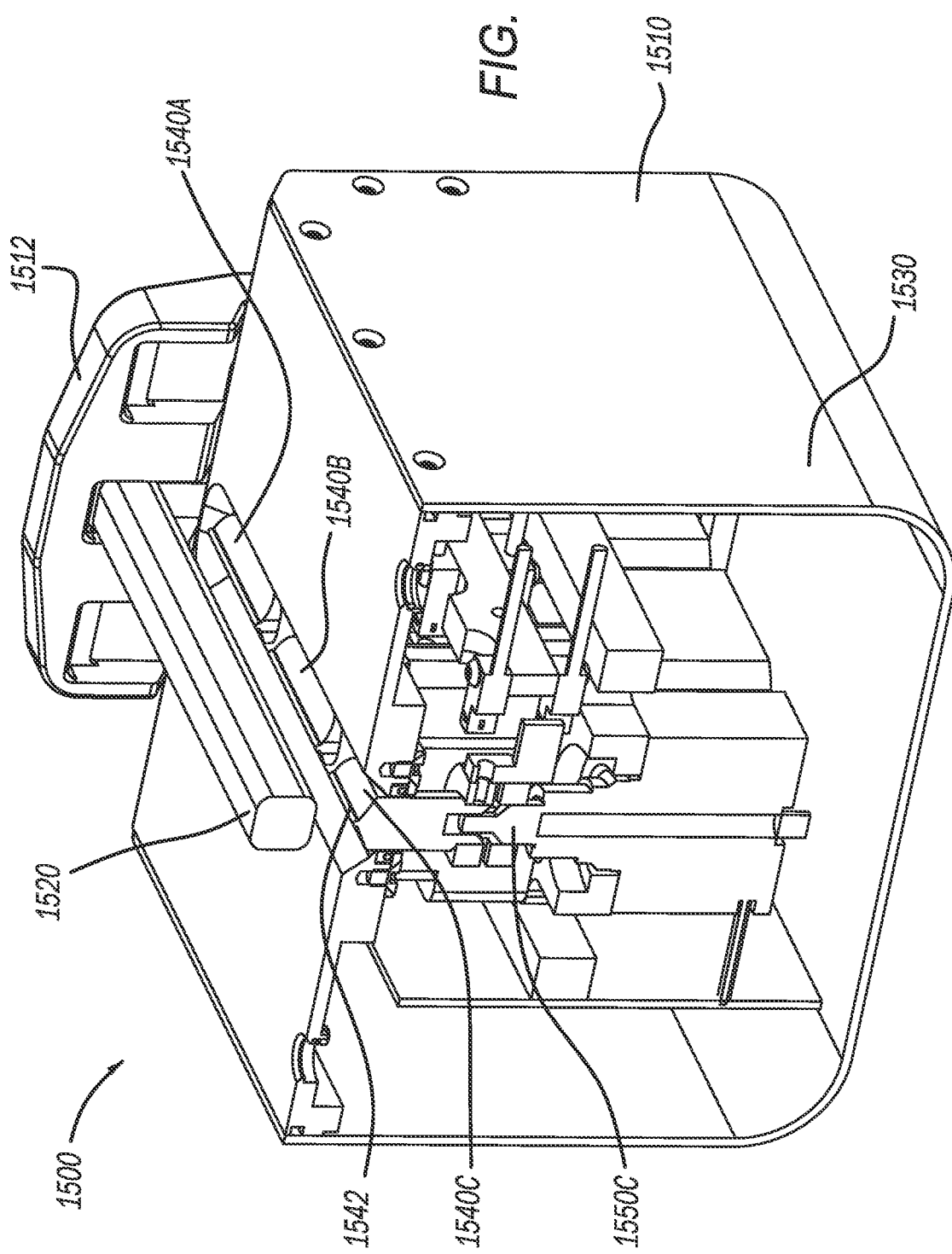
FIG. 17 is a cross-sectional view of the multitube pinch valve assembly of FIG. 14.

FIGS. 14-18 illustrate an additional multitube pinch valve assembly 1500 in accordance with the present disclosure. The assembly 1500 generally includes a base 1510 and a bioreactor support frame 1710. With particular reference to FIGS. 14 and 15, the base 1510 includes a latch 1512, which is rotatable between a closed position and an open position. In the open position, a rail 1520 of the base 1510 is accessible. The rail 1520 extends across the base 1510, and is configured to cooperate with the bioreactor support frame 1710, as explained herein. The rail 1520 may include a planar undersurface, or a pinch protrusion similar to the platen pinch protrusion 1330.

Opposite to the rail 1520, and seated within a housing 1530, are a plurality of actuation plates 1540A, 1540B, 1540C, 1540D, and 1540E. In the example illustrated, five actuation plates 1540A-1540E are included. The base 1510 may include any suitable number of actuation plates, however. Each one of the actuation plates 1540A-1540E includes a pinch protrusion 1542.

The actuation plates 1540A-1540E are individually actuatable by any suitable actuation mechanism. In the example illustrated, each one of the actuation plates 1540A-1540E is actuated by a different actuation mechanism 1550A, 1550B, 1550C, 1550D, 1550E respectively. The actuation mechanisms 1550A-1550E may include any suitable linear actuator, such as any suitable solenoid, linear stepper motor, pneumatic actuator, etc. The actuation mechanisms 1550A-1550E may be individually actuated to control fluid flow through tubes 124 of the bioreactors 704A-704E.

Figure 18:
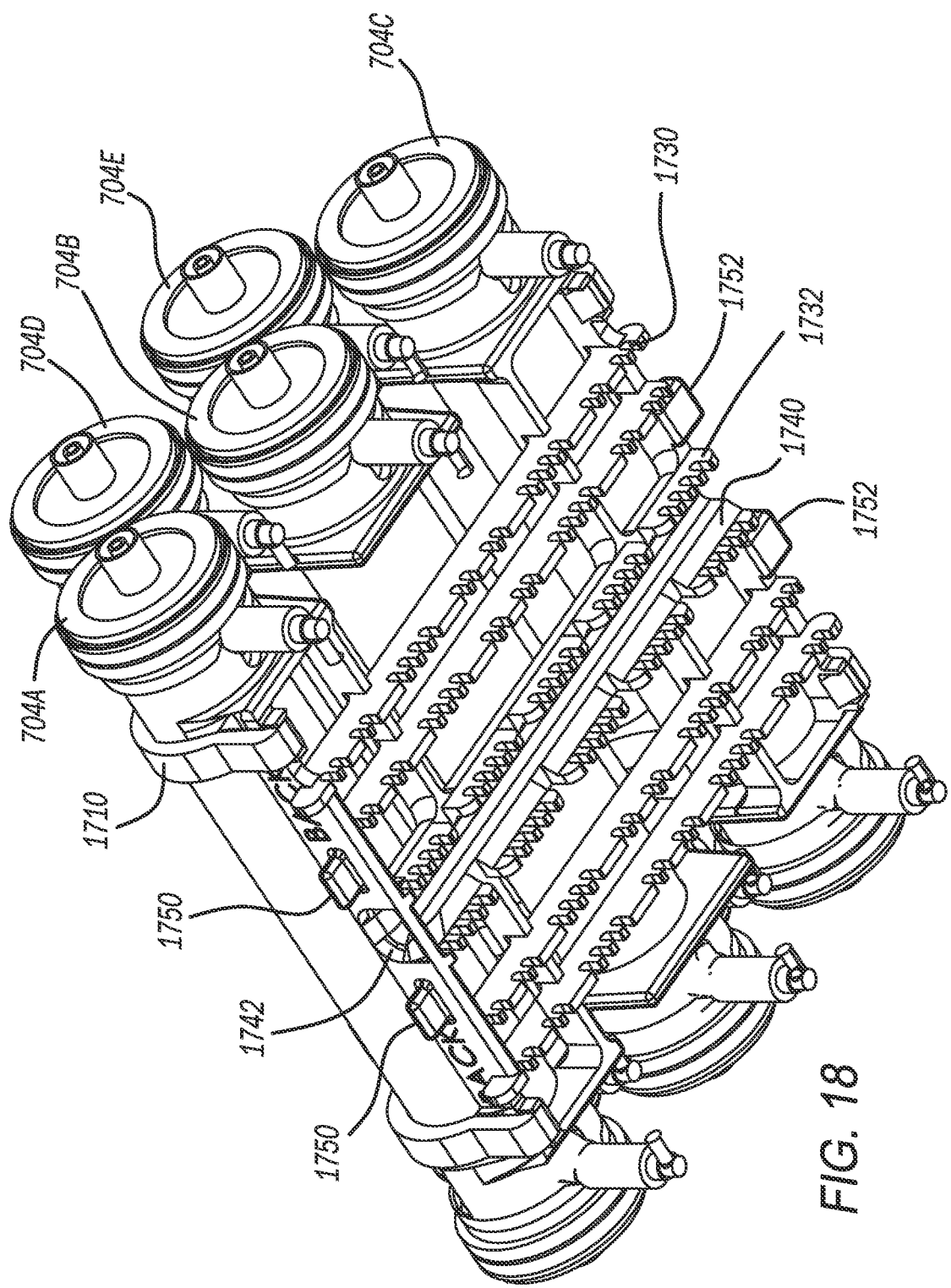
FIG. 18 is a perspective view of a bioreactor support frame configured for the multitube pinch valve assembly of FIG. 14.

With particular reference to FIG. 18, the bioreactor support frame 1710 includes a tubing platen 1730. The tubing platen 1730 defines a plurality of tube receiving apertures 1732 configured to secure the tubes 124 of the bioreactors 704A-704E to the tubing platen 1730. The tube receiving apertures 1732 are configured to support the tubes 124 so that the tubes 124 extend parallel to the lengths of the bioreactors 704A-704E.

The tubing platen 1730 further defines a center channel 1740 configured to receive the rail 1520 therein. At a rear of the center channel 1740 is a rear aperture 1742. The center channel 1740 extends perpendicular to the lengths of the bioreactors 704A-704E, and perpendicular to the tubes 124 supported by the tube receiving apertures 1732. At a rear end of the tubing platen 1730 are rear tabs 1750. At a front end of the tubing platen 1730 are front tabs 1752.

To connect the bioreactor support frame 1710 to the base 1510, the latch 1512 is folded downward, the tubing platen 1730 is positioned so that the rail 1520 enters through the rear aperture 1742, and then the tubing platen 1730 is slid onto the rail 1520 so that the rail 1520 extends along the center channel 1740. The tubing platen 1730 is slid along the rail 1520 until the rear tabs 1750 are seated within rear openings 1560 of the base 1510. The latch 1512 is then closed onto the front tabs 1752 so that the front tabs 1752 are seated within recesses 1562 defined on an inner surface of the latch 1512 to lock the tubing platen 1730 into position. The rear tabs 1750 and the front tabs 1752 improve alignment of the tubes 124 relative to the pinch protrusions 1542, and prevent loading the bioreactors backwards. Also, when the assembly 1500 includes a rocker, the tabs 1750, 1752 keep the bioreactors 704A-704E and tubes 124 in the correct position relative to the rod 1520. The tubing platen 1730 is oriented so that the pinch protrusions 1542 are perpendicular to the tubes 124. Actuation of the different actuation plates 1540A-1540E moves the pinch protrusions 1542 towards and into the center channel 1740 to pinch the tubes 124 between the pinch protrusions 1542 and the rail 1520 to restrict fluid flow through the tubes 124 in generally the same manner illustrated in FIGS. 5A, 5B, and 5C illustrating the multi-tubing pinch valve assembly 400. In some applications, there may be a material between the tubes 124 and the rail 1520. The actuation plates 1540A-1540E may be individually actuated by the actuation mechanisms 1550A-1550E to selectively pinch the tubes 124, which selectively controls flow through the different tubes 124 and through the different bioreactors 704A-704E.

While the operations and steps above have been discussed and illustrated in relation to a particular sequence of events, it should be appreciated that changes, additions, and omissions to this sequence can occur without materially affecting the operation of the disclosed embodiments, configuration, and aspects.

The exemplary systems and methods of this disclosure have been described in relation to pinch valves and multiple-tubing systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Exemplary aspects are directed to a multiple-tube pinch valve assembly, comprising: a camshaft extending a length along a longitudinal axis of the camshaft, the camshaft comprising at least one cam disposed along the length, the at least one cam comprising a cam profile shape defined around the longitudinal axis and a periphery of the camshaft and; a platen offset a distance from the longitudinal axis, the distance at least partially defining a space configured to receive multiple fluid flow tubes; and an anvil assembly comprising a cam contact portion disposed on a first side of the anvil assembly and a pinch edge disposed on a second side of the anvil assembly, wherein the anvil assembly is moveable between a retracted state such that the pinch edge is disposed outside of the space and an extended state such that the pinch edge is disposed inside the space adjacent the platen, and wherein the anvil assembly moves between the retracted state and the extended state by a rotation of the camshaft and the at least one cam.

Any one or more of the above aspects include wherein the cam profile shape comprises at least one cam lobe and at least one cam heel, wherein the anvil assembly is in the extended state when the cam lobe is disposed in contact with the cam contact portion, and wherein the anvil assembly is in the retracted state when the cam heel is disposed in contact with the cam contact portion. Any one or more of the above aspects include wherein the cam contact portion comprises at least one cam follower. Any one or more of the above aspects include wherein the space comprises a plurality of tube receiving apertures arranged side-by-side along a direction that is parallel to the longitudinal axis of the camshaft. Any one or more of the above aspects include wherein each tube receiving aperture of the plurality of tube receiving apertures extend in a direction that is perpendicular to the longitudinal axis of the camshaft. Any one or more of the above aspects further comprising: a plurality of tubes removably engaged with the plurality of tube receiving apertures such that a section of each tube of the plurality of tubes is disposed in the space adjacent the platen, wherein, in the retracted state, a lumen of each tube of the plurality of tubes is open along the section of each tube of the plurality of tubes, and wherein, in the extended state, the lumen of each tube of the plurality of tubes is closed at a point along the section of each tube of the plurality of tubes. Any one or more of the above aspects further comprising: a motor comprising an output shaft; a drive body attached to the output shaft of the motor; and a cam drive body attached to the camshaft, wherein rotation of the output shaft of the motor transmits power from the drive body to the cam drive body causing the camshaft to rotate relative to the anvil assembly. Any one or more of the above aspects further comprising: a support frame comprising a plurality of recesses, wherein each recess of the plurality of recesses is configured to hold a respective bioreactor, and wherein each tube of the plurality of tubes is associated with the respective bioreactor. Any one or more of the above aspects include wherein the anvil assembly, when moving between the retracted state and the extended state, translates along a plane that is perpendicular to a plane running through the plurality of tubes, and wherein, in the extended state, the pinch edge of the anvil assembly contacts and closes each tube of the plurality of tubes. Any one or more of the above aspects further comprising: an array of valves disposed along a length of the longitudinal axis of the camshaft, wherein each valve in the array of valves comprises a plurality of tube receiving apertures, and wherein each valve in the array of valves comprises a respective anvil assembly that is capable of moving between the retracted state and the extended state by the rotation of the camshaft and the at least one cam. Any one or more of the above aspects include wherein the respective anvil assembly of each valve in the array of valves is capable of moving between the retracted state and the extended state based on a position of a respective cam connected to the camshaft. Any one or more of the above aspects include wherein a first valve in the array of valves is capable of closing tubing contained within a first set of tube receiving apertures associated with the first valve at a same time or a different time as a second valve in the array of valves closes tubing contained within a second set of tube receiving apertures associated with the second valve. Any one or more of the above aspects include wherein, at a first time as the camshaft rotates, a first valve in the array of valves closes tubing contained within a first set of tube receiving apertures associated with the first valve, wherein, at a second time as the camshaft rotates, a second valve in the array of valves closes tubing contained within a second set of tube receiving apertures associated with the second valve. Any one or more of the above aspects include wherein, at a third time as the camshaft rotates, a third valve in the array of valves closes tubing contained within a third set of tube receiving apertures associated with the third valve, wherein, at a fourth time as the camshaft rotates, a fourth valve in the array of valves closes tubing contained within a fourth set of tube receiving apertures associated with the fourth valve, and wherein at a fifth time as the camshaft rotates, a fifth valve in the array of valves closes tubing contained within a fifth set of tube receiving apertures associated with the fifth valve. Any one or more of the above aspects include wherein the first set of tube receiving apertures, the second set of tube receiving apertures, the third set of tube receiving apertures, the fourth set of tube receiving apertures, and the fifth set of tube receiving apertures each comprise four tube receiving apertures.

Exemplary aspects are directed to a multiple-tube pinch valve assembly, comprising: a motor comprising an output shaft; a drive body attached to the output shaft of the motor; a camshaft extending a length along a longitudinal axis of the camshaft, the camshaft comprising at least one cam disposed along the length, the at least one cam comprising a cam profile shape defined around the longitudinal axis and a periphery of the camshaft; a cam drive body attached to the camshaft; a platen offset a distance from the longitudinal axis, the distance at least partially defining a space configured to receive multiple fluid flow tubes; and an anvil assembly comprising at least one cam follower disposed on a first side of the anvil assembly and a pinch edge disposed on a second side of the anvil assembly, wherein rotation of the output shaft of the motor transmits power from the drive body to the cam drive body causing the camshaft to rotate relative to the anvil assembly and move the anvil assembly between a retracted state, such that the pinch edge is disposed outside of the space, and an extended state, such that the pinch edge is disposed inside the space adjacent the platen, and wherein the anvil assembly moves between the retracted state and the extended state by rotation of the camshaft and the at least one cam.

Exemplary aspects are directed to a multi-tubing pinch valve assembly, comprising: a hinge plate extending a length from a first point to a second point, the hinge plate comprising: a pivot axis disposed adjacent the first point of the hinge plate; and a pinch protrusion disposed between the first point and the second point, the pinch protrusion extending from a surface of the hinge plate; a platen comprising a body offset a distance from the hinge plate, the platen comprising a tubing contact portion disposed on a surface of the platen; an actuator operatively connected to the hinge plate adjacent the second point, wherein the actuator is moveable between a retracted state and an extended state, wherein, in the retracted state, the hinge plate is pivoted about the pivot axis such that the second point of the hinge plate is separated from the platen by a first distance, wherein, in the extended state, the hinge plate is pivoted about the pivot axis such that the second point of the hinge plate is separated from the platen by a second distance, and wherein the first distance is greater than the second distance.

Any one or more of the above aspects include wherein, in the extended state, the pinch protrusion of the hinge plate is adjacent the tubing contact portion of the platen, and wherein in the retracted state, the pinch protrusion of the hinge plate is offset from the tubing contact portion of the platen creating a receiving space between the hinge plate and the platen. Any one or more of the above aspects include wherein, in the retracted state, the pinch protrusion of the hinge plate is offset from the tubing contact portion of the platen by a first dimension defining a receiving space capable of receiving a plurality of tubes. Any one or more of the above aspects include wherein, in the extended state, the pinch protrusion of the hinge plate is offset from the tubing contact portion of the platen by a second dimension defining a pinched receiving space that is sized to pinch the plurality of tubes disposed between the hinge plate and the platen. Any one or more of the above aspects further comprising the plurality of tubes disposed in between the hinge plate and the platen, wherein the plurality of tubes provide fluid flow paths therethrough when in the retracted state, and wherein the fluid flow paths are restricted by the pinch protrusion of the hinge plate and the tubing contact portion of the platen when in the extended state. Any one or more of the above aspects include wherein the pinch protrusion of the hinge plate and the tubing contact portion of the platen completely restrict fluid flow in the plurality of tubes when in the extended state. Any one or more of the above aspects further comprising: a clevis disposed adjacent the second point of the hinge plate; and a clevis pin engaged with the clevis, the clevis pin being connected to an end of a translation rod of the actuator. Any one or more of the above aspects include wherein the tubing contact portion comprises a platen pinch protrusion extending from a surface of the platen, and wherein the surface of the platen faces the hinge plate. Any one or more of the above aspects include wherein the pivot axis is defined by a hinge pin engaged with the hinge plate and a hinge support block. Any one or more of the above aspects include wherein the actuator is one of a solenoid, a screw-type actuator, and a stepper motor actuated screw. Any one or more of the above aspects include wherein the clevis pin engages with a slot in the clevis.

Exemplary aspects are directed to a multi-tubing pinch valve assembly, comprising: an array of valves disposed adjacent one another, wherein each valve in the array of valves comprises: a hinge plate extending a length from a first point to a second point, the hinge plate comprising: a pivot axis disposed adjacent the first point of the hinge plate; and a pinch protrusion disposed between the first point and the second point, the pinch protrusion extending from a surface of the hinge plate; a tubing contact body offset a distance from the hinge plate; an actuator operatively connected to the hinge plate adjacent the second point, wherein the actuator is moveable between a retracted state and an extended state, wherein, in the retracted state, the hinge plate is pivoted about the pivot axis such that the second point of the hinge plate is separated from the tubing contact body by a first distance, wherein, in the extended state, the hinge plate is pivoted about the pivot axis such that the second point of the hinge plate is separated from the tubing contact body by a second distance, and wherein the first distance is greater than the second distance.

Any one or more of the above aspects include wherein, in the extended state, the pinch protrusion of the hinge plate is adjacent the tubing contact body, and wherein in the retracted state, the pinch protrusion of the hinge plate is offset from the tubing contact body creating a receiving space between the hinge plate and the tubing contact body. Any one or more of the above aspects include wherein each valve in the array of valves is configured to receive a plurality of tubes in the receiving space. Any one or more of the above aspects include wherein each valve in the array of valves is configured to pinch the plurality of tubes in the receiving space in the extended state of the actuator. Any one or more of the above aspects include wherein each valve in the array of valves is independently operable such that each hinge plate of each valve is moveable between the retracted state and the extended state independently. Any one or more of the above aspects include wherein a first valve in the array of valves is operable together with and/or separately from a second valve in the array of valves. Any one or more of the above aspects further comprising: a support frame comprising a plurality of recesses, wherein each recess of the plurality of recesses is configured to hold a respective bioreactor, and wherein each tube of the plurality of tubes is associated with the respective bioreactor.

Exemplary aspects are directed to a multiple-bioreactor assembly comprising the multi-tubing pinch valve assembly of any of the above aspects.

Any one or more of the above aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or a class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," "compute," and variations thereof, as used herein, are used interchangeably and include any type of methodology, process, mathematical operation, or technique.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

What is claimed is:

1. A multiple-tube pinch valve assembly, comprising:
    a camshaft extending a length along a longitudinal axis of the camshaft, the camshaft comprising at least one cam disposed along the length, the at least one cam comprising a cam profile shape defined around the longitudinal axis and a periphery of the camshaft;
    a platen offset a distance from the longitudinal axis, the distance at least partially defining a space configured to receive multiple fluid flow tubes; and an anvil assembly comprising a cam contact portion disposed on a first side of the anvil assembly and a pinch edge disposed on a second side of the anvil assembly, wherein the anvil assembly is moveable between a retracted state such that the pinch edge is disposed outside of the space and an extended state such that the pinch edge is disposed inside the space adjacent the platen, and wherein the anvil assembly moves between the retracted state and the extended state by a rotation of the camshaft and the at least one cam.

2. The multiple-tube pinch valve assembly of claim 1, wherein the cam profile shape comprises at least one cam lobe and at least one cam heel, wherein the anvil assembly is in the extended state when the cam lobe is disposed in contact with the cam contact portion, and wherein the anvil assembly is in the retracted state when the cam heel is disposed in contact with the cam contact portion.

3. The multiple-tube pinch valve assembly of claim 2, wherein the cam contact portion comprises at least one cam follower.

4. The multiple-tube pinch valve assembly of claim 2, wherein the space comprises a plurality of tube receiving apertures arranged side-by-side along a direction that is parallel to the longitudinal axis of the camshaft.

5. The multiple-tube pinch valve assembly of claim 4, wherein each tube receiving aperture of the plurality of tube receiving apertures extend in a direction that is perpendicular to the longitudinal axis of the camshaft.

6. The multiple-tube pinch valve assembly of claim 5, further comprising:
a plurality of tubes removably engaged with the plurality of tube receiving apertures such that a section of each tube of the plurality of tubes is disposed in the space adjacent the platen, wherein, in the retracted state, a lumen of each tube of the plurality of tubes is open along the section of each tube of the plurality of tubes, and wherein, in the extended state, the lumen of each tube of the plurality of tubes is closed at a point along the section of each tube of the plurality of tubes.

7. The multiple-tube pinch valve assembly of claim 6, further comprising:
a motor comprising an output shaft;
a drive body attached to the output shaft of the motor; and
a cam drive body attached to the camshaft, wherein rotation of the output shaft of the motor transmits power from the drive body to the cam drive body causing the camshaft to rotate relative to the anvil assembly.

8. The multiple-tube pinch valve assembly of claim 7, further comprising:
a support frame comprising a plurality of recesses, wherein each recess of the plurality of recesses is configured to hold a respective bioreactor, and wherein each tube of the plurality of tubes is associated with the respective bioreactor.

9. The multiple-tube pinch valve assembly of claim 8, wherein the anvil assembly, when moving between the retracted state and the extended state, translates along a plane that is perpendicular to a plane running through the plurality of tubes, and wherein, in the extended state, the pinch edge of the anvil assembly contacts and closes each tube of the plurality of tubes.

10. The multiple-tube pinch valve assembly of claim 1, further comprising:
an array of valves disposed along a length of the longitudinal axis of the camshaft, wherein each valve in the array of valves comprises a plurality of tube receiving apertures, and wherein each valve in the array of valves comprises a respective anvil assembly that is capable of moving between the retracted state and the extended state by the rotation of the camshaft and the at least one cam.

11. The multiple-tube pinch valve assembly of claim 10, wherein the respective anvil assembly of each valve in the array of valves is capable of moving between the retracted state and the extended state based on a position of a respective cam connected to the camshaft.

12. The multiple-tube pinch valve assembly of claim 11, wherein a first valve in the array of valves is capable of closing tubing contained within a first set of tube receiving apertures associated with the first valve at a same time or a different time as a second valve in the array of valves closes tubing contained within a second set of tube receiving apertures associated with the second valve.

13. The multiple-tube pinch valve assembly of claim 11, wherein, at a first time as the camshaft rotates, a first valve in the array of valves closes tubing contained within a first set of tube receiving apertures associated with the first valve, wherein, at a second time as the camshaft rotates, a second valve in the array of valves closes tubing contained within a second set of tube receiving apertures associated with the second valve.

14. The multiple-tube pinch valve assembly of claim 13, wherein, at a third time as the camshaft rotates, a third valve in the array of valves closes tubing contained within a third set of tube receiving apertures associated with the third valve, wherein, at a fourth time as the camshaft rotates, a fourth valve in the array of valves closes tubing contained within a fourth set of tube receiving apertures associated with the fourth valve, and wherein at a fifth time as the camshaft rotates, a fifth valve in the array of valves closes tubing contained within a fifth set of tube receiving apertures associated with the fifth valve.

15. The multiple-tube pinch valve assembly of claim 14, wherein the first set of tube receiving apertures, the second set of tube receiving apertures, the third set of tube receiving apertures, the fourth set of tube receiving apertures, and the fifth set of tube receiving apertures each comprise four tube receiving apertures.

16. A multiple-tube pinch valve assembly, comprising:
a motor comprising an output shaft;
a drive body attached to the output shaft of the motor;
a camshaft extending a length along a longitudinal axis of the camshaft, the camshaft comprising at least one cam disposed along the length, the at least one cam comprising a cam profile shape defined around the longitudinal axis and a periphery of the camshaft and;
a cam drive body attached to the camshaft;
a platen offset a distance from the longitudinal axis, the distance at least partially defining a space configured to receive multiple fluid flow tubes; and
an anvil assembly comprising at least one cam follower disposed on a first side of the anvil assembly and a pinch edge disposed on a second side of the anvil assembly, wherein rotation of the output shaft of the motor transmits power from the drive body to the cam drive body causing the camshaft to rotate relative to the anvil assembly and move the anvil assembly between a retracted state, such that the pinch edge is disposed outside of the space, and an extended state, such that the pinch edge is disposed inside the space adjacent the platen, and wherein the anvil assembly moves between the retracted state and the extended state by rotation of the camshaft and the at least one cam.

17. A multi-tubing pinch valve assembly, comprising:
a hinge plate extending a length from a first point to a second point, the hinge plate comprising:
a pivot axis disposed adjacent the first point of the hinge plate; and
a pinch protrusion disposed between the first point and the second point, the pinch protrusion extending from a surface of the hinge plate;
a platen comprising a body offset a distance from the hinge plate, the platen comprising a tubing contact portion disposed on a surface of the platen;
an actuator operatively connected to the hinge plate adjacent the second point, wherein the actuator is moveable between a retracted state and an extended state, wherein, in the retracted state, the hinge plate is pivoted about the pivot axis such that the second point of the hinge plate is separated from the platen by a first distance, wherein, in the extended state, the hinge plate is pivoted about the pivot axis such that the second point of the hinge plate is separated from the platen by a second distance, and wherein the first distance is greater than the second distance.

18. The multi-tubing pinch valve assembly of claim 17, wherein, in the extended state, the pinch protrusion of the hinge plate is adjacent the tubing contact portion of the platen, and wherein in the retracted state, the pinch protrusion of the hinge plate is offset from the tubing contact portion of the platen creating a receiving space between the hinge plate and the platen.

19. The multi-tubing pinch valve assembly of claim 18, wherein, in the retracted state, the pinch protrusion of the hinge plate is offset from the tubing contact portion of the platen by a first dimension defining a receiving space capable of receiving a plurality of tubes.

20. The multi-tubing pinch valve assembly of claim 19, wherein, in the extended state, the pinch protrusion of the hinge plate is offset from the tubing contact portion of the platen by a second dimension defining a pinched receiving space that is sized to pinch the plurality of tubes disposed between the hinge plate and the platen.

21. The multi-tubing pinch valve assembly of claim 19, further comprising the plurality of tubes disposed in between the hinge plate and the platen, wherein the plurality of tubes provide fluid flow paths therethrough when in the retracted state, and wherein the fluid flow paths are restricted by the pinch protrusion of the hinge plate and the tubing contact portion of the platen when in the extended state.

22. The multi-tubing pinch valve assembly of claim 19, wherein the pinch protrusion of the hinge plate and the tubing contact portion of the platen completely restrict fluid flow in the plurality of tubes when in the extended state.

23. The multi-tubing pinch valve assembly of claim 19, further comprising:
a clevis disposed adjacent the second point of the hinge plate; and
a clevis pin engaged with the clevis, the clevis pin being connected to an end of a translation rod of the actuator.

24. The multi-tubing pinch valve assembly of claim 23, wherein the tubing contact portion comprises a platen pinch protrusion extending from a surface of the platen, and wherein the surface of the platen faces the hinge plate.

25. The multi-tubing pinch valve assembly of claim 24, wherein the pivot axis is defined by a hinge pin engaged with the hinge plate and a hinge support block.

26. The multi-tubing pinch valve assembly of claim 25, wherein the actuator is one of a solenoid, a screw-type actuator, and a stepper motor actuated screw.

27. The multi-tubing pinch valve assembly of claim 26, wherein the clevis pin engages with a slot in the clevis.

28. A multi-tubing pinch valve assembly, comprising:
an array of valves disposed adjacent one another, wherein each valve in the array of valves comprises:
a hinge plate extending a length from a first point to a second point, the hinge plate comprising:
a pivot axis disposed adjacent the first point of the hinge plate; and
a pinch protrusion disposed between the first point and the second point, the pinch protrusion extending from a surface of the hinge plate;
a tubing contact body offset a distance from the hinge plate;
an actuator operatively connected to the hinge plate adjacent the second point, wherein the actuator is moveable between a retracted state and an extended state, wherein, in the retracted state, the hinge plate is pivoted about the pivot axis such that the second point of the hinge plate is separated from the tubing contact body by a first distance, wherein, in the extended state, the hinge plate is pivoted about the pivot axis such that the second point of the hinge plate is separated from the tubing contact body by a second distance, and wherein the first distance is greater than the second distance.

29. The multi-tubing pinch valve assembly of claim 28, wherein, in the extended state, the pinch protrusion of the hinge plate is adjacent the tubing contact body, and wherein in the retracted state, the pinch protrusion of the hinge plate is offset from the tubing contact body creating a receiving space between the hinge plate and the tubing contact body.

30. The multi-tubing pinch valve assembly of claim 29, wherein each valve in the array of valves is configured to receive a plurality of tubes in the receiving space.

31. The multi-tubing pinch valve assembly of claim 30, wherein each valve in the array of valves is configured to pinch the plurality of tubes in the receiving space in the extended state of the actuator.

32. The multi-tubing pinch valve assembly of claim 31, wherein each valve in the array of valves is independently operable such that each hinge plate of each valve is moveable between the retracted state and the extended state independently.

33. The multi-tubing pinch valve assembly of claim 31, wherein a first valve in the array of valves is operable together with and/or separately from a second valve in the array of valves.

34. The multi-tubing pinch valve assembly of claim 31, further comprising:
a support frame comprising a plurality of recesses, wherein each recess of the plurality of recesses is configured to hold a respective bioreactor, and wherein each tube of the plurality of tubes is associated with the respective bioreactor.

35. A multiple-bioreactor assembly comprising the multi-tubing pinch valve assembly of claim 31.

* * * * *